(12) United States Patent
Devine et al.

(10) Patent No.: US 7,535,132 B2
(45) Date of Patent: May 19, 2009

(54) LIVE CONDUCTOR STRINGING AND SPLICING METHOD AND APPARATUS

(75) Inventors: Clifford W. Devine, Oliver (CA); Daniel N. O'Connell, British Columbia (CA)

(73) Assignee: Quanta Associates L.P., Houston, TX (US)

( * ) Notice: Subject to any disclaimer, the term of this patent is extended or adjusted under 35 U.S.C. 154(b) by 702 days.

(21) Appl. No.: 10/927,467

(22) Filed: Aug. 27, 2004

(65) Prior Publication Data

US 2005/0133244 A1    Jun. 23, 2005

Related U.S. Application Data

(60) Provisional application No. 60/498,707, filed on Aug. 29, 2003.

(51) Int. Cl.
*H02G 5/00* (2006.01)
*H02G 7/00* (2006.01)

(52) U.S. Cl. ...................................... 307/147; 174/68.2

(58) Field of Classification Search ................. 307/147; 174/68.2
See application file for complete search history.

(56) References Cited

U.S. PATENT DOCUMENTS 6,060,972 A * 5/2000 Van Den Brink ............ 336/175

FOREIGN PATENT DOCUMENTS

| JP | 03-007007 | 1/1991 |
| JP | 2001-186616 A | 1/1991 |
| JP | 2001-186616 | 7/2001 |
| JP | H03-007007 A | 7/2001 |

* cited by examiner

*Primary Examiner*—Albert W Paladini
*Assistant Examiner*—Dru M Parries
(74) *Attorney, Agent, or Firm*—Antony C. Edwards

(57) ABSTRACT

A method and apparatus for handling and/or stringing energized conductor for a high voltage power line conductor for a high voltage power line is provided. The method includes bringing components and workers to the same electrical potential and transferring power from one contractor to another. Associated apparatus is also described.

17 Claims, 91 Drawing Sheets

FIG. 2
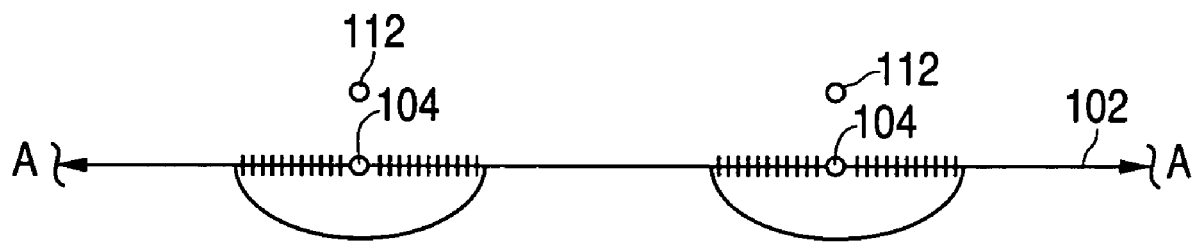
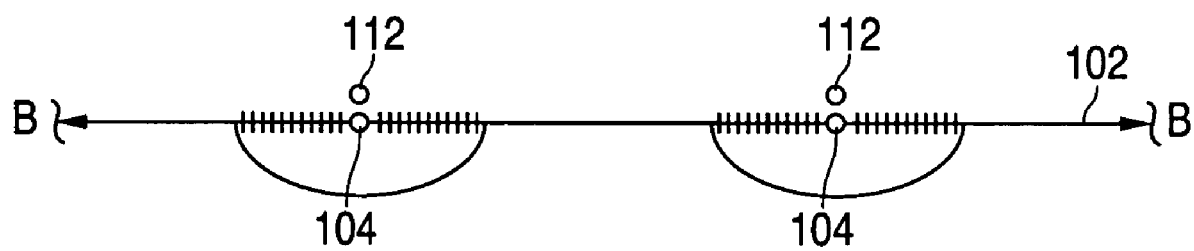
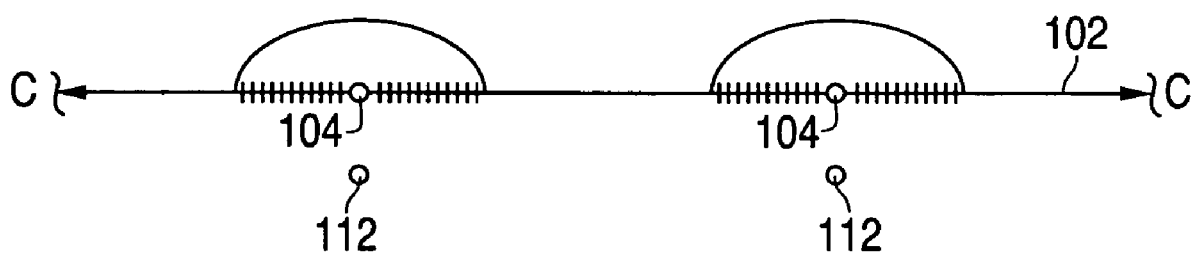

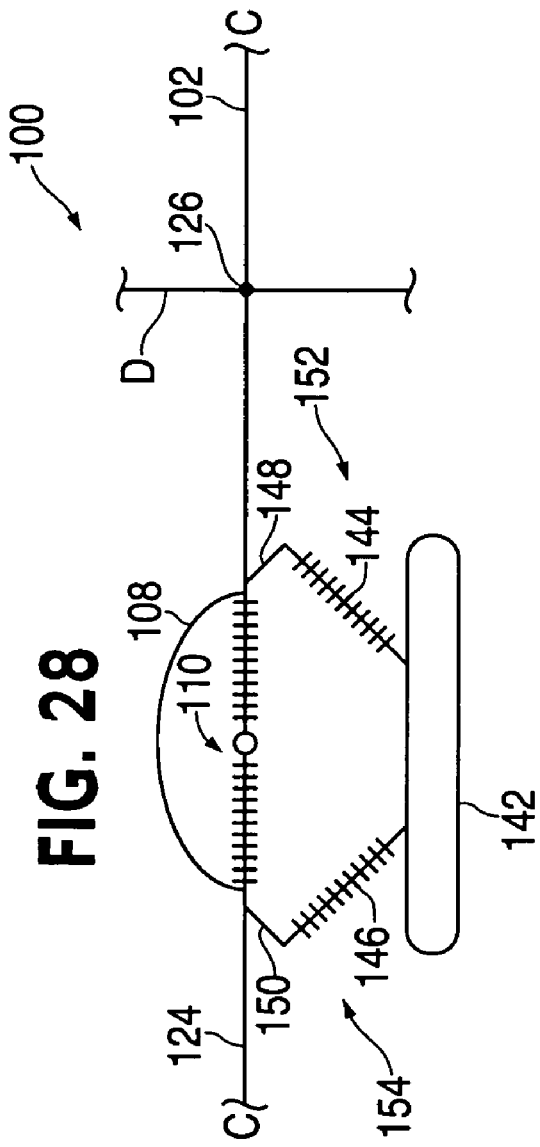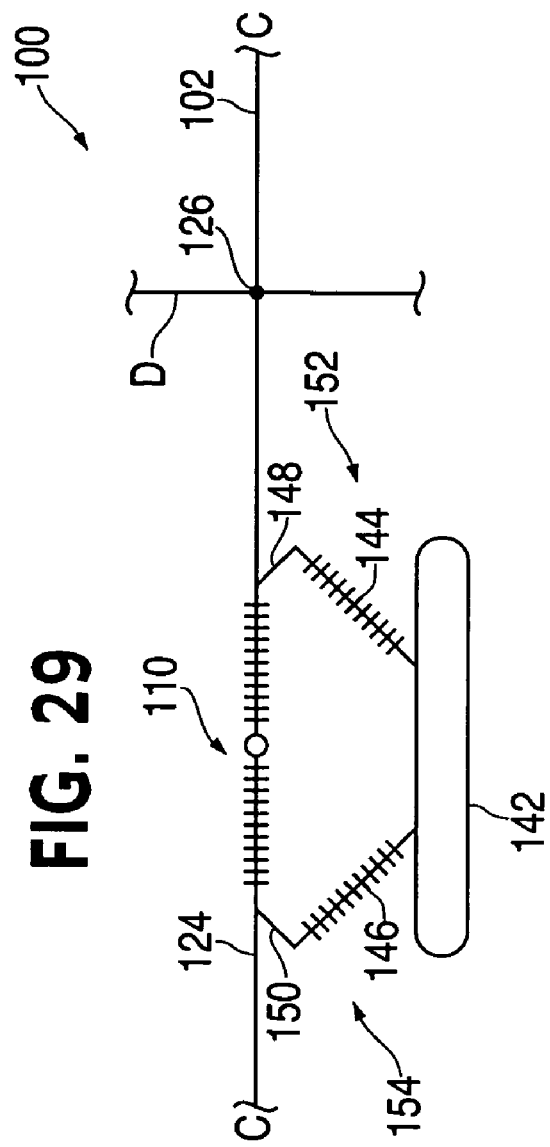

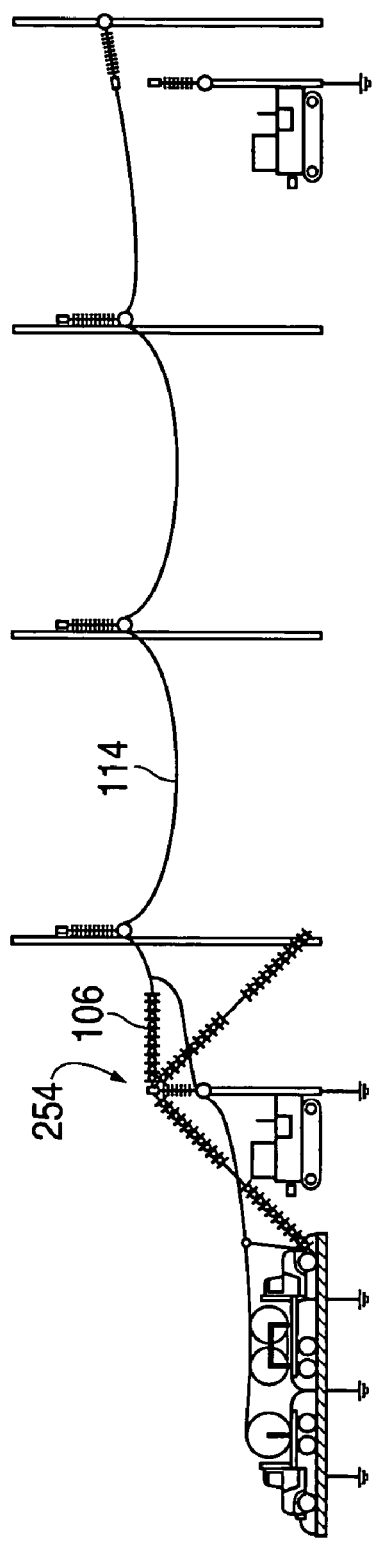
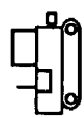
FIG. 89

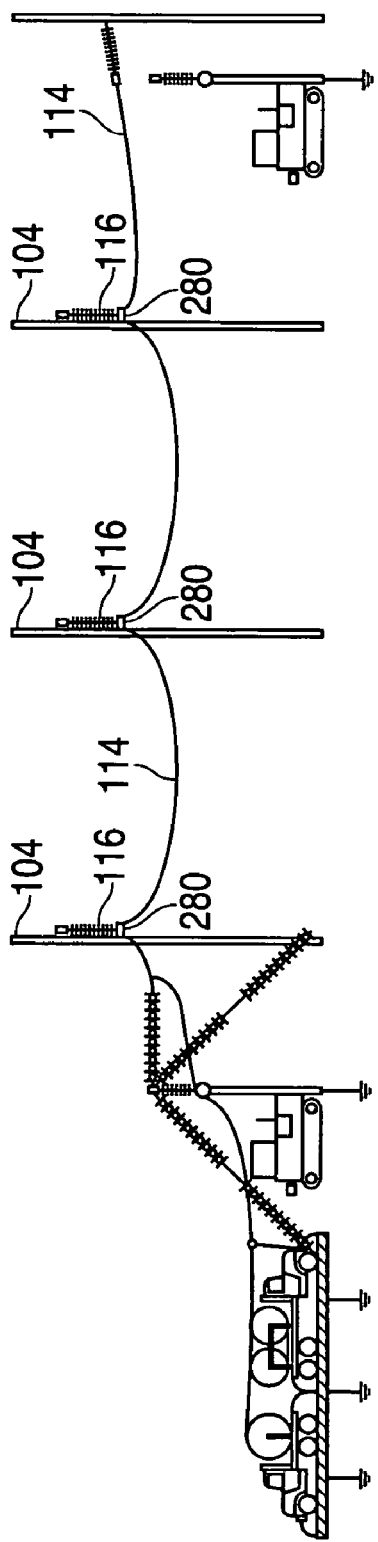
FIG. 90
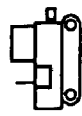

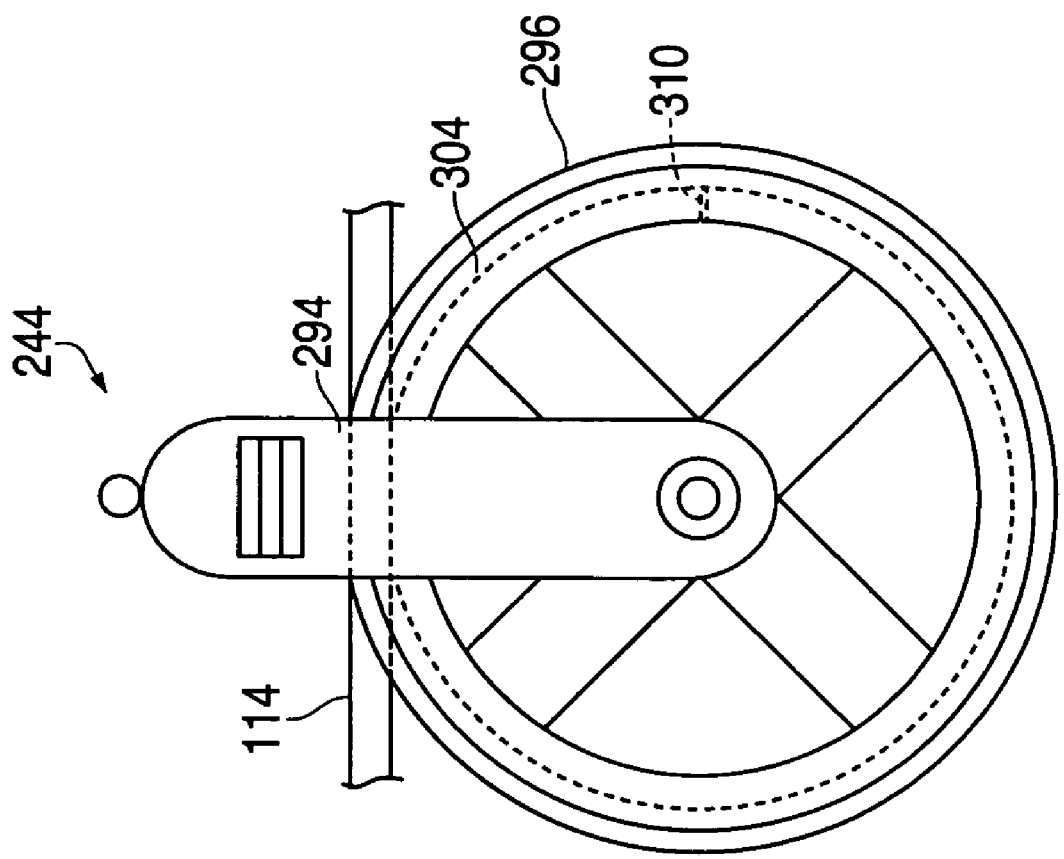
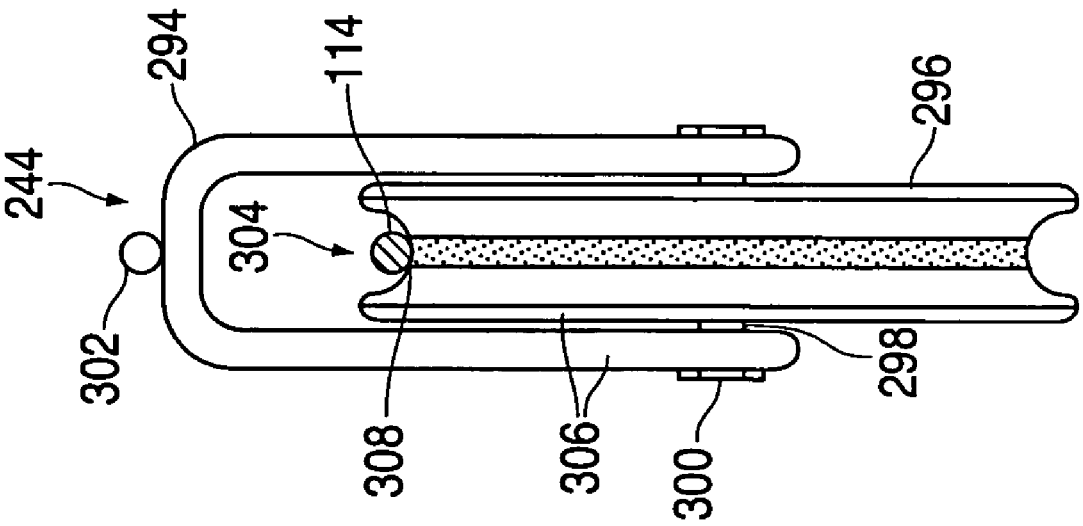

LIVE CONDUCTOR STRINGING AND SPLICING METHOD AND APPARATUS

CLAIM OF PRIORITY

This application claims priority to the U.S. provisional patent application entitled, Energized Reconductor Handling Method and Apparatus, filed Aug. 29, 2003, having a Ser. No. 60/498,707, the disclosure of which is hereby incorporated by reference in its entirety.

FIELD OF THE INVENTION

The present invention relates generally to high voltage power transfer systems. More particularly, the present invention relates to replacing conductors in a high voltage power system.

BACKGROUND OF THE INVENTION

Users of large amounts of electrical power such as cities, manufacturing facilities, and other high-power users are often located quite a distance away from sources of electrical power such as hydroelectric dams and power plants. In order to deliver large amounts of power from the source of generation to the power consumers, large, high-capacity, high-voltage power lines are used.

Typically, alternating current (AC power) is generated in a three-phase configuration. For the purposes of this document, the three phases will be referred to as A, B and C phase. A phase, B phase and C phase are all transported over separate conductors. In some instances direct current (DC Power) is used in which case two conductors are used and are referred to as A and E phase. Typically, the conductors are comprised of long wires supported on large support structures such as towers or power poles. The separate conductors are typically attached to the same support structures.

From time to time, the power lines transporting the power may require maintenance. For example, a section of the conductor may need to be replaced, an insulator insulating the power line from the support structure may need to be replaced, or, the support structure itself may need repair or replacement. In some cases, conductors may be functioning properly, but need to be replaced by higher-capacity conductors in order to transport more power.

Typical maintenance on power lines requires that the power be shut off before the line can be worked on. High induction currents may be induced into a conductor in the proximity of other high voltage conductors thus creating a hazard in order to work on a particular conductor.

Shutting off the power creates a disruption of power delivery to customers. A power user maybe forced to do without power during the time the power line is maintained which is undesirable for a variety of reasons. To provide consumers power while a particular line is being worked on, the load may be shifted to other power lines to deliver the power to the end user. Unfortunately, shifting power to other transmission lines is not always possible because redundant systems may not exist, or transmission lines may already be operating at or near capacity level and not able to deliver the required power.

Accordingly, it is desirable to provide a method and any accompanying apparatus necessary to allow high voltage power transmission lines to be worked on, replaced or maintained without requiring power to stop being delivered or diverted over to other remote transmission lines.

SUMMARY OF THE INVENTION

The foregoing needs are met, to a great extent, by the present invention, wherein in one aspect an apparatus and a method is provided that, in some embodiments, permit high voltage power transmission lines to be worked on, replaced, or maintained while the line being worked on is energized.

In accordance with one embodiment of the present invention, a method to replace and handle a high voltage conductor in a power transmission system without causing a power disruption is provided. The method includes: selecting a section of the conductor; ensuring the selected section of conductor is located between two dead ends; and bypassing the selected section of conductor located between the two dead ends by transferring a power load from a first non-selected conductor to a second conductor connected to the first non-selected section of the conductor at or before the first dead end and to a second non-selected section of the conductor at or after the second dead end.

In accordance with one embodiment of the present invention, an apparatus for working on conductors having sections strung between two dead ends without disrupting power delivery is provided. The apparatus includes: a first conductor having a section strung between a first and second dead end; a second conductor strung alongside and in close proximity to the first conductor; a first transfer buss electrically connecting the first conductor at one end outside the first and second dead end to the second conductor; and a second transfer buss electrically connecting the first conductor at an opposite end from the first transfer buss outside the first and second dead end to the second conductor, wherein current bypasses the first conductor upstream of the first dead end and travels through the second conductor and is returned to the first conductor downstream of the second dead end.

In accordance with one embodiment of the present invention, an apparatus for working on conductors having sections located between two dead ends without disrupting power delivery is provided. The apparatus includes: first means for conducting electricity having a section strung between the first and second dead ends; second means for conducting electricity strung alongside and in close proximity to the first means for conducting electricity; first means for transferring power electrically connecting the first conducting means at one end outside of the first and second dead end to the second conducting means; and second means for transferring power electrically connecting the first conducting means at the another end outside the first and second dead end, wherein current bypasses the first conducting means upstream of the first dead end and travels through the second conducting means and is returned to the first conducting means downstream of the second dead end.

In accordance with one embodiment of the present invention, a method of installing a conductor along a power transmission system without interrupting delivery of downstream power is provided. The method includes: moving an energized first conductor to a temporary position; stringing a second conductor in a position formerly occupied by the first conductor while the first conductor is energized; and transferring a power load carried by the first conductor to the second conductor.

In accordance with one embodiment of the present invention, an equal potential zone is provided. The equal potential zone includes: an electrically conductive mat configured to be electrically bonded to the earth; a first fence surrounding at least part of a perimeter associated with the mat; and a second fence surrounding at least part of the perimeter of the equal potential and spaced apart from the first fence.

In accordance with one embodiment of the present invention, an insulated section for an equal potential zone is provided. The insulted section includes: decking; and an insulator located at least one of above and beneath the decking and configured to electrically insulate the decking from the ground.

In accordance with one embodiment of the present invention, an equal potential zone is provided. The equal potential zone includes: an electrically conductive surface configured to be grounded to the earth; means for entering and exiting the equal potential zone; and a first and second means for blocking surrounding at least part of the electrically conductive surface but not the entering and exit means.

In accordance with one embodiment of the present invention, a method of making an equal potential zone is provided. The method includes: bonding an electrically conductive mat to earth; insulating an exit/enter section for the equal potential zone; surrounding at least part of the mat with a first fence electrically bonded to the mat; and surrounding at least part of the mat with a second fence spaced apart from the first fence.

In accordance with one embodiment of the present invention, a transfer buss is provided. The transfer buss includes: a first conductor suspended between two support structures, the first conductor located at an angle to a second conductor; a jumper configured to connect to the first conductor at one end and the second conductor at the other end; and a second jumper configured to connect to the first conductor at one end.

In accordance with one embodiment of the present invention, a portable circuit breaker system is provided. The portable circuit breaker system includes: a one pole circuit breaker mounted on a transport vehicle; and a control system mounted on the transport vehicle and operatively connected to control the circuit breaker.

In accordance with one embodiment of the present invention, a method of stringing live conductor through a support structure is provided. The method includes: connecting a traveler to the support structure; stringing a pull line through the traveler; connecting the pull line via a swivel and a flexible insulator to one of a conductor and a hard line; pulling the pull line through the traveler and thereby causing one of the hard line and conductor to be strung through the traveler; attaching the hard line to a conductor via a swivel and flexible insulator and pulling the hard line through the traveler thereby causing the conductor to be strung though the traveler only when the conductor is connected to a hard line; attaching the conductor to the support structure; removing the traveler from the support structure; and disconnecting one of a pull line and a hard line from the conductor.

In accordance with one embodiment of the present invention, a method of connecting two live conductor ends is provided. The method includes: electrically bonding a first conductor to an equal potential zone; electrically bonding a second conductor to an equal potential zone; and connecting a first conductor end to a second conductor end via an flexible insulator.

In accordance with one embodiment of the present invention, a method of splicing two connectors together is provided. The method includes: electrically bonding a first conductor to an equal potential zone; electrically bonding a second conductor to an equal potential zone; and splicing a first conductor end to a second conductor end using one of a compression splice, an automatic splice and a preformed splice.

In accordance with one embodiment of the present invention, a method of anchoring a vehicle on a equal potential zone is provided. The method includes: placing a first vehicle on the equal potential zone; electrically bonding the first vehicle to the equal potential zone; locating an anchor off of the equal potential zone and spaced from the equal potential zone; mechanically connecting the anchor to the first vehicle; and electrically insulating the anchor from the first vehicle.

In accordance with one embodiment of the present invention, a method of loading and unloading objects on and off of a equal potential zone is provided. The method includes: lifting an object with a lift device wherein an insulator is positioned between the object and the lift device; and placing the object in a desired location.

In accordance with one embodiment of the present invention, a traveler is provided. The traveler includes: a metal frame; a metal axle connected to the frame; a metal wheel electrically and mechanically connected to the frame via the axle; a protective coating on the wheel configured to protect a conductor contacting the wheel; and a connecter providing an electrical pathway through the coating from the conductor to the wheel when the conductor is contacting the wheel.

In accordance with one embodiment of the present invention, a traveler is provided. The traveler includes: means for housing; means for rolling mechanically and electrically connected to the housing means; means for coating the rolling means to protect the rolling means from damaging a conductor connected to the rolling means; and means for conducting electricity from the conductor through the coating means to the rolling means.

In accordance with one embodiment of the present invention, a method of maintaining the same potential across a traveler is provided. The method includes: mechanically and electrically connecting a wheel to a frame; and providing an electrical path from a conductor contacting the wheel through a coating on the wheel to the wheel.

In accordance with one embodiment of the present invention, a portable support structure for a high voltage conductor is provided. The portable support structure includes: a vehicle; and an upright structure attached to the vehicle in a substantially upright position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a schematic diagram illustrating the power transfer system of FIG. 1 showing new support structure added in accordance with the invention.

FIG. 28 is a schematic diagram illustrating a circuit breaker attached in parallel to a jumper around a dead end on a C phase conductor.

FIG. 29 is a schematic diagram illustrating the system of FIG. 28 illustrating the jumper on the C phase conductor around the dead end is removed.

FIG. 89 is the layout of FIG. 88 where the sagging vehicle is disconnected from the conductor.

FIG. 90 is the layout of FIG. 89 where the new conductor is removed from the travelers on the support structures and connected to the insulators.

FIG. 99 is an end view side view of a traveler in accordance with one embodiment of the invention.

FIG. 100 is a side view of a traveler in accordance with an embodiment of the invention.

DETAILED DESCRIPTION

Figure 1:
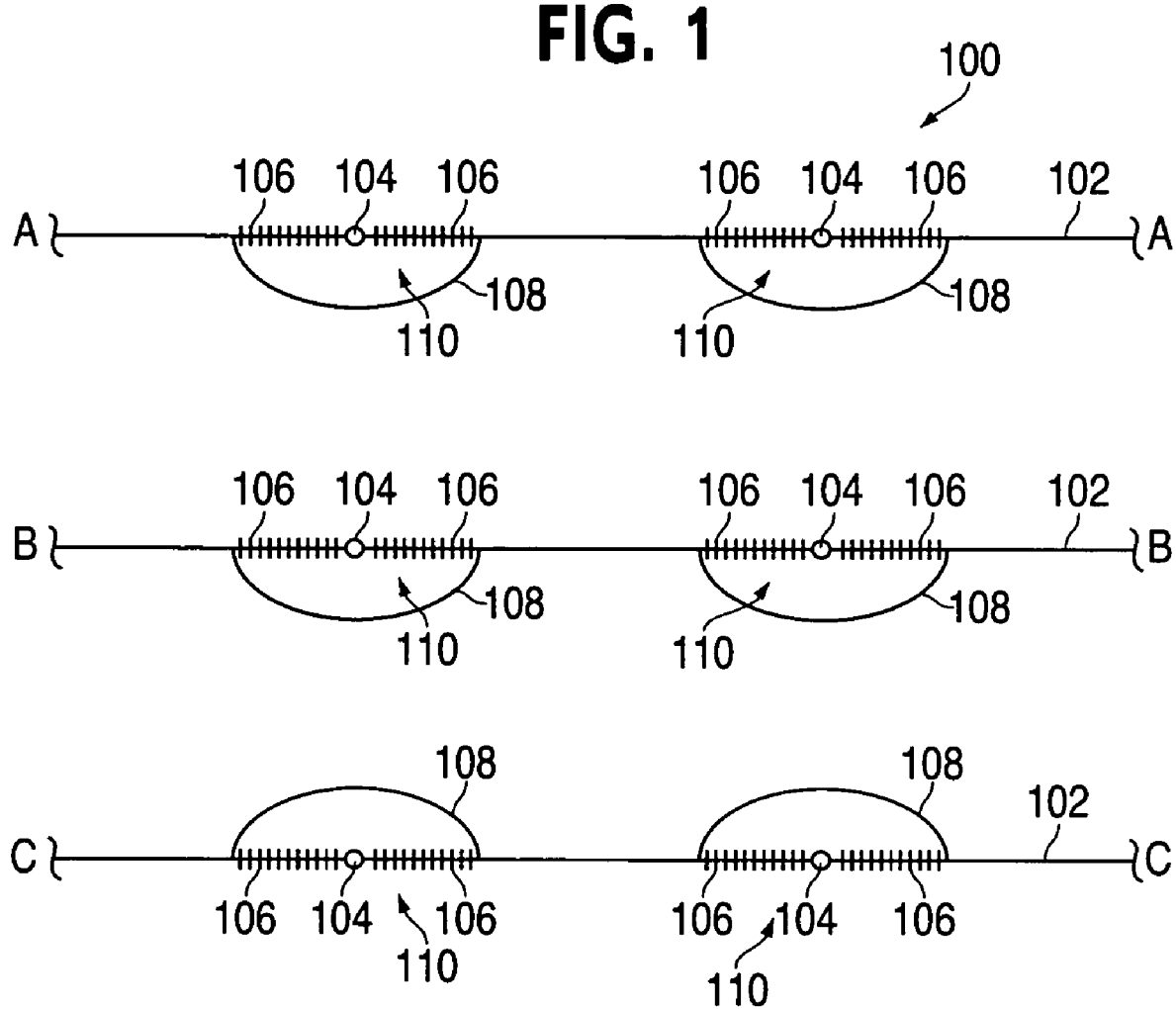
FIG. 1 is a schematic diagram illustrating a power transfer system for transferring power in three phases, one conductor being transferred per phase.

The invention will now be described with reference to the drawing figures, in which like reference numerals refer to like parts throughout. An embodiment in accordance with the present invention provides a system, method, and apparatus for replacing high voltage power transmission conductors without affecting power users or power suppliers by necessitating the power transmitted by the conductors to be shut off or diverted to other remote power transmissions systems.

Power delivery systems such as high voltage power lines often transport Alternating Current ("AC") power in a three phase configuration. Direct Current ("DC") power systems transfer power over two phases. Each phase is transferred over a separate conductor. For the purposes of this document each of the letters A, B, and C will represent one of three phases of a three phase AC system. The methods and apparatus described herein can be adapted for use in a DC system by applying the methods and apparatus described herein for the A and C phase for the two phases in the DC system. The application of the methods and apparatus may be applied to systems of generally any common voltage level. For example, systems of 44 kV or higher are contemplated within embodiments of the invention.

In accordance with the invention, a method for replacing conductors in a high voltage power delivery system includes one of two embodiments or a combination of the two embodiments. In one embodiment of the invention, a new conductor referred to herein as "D phase" conductor is strung along an existing system. The new D phase conductor may be supported by new support structure that may be permanent or temporary. Once the new D phase conductor is in place, the power load is transferred from one existing conductor to the new D phase conductor. The old conductor is then removed. Depending on a particular application, the re-conducting of that phase may be complete at this point, or the removed conductor may be replaced and power load is then transferred from the D phase conductor back to the new conductor. This process may be repeated for the conductors of the other phases. If no longer needed, the D phase conductor may then be removed.

In a second embodiment of the invention, a conductor is moved to a temporary position, a new conductor is then strung in or near the old conductor's original position and the power load is transferred from the old conductor to the new conductor. The old conductors (in their temporary positions) are then removed.

Combinations of these two methods may be used in accordance with some embodiments of the invention. For example, a multiphase system will have a conductor (or in some cases more then one conductor strung together if the phase load is too great for just one conductor) for each phase. When replacing multiple conductors in a multiphase system, depending on the circumstances of a particular system, each phase's conductor may be replaced using the same or different methods according to the invention. For example, an A phase conductor may have its power transferred to another conductor (currently not carrying a load, this conductor may be a newly strung D phase conductor or an existing system conductor that has previously had its power load already transferred to another conductor) while the old A phase conductor is taken down and replaced. Once a new A phase conductor is installed, then the load is transferred back to the newly replaced A phase conductor. In the same system, the existing C phase conductor may simply be moved to a new location, while a new replacement C phase conductor is strung into the system. Once the new C phase conductor is strung, the power load from the old C phase conductor is transferred to the new C phase conductor.

In another embodiment of the invention, a new D phase conductor may be strung in the system, the power load from one of the other phases, for example, C phase power load may be transferred to the D phase conductor. The B phase power load may then be transferred to the old C phase conductor. The A phase load can then be transferred to the old B phase conductor. The old A phase conductor may then be removed. These examples of combining techniques for replacing conductors in a system is meant to be exemplary not exhaustive of combinations of techniques used to in accordance with the invention.

FIGS. 1 through 26 generally show, in schematic, a power transfer system 100 at various stages of undergoing a method in accordance with one embodiment of the invention of allowing the section of a conductor to be electrically isolated from the system power in order to be worked on (which often is replacement of the conductor, but could include maintenance of the conductor including replacement of insulators or the resagging of the conductor) without disrupting the transmission of power to downstream power customers.

The method, in some embodiments of the invention, includes constructing a section of temporary conductor (D phase), diverting the power from a section located between dead ends of one of the A, B, or C phase conductors onto the temporary conductor (D) then isolating a section of the conductor of the phase from which power has been diverted. The section of conductor that is isolated is then is worked on or replaced. In some embodiments of the invention, there may be miles between dead ends, if the distance between the dead ends is too great for pulling new conductors through the system 100, then new or temporary dead ends may be constructed as described later herein.

As mentioned, any combination of the different embodiments may be applied to a single system, depending on what embodiment is deemed best for a particular phase in a particular system. The installation of a D phase conductor and the process of transferring the power load from one conductor to another conductor and the apparatus used to make the transfer of a power load from one conductor to another will now be described with reference to FIGS. 1-30.

FIG. 1 is a schematic diagram for power transfer system 100. The power transfer system 100 includes three conductors 102, labeled A, B and C indicating that each of the conductors 102 carries one of the A, B, and C phase load. The system 100 transfers power in the form of alternating current (AC). The conductors 102 are supported by a support structure 104. The support structure 104 may include or be in the form of a power pole or a tower. (See, for example, FIGS. 55 and 56.) A conductor 102 is attached to the support structure 104 referred to as a dead end via an insulator in tension 106. When the insulator 106 is in line with the conductor 102 and is under tension with the conductor 102, such a configuration is called a dead end 110. A jumper 108 as shown in FIG. 1, electrically connects the conductor 102 around the insulator 106 and support structure 104 to another conductor 102 section located on the other side of the dead end 110. Another way conductor 102 may be supported by support structure 104 is shown for example in FIG. 53. The conductor 102 hangs from the insulator 116 and the insulator 116 is supporting the conductor tension, but is supporting the weight of the conductor 102. This type of insulator is called a tangent insulator 116. When the conductor weight 102 is being supported by the insulator 116, jumpers 108 are not needed.

Figure 54:
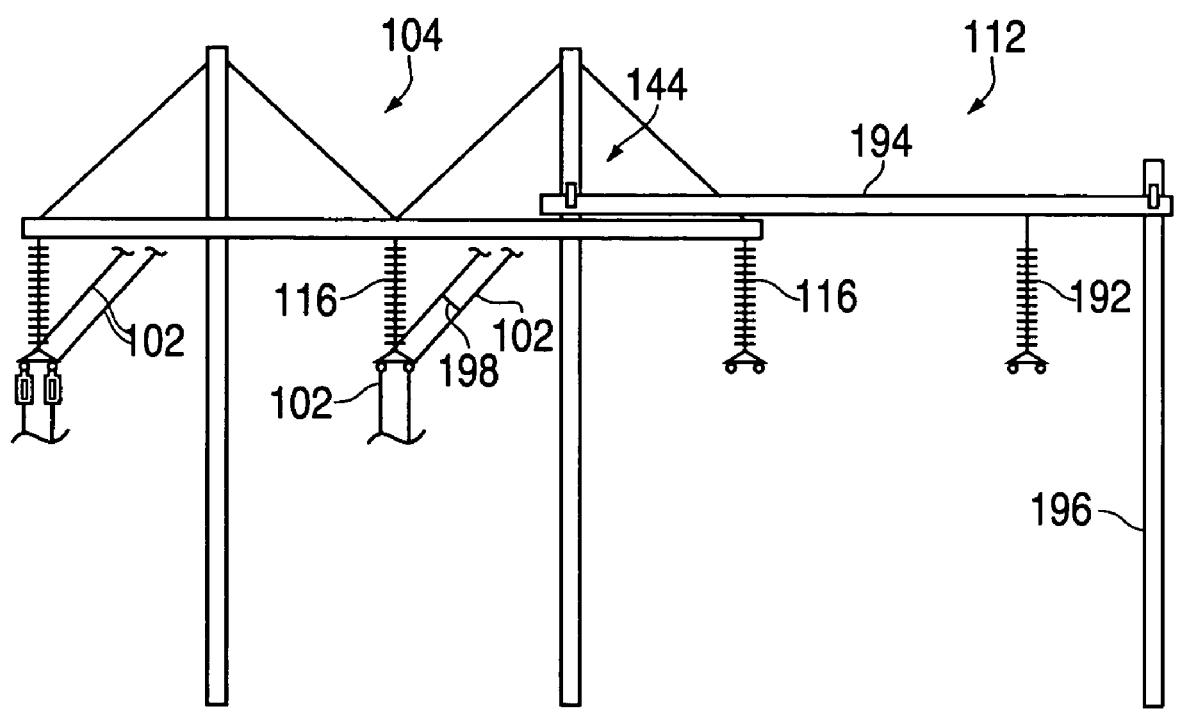
FIG. 54 is a side view of a support structure for a power transfer system showing a temporary support structure attached to a permanent support structure and insulators configured to carry double conductors (two conductors per phase).

In order to provide support for new conductors 114 that will be strung in the system 100, a new support structure 112 is used in some embodiments of the invention. FIG. 2 shows the installation of the new support structure 112 near the existing support structure 104. The new support structure 112, will support the new conductors 114. The new support structure 112 may be located adjacent the existing support structure 104 or if the new support structure 114 is to be temporary, the new support structure 114 may be connected to the support structure 104 as shown in FIG. 54, for example.

Figure 3:
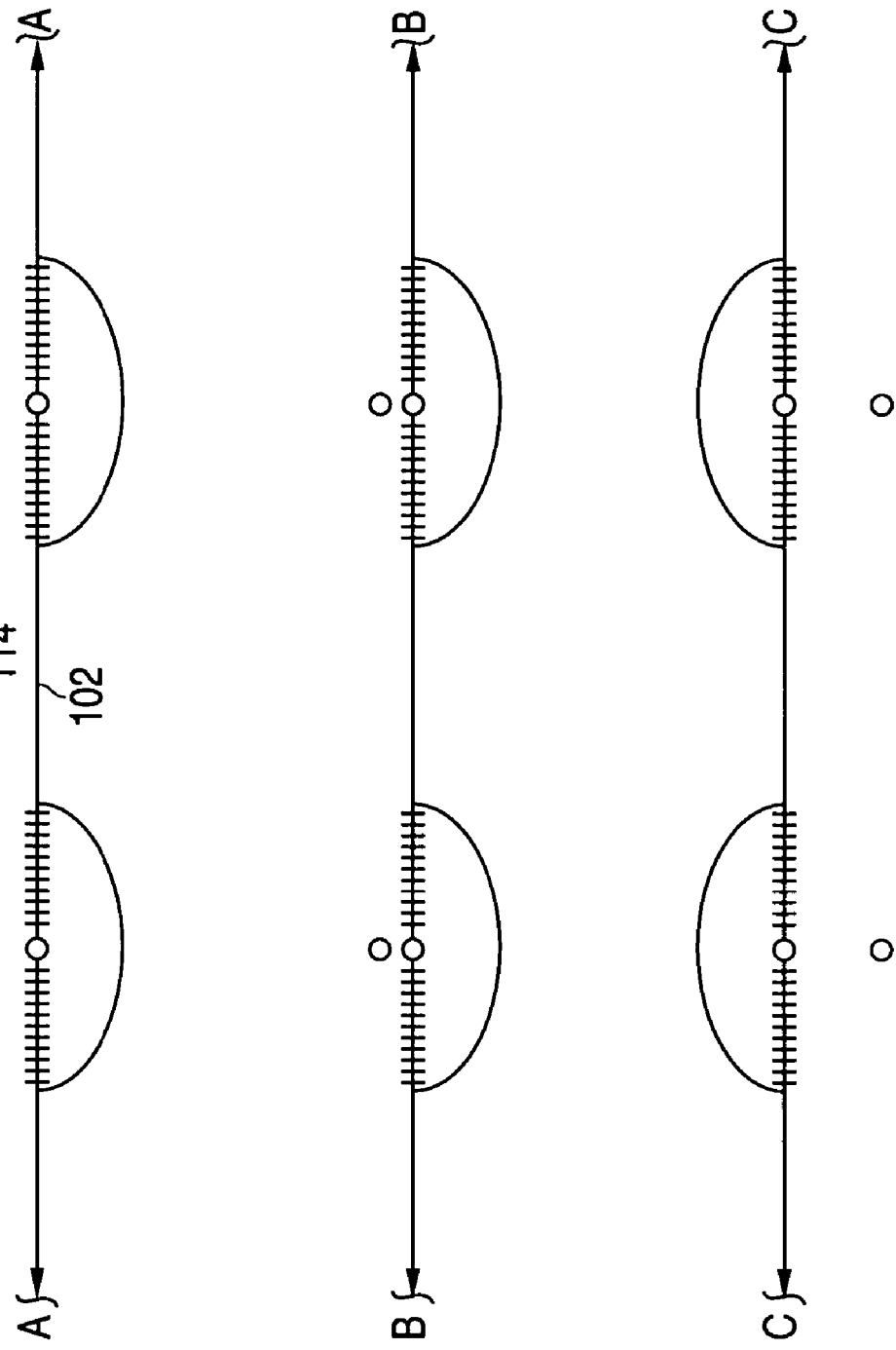
FIG. 3 is a schematic diagram illustrating the power transfer system of FIG. 2 showing new conductor installed between new dead end structures.

FIG. 3 shows the installation of a new conductor 114 for the D phase near the A phase conductor 102. The new conductor 114 is being located between two dead ends 110. The new conductor 114 is attached to the new support structure 112 by insulators 106 or 116.

Once the new conductor 114 is in place, the power load is transferred from one of the existing conductors 102 of one of the A, B, or C phase conductors 102 to the new conductor 114 on the D phase line. In the example illustrated in FIGS. 1-14, the C phase load will be transferred to the D phase conductor 114. One way to accomplish the power transfer is with a temporarily installed right angle transfer buss 118.

Figure 4:
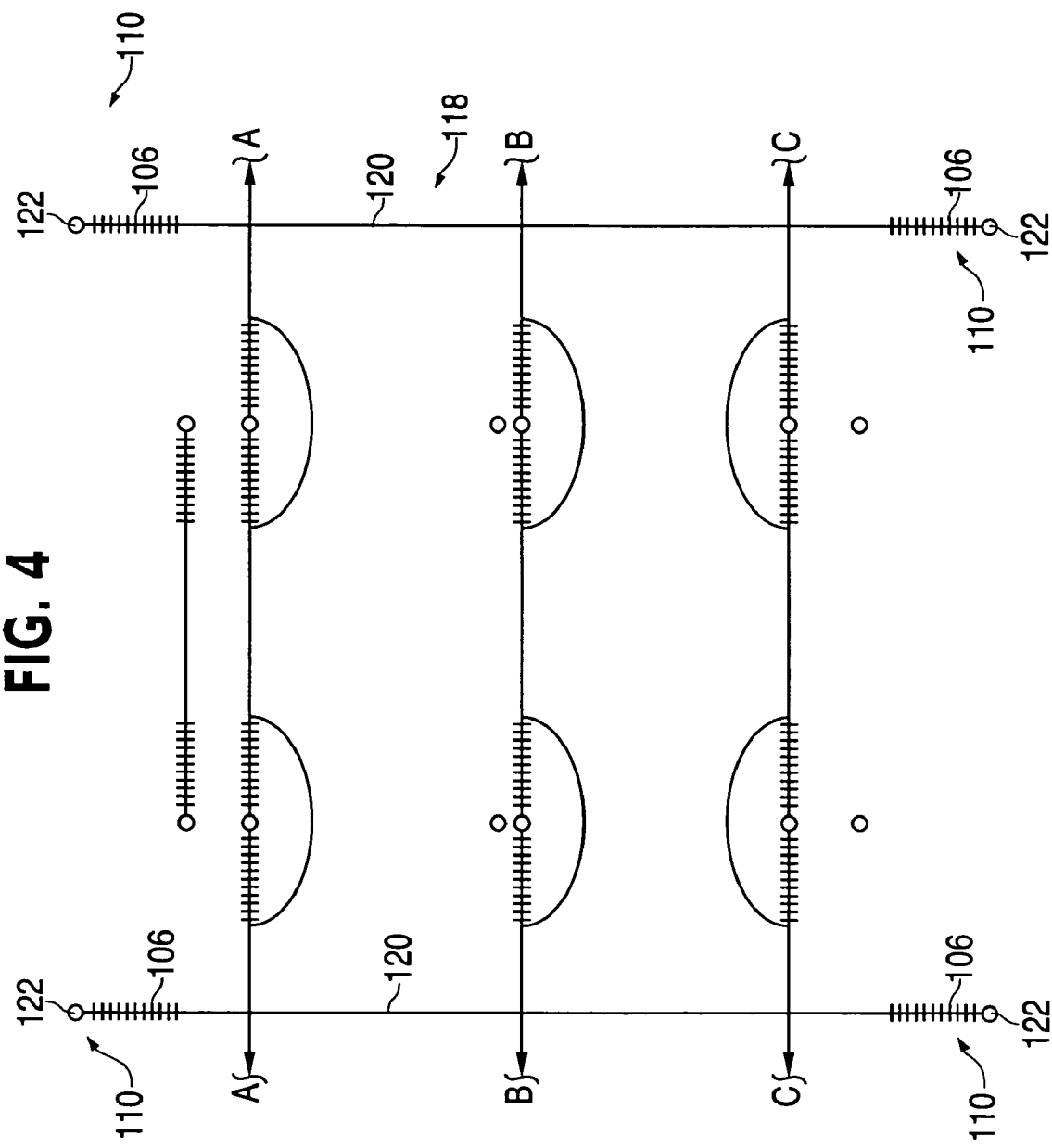
FIG. 4 is a schematic diagram illustrating the power transfer system of FIG. 3 showing temporary transfer busses partially installed.
Figure 5:
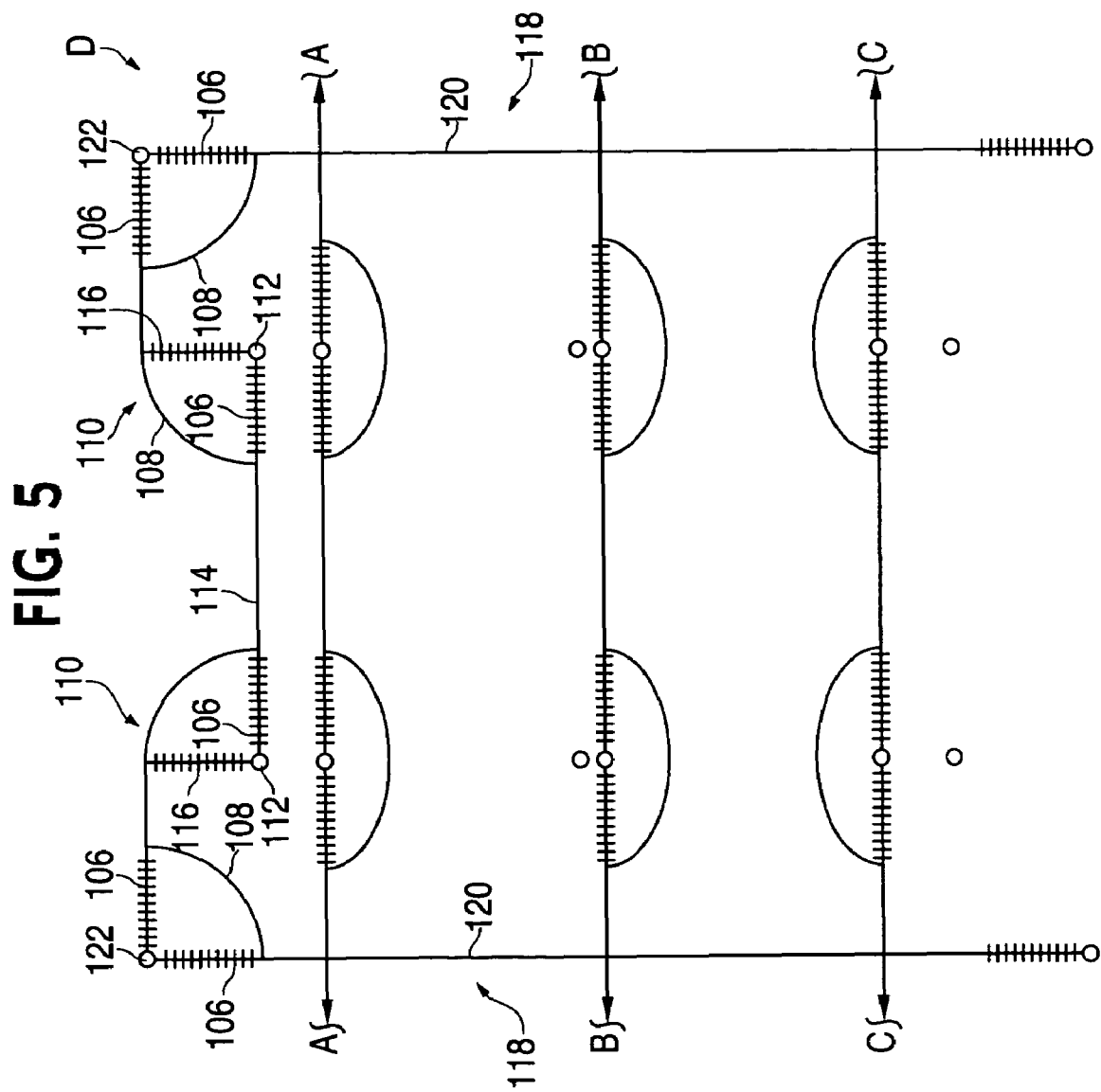
FIG. 5 is a schematic diagram illustrating the power transfer system of FIG. 4 showing the temporary transfer busses electrically connected to the new conductor strung between the new dead end structures.

FIG. 4 shows two temporary transfer busses 118 constructed of conductors 120, insulators 106, 116 and support structure 112. The transfer buss 118 may include a wire conductor 120 suspended between its support structures 110, or may be made of a rigid conductor. While sections of the transfer buss 118 are shown to cross the conductors 102 of the A, B, and C phase, no electrical connection is made unless specifically stated. (The transfer buss may merely pass over or under the other conductors 102 when not in electrical contact with them). Jumpers 108 are used to connect the transfer buss 118 to the D phase conductor 114. (See FIG. 5).

Once the temporary transfer buss 118 is in place, the power load is transferred from the conductor 102 of the C phase line onto the D phase conductor 114 over the course of several steps. The D phase conductor 114 is then electrically connected to the C phase conductor 102 by connecting the C phase to the transfer buss 118. This connection 126 is shown by a dot 126 in FIG. 6. Because the C phase conductor 102 is energized, making and breaking the electrical connection between the C and D phase conductors 102, 114 is done with special equipment, depending on the voltage of the conductor 102 and mass of the conductor 114 to be connected to the energized conductor 102. A jumper hot sticks, and in some cases a switch, or a circuit breaker is used as part of the transfer buss 118 and will be described in more detail later below.

Figure 6:
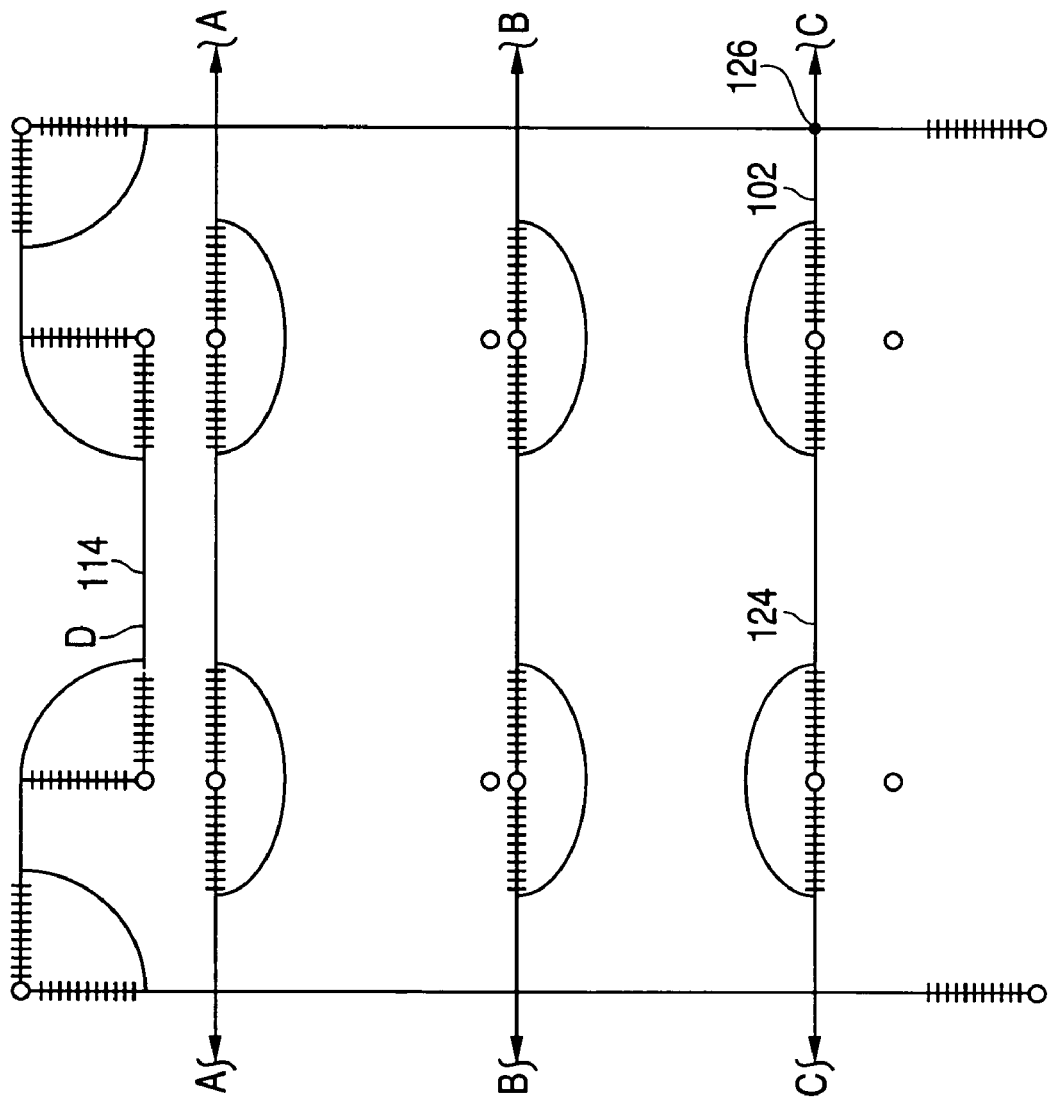
FIG. 6 is a schematic diagram illustrating the power transfer system of FIG. 5 showing a new conductor, D phase, electrically connected to the C phase conductor.

FIG. 6 shows the D phase conductor in electrically connected to the C phase conductor via a connection 126. Once the electrical connection at 126 is made, the D phase conductor is at the same potential as the C phase conductor. Because the D phase layout shown in FIG. 6 is connected to the C phase at only one location, current is flowing only over the C phase conductors 102, 124. The D phase conductor 114 at this point has the same electrical potential as the C phase conductors 102, 124, but the D phase conductor 114 does not transport power at this point. In other words, no current is flowing through the D phase conductor 114.

Figure 7:
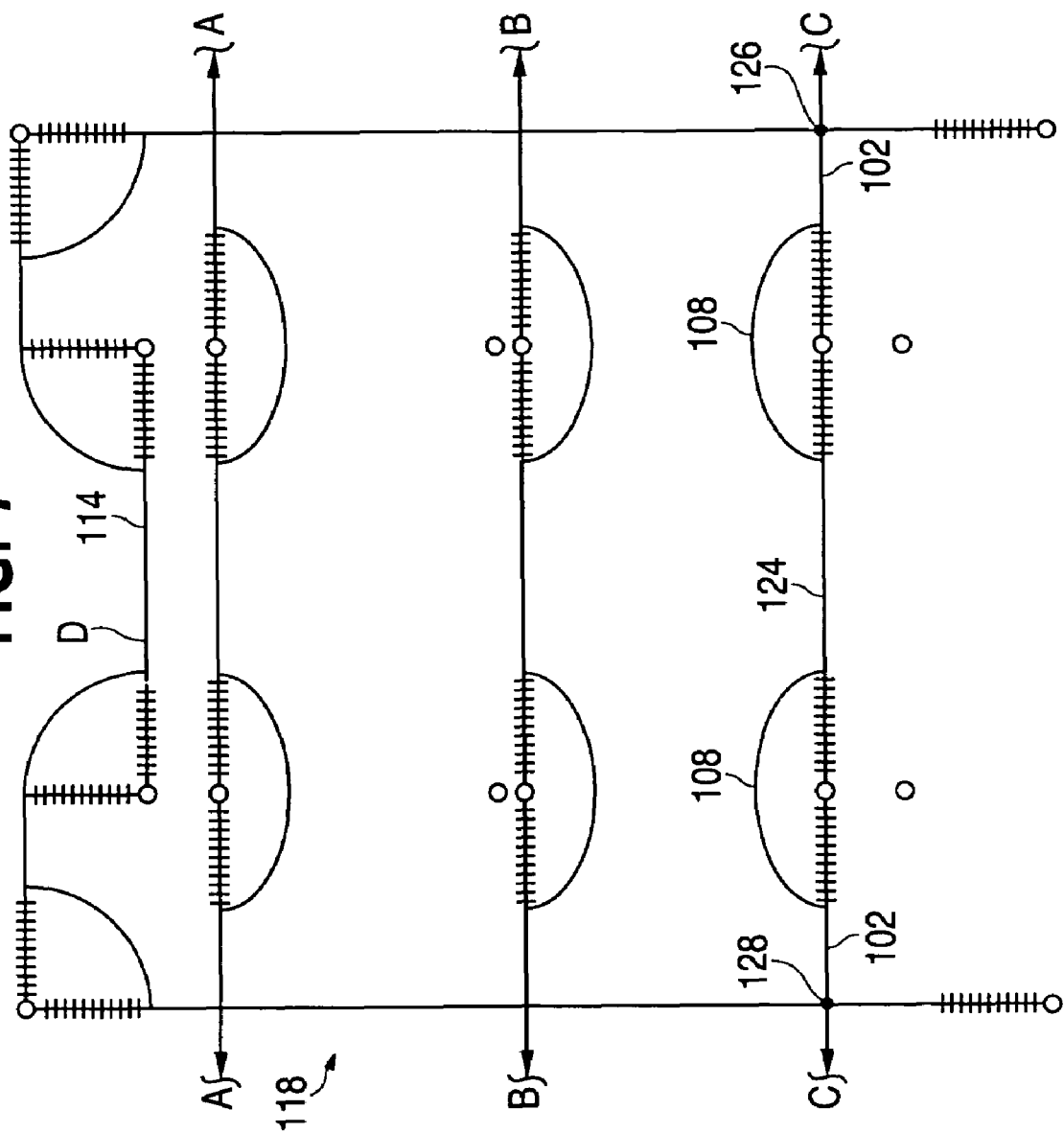
FIG. 7 is a schematic diagram illustrating the power transfer system of FIG. 6 where the D phase conductor is connected in parallel to the C phase conductor.

In order for current to flow through the D phase conductor 114, a second connection 128 as shown in FIG. 7 is made between the D phase and the C phase conductors 102, 114 via a transfer buss 118. While the connections at 126 and 128 are schematically represented by a dot, the connections at 126 and 128 can be accomplished by installing a jumper to connect the C phase conductor 102 with the transfer buss 118. If the voltage of phase being connected and the mass of the D phase conductor are great enough, making the connections 126 and 128 may involve a switch or circuit breaker as part of the transfer buss 118 as described in more detail later below.

FIG. 7 shows a second connection 128, connecting the D phase conductor 114 to the C phase conductor 102. Now that the D phase conductor 114 is connected to the C phase conductor 102 at two places, 126 and 128, a parallel path is made for the C phase current to flow either through the original C phase conductor 124 and the alternate D phase conductor 114. Thus, current now flows through both the C and D phase conductors 114, 124.

Figure 8:
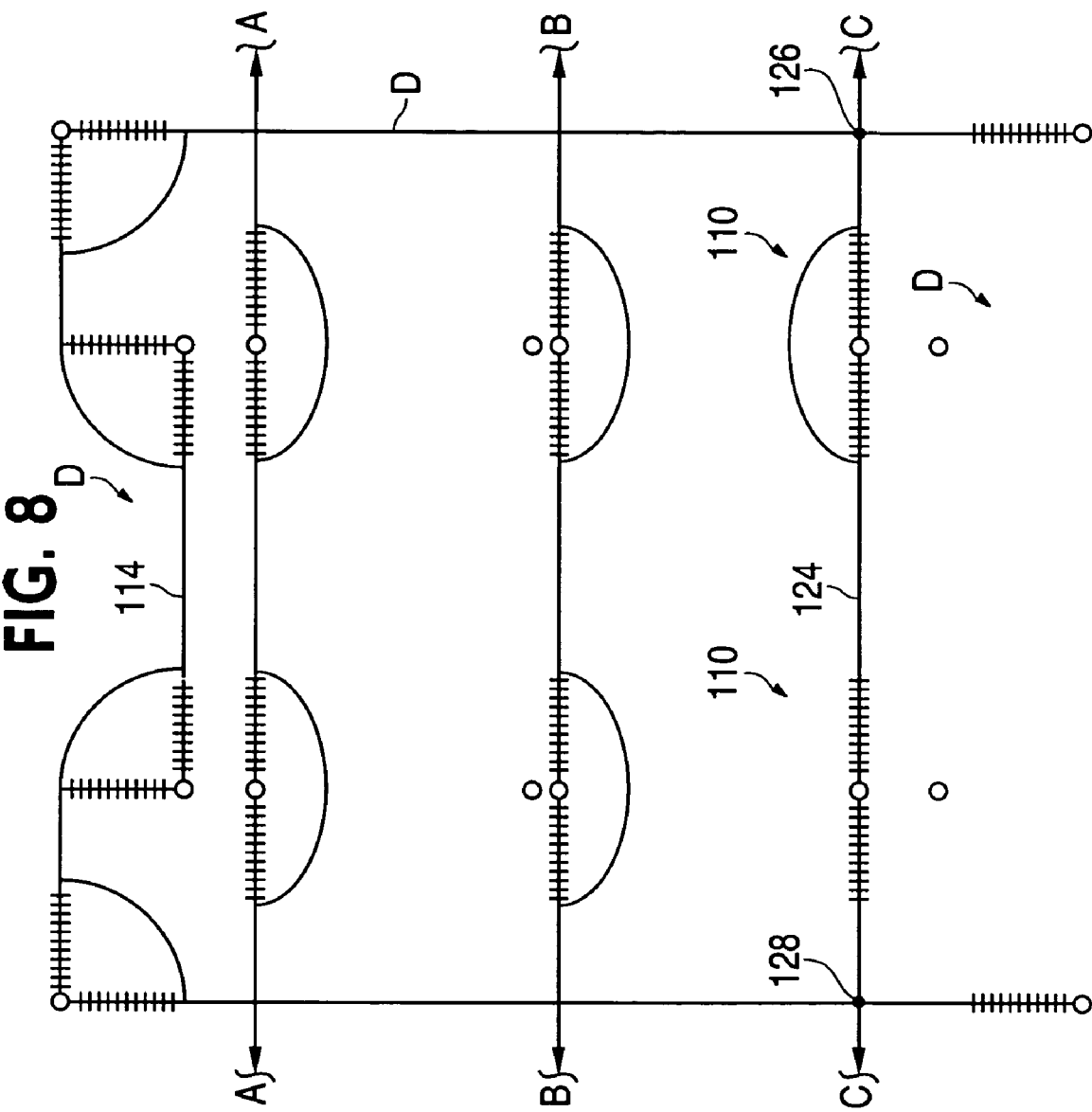
FIG. 8 is a schematic diagram illustrating the power transfer system of FIG. 7. showing a jumper removed from a dead end on the C phase conductor breaking parallel with the D phase conductor.

A jumper 108 is removed from around one dead end 110 on the C phase conductor 124 as shown in FIG. 8. The removal of the jumper 108 can, if the voltage and/or the mass of the conductor 124 is low enough, be removed by using hot sticks. If the voltage and/or mass of the conductor 124 are too high, other means of breaking the connection around the dead end 110 may be used which may include a switch or circuit breaker described in more detail later below. The effect of removing one of the jumpers 108 is that the current no longer flows through the conductor 124 of the C phase located between the dead ends 110. All of the C phase current now flows through the D phase conductor 114 rather than conductor 124. Because of the connection at 126, the voltage potential between the C phase conductor 124 and the D phase conductor 114 is the same.

Figure 9:
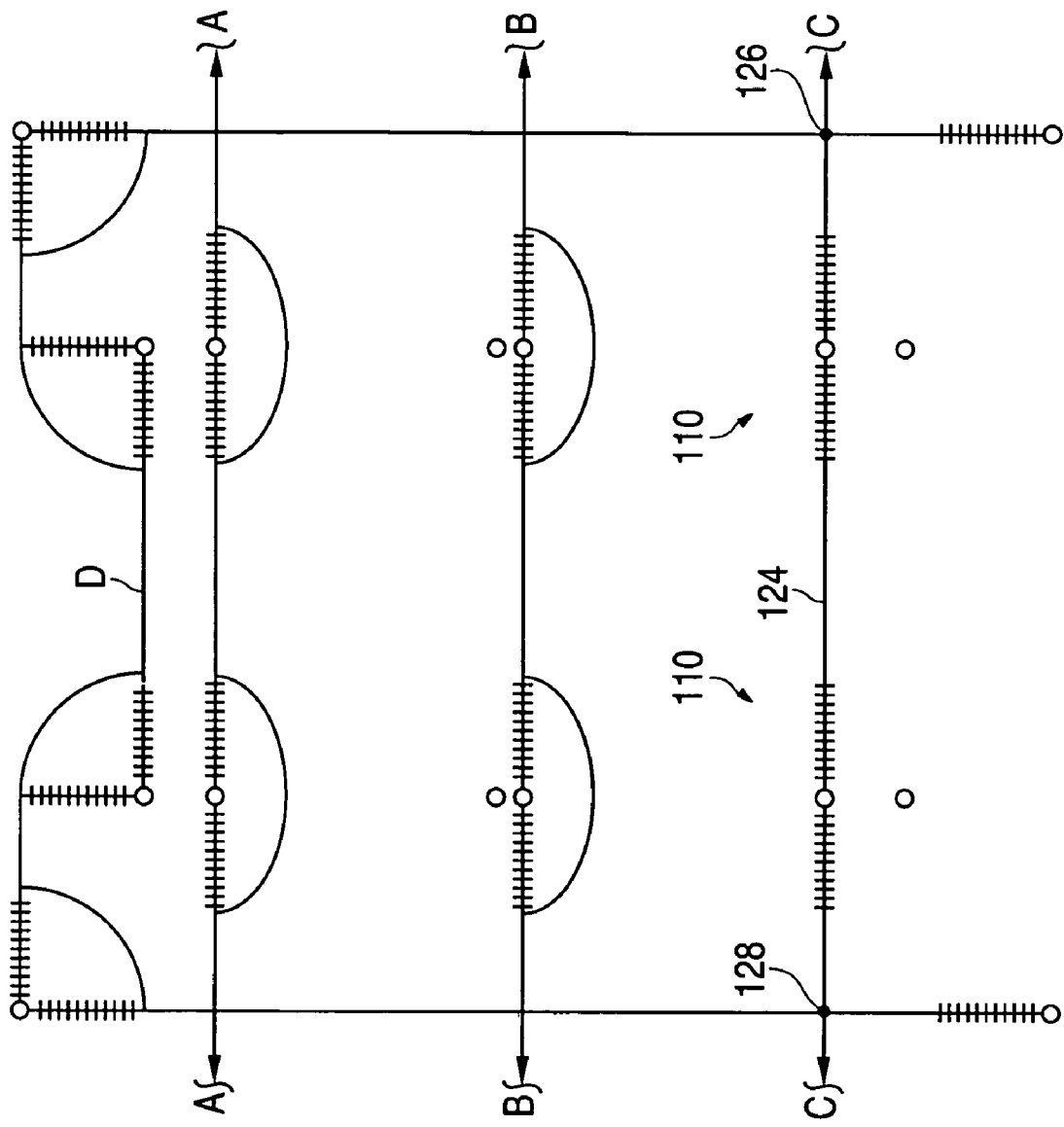
FIG. 9 is a schematic diagram illustrating the power transfer system of FIG. 8 showing the old C phase conductor isolated.

To electrically isolate the section 124 of the C phase conductor, the second jumper 108 is removed from the C phase conductor 124 from around the dead end 110 as shown in FIG. 9. The removal of the jumper 108 can, if the voltage and/or the mass of the conductor 124 is low enough, be removed by using hot sticks. If the voltage and/or mass of the conductor (space) 124 is too high, other means of breaking the connection around the dead end 110 may be used which may include a switch or circuit breaker described in more detail later below.

The section 124 between the dead ends 110 is now isolated from all C phase potential by both dead ends 110. All current formerly carried by the original C phase conductor 124 now travels through the D phase conductor 114. The isolated section 124 of the C phase conductor may be broken, worked on, or replaced without disrupting downstream power delivery. It is important to note the section 124 of the C phase conductor that is isolated from the system 100 power load is not void of potential. The isolated section 124 of C phase conductor is, and should be treated as, a live conductor. The isolated C phase conductor 124 is subject to induced currents and may still have a large potential with respect to ground.

Figure 10:
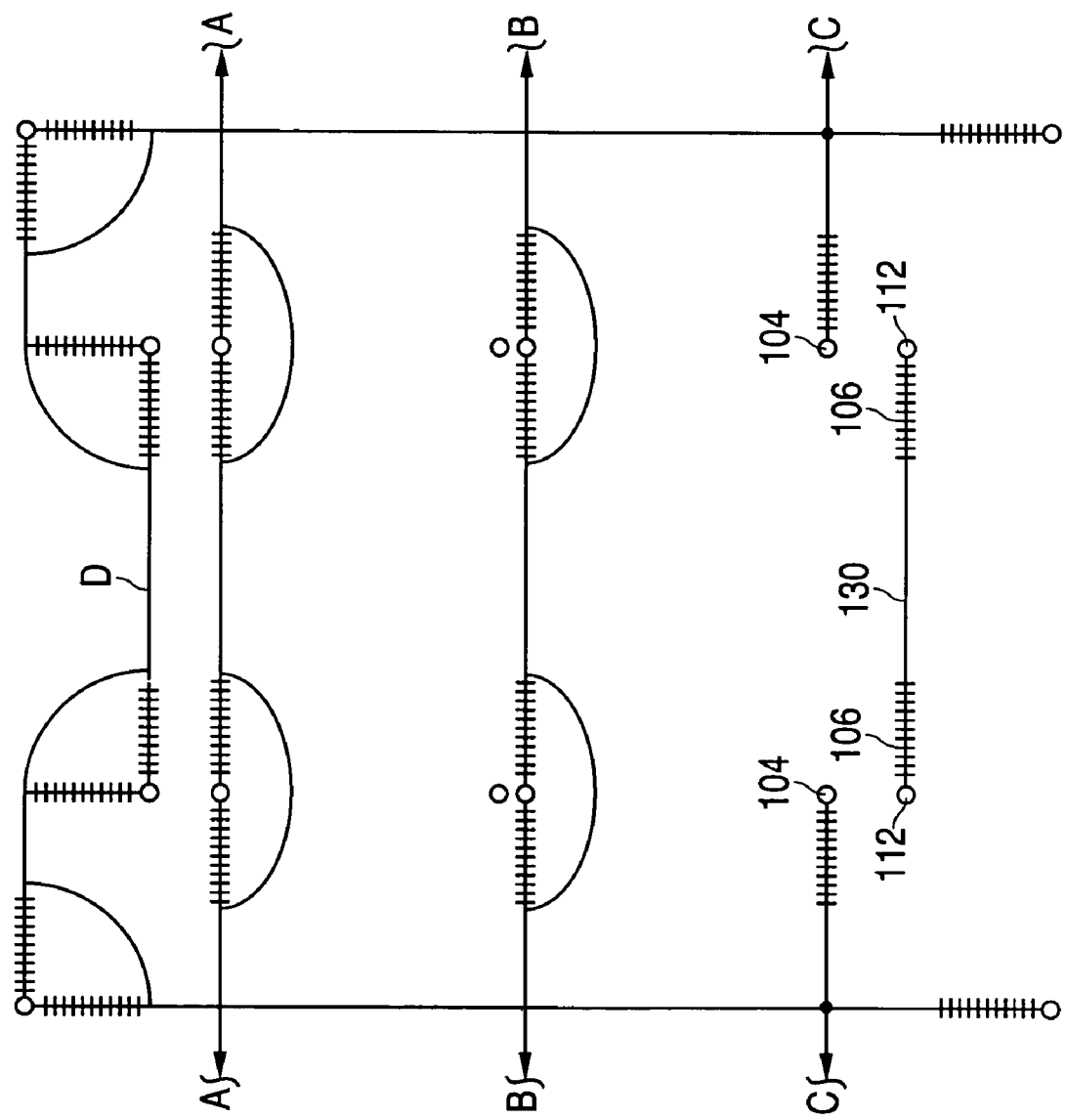
FIG. 10 is a schematic diagram illustrating the power transfer system of FIG. 9 showing a new segment of conductor being strung between the two new dead ends on the C phase conductor.

As shown in FIG. 10, the old conductor 124 is removed, and a new conductor 130, with insulators 106 is installed onto the new support structure 112. In some embodiments of the invention, the original C phase line is not removed but is rather worked on in other ways such as replacing an insulator 106. One skilled in the art can appreciate that other types of work can be done on the isolated section 124 of conductor in accordance with the invention.

Figure 11:
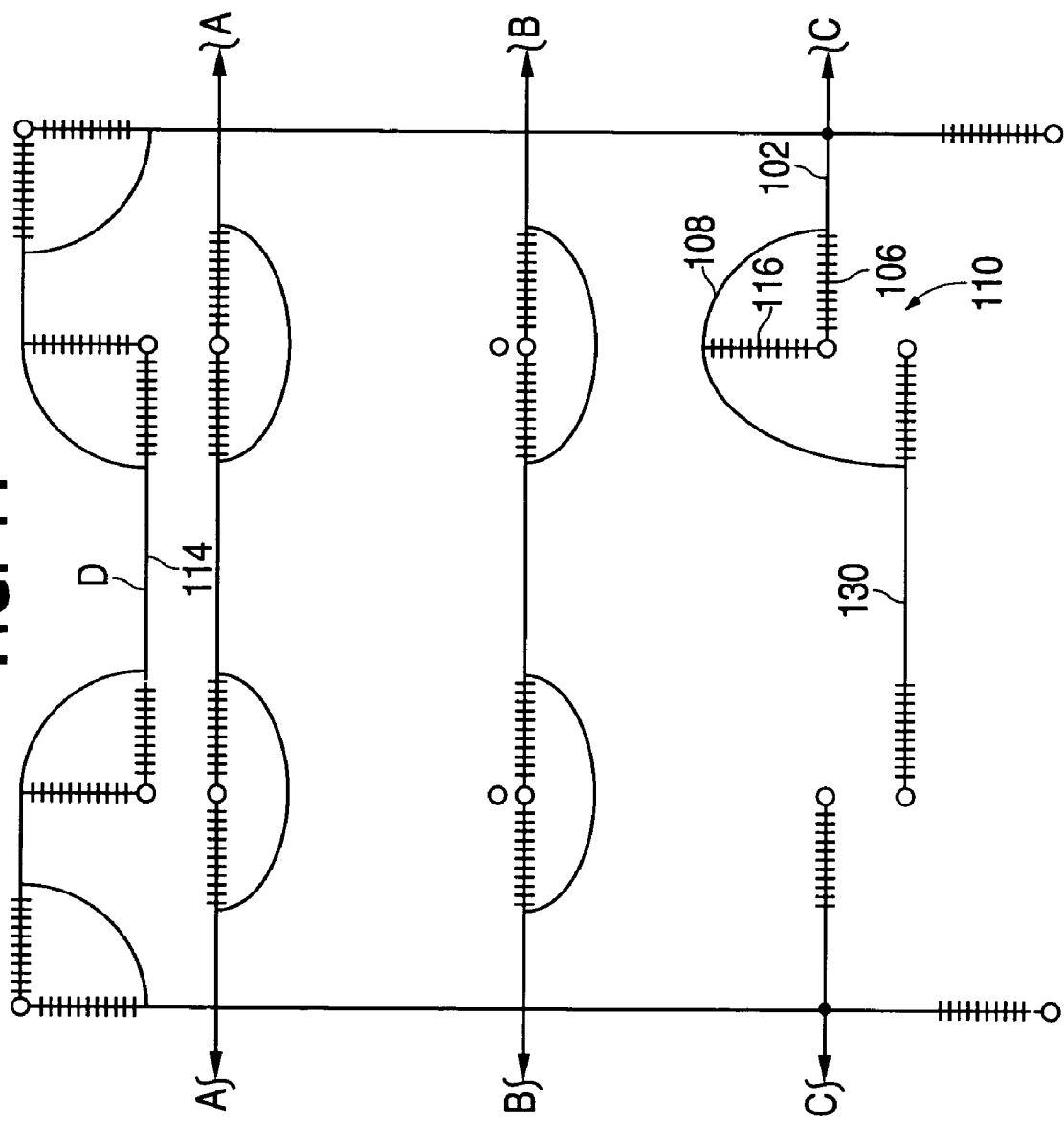
FIG. 11 is a schematic diagram illustrating the power transfer system of FIG. 10 showing installation of a jumper connecting the newly strung conductor connected to the C phase conductor.

Once the isolated section 124 of conductor has been replaced and is ready to carry the C phase power, a process shown in FIGS. 11-14 and described below may be used in accordance with the invention to restore power to the new C phase conductor 130. A jumper 108 is connected to the C phase conductor 102 to form a connection around the dead end 110 as shown in FIG. 11 The connection of the jumper 108 can, if the voltage and/or the mass of the conductor 130 is low enough, be done by using hot sticks. If the voltage and/or mass of the conductor 130 load is too high, other means of making the connection may be used which may include a switch or circuit breaker described in more detail later below. At this point, the new C phase conductor 130 is at the same electrical potential as the D phase conductor 114 but is not carrying any load.

Figure 12:
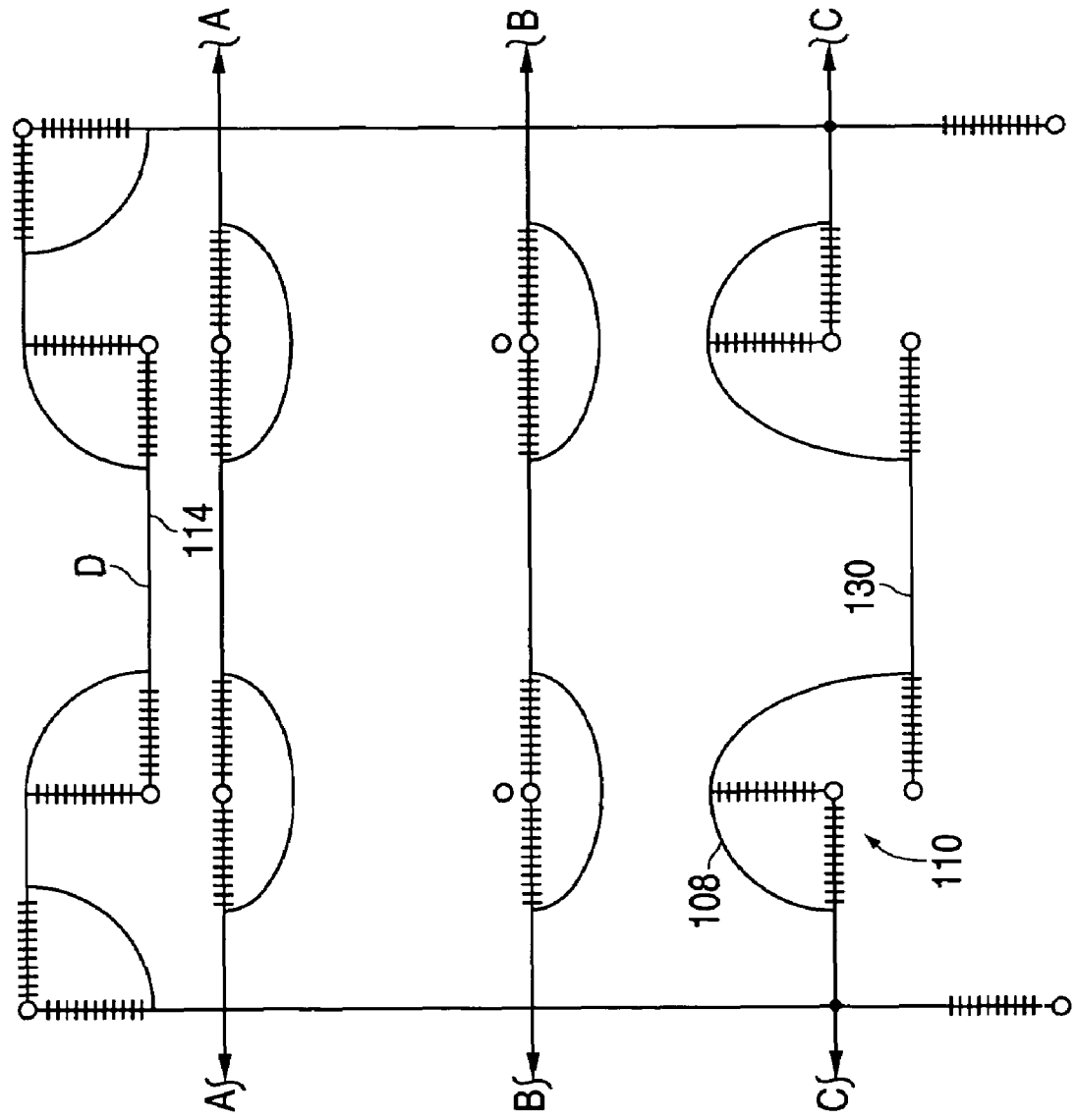
FIG. 12 is a schematic diagram illustrating the power transfer system of FIG. 11 showing a second jumper connecting the newly strung conductor connected to the C conductor paralleling C phase and D phase.

As shown in FIG. 12, a second jumper 108 connecting the section 130 of conductor around the second dead end 110 is installed. The connection of the jumper 108 can, if the voltage and/or the mass of the conductor 130 is low enough, be done by using hot sticks. If the voltage and/or mass of the conductor 130 load is too high, other means of making the connection may be used which may include a switch or circuit breaker described in more detail later below. The second jumper 108 allows C phase current to flow through the two parallel paths, the D phase conductor 114 and the C phase conductor 130. Thus current is now flowing through both the D and C phase conductors 114, 130.

Figure 13:
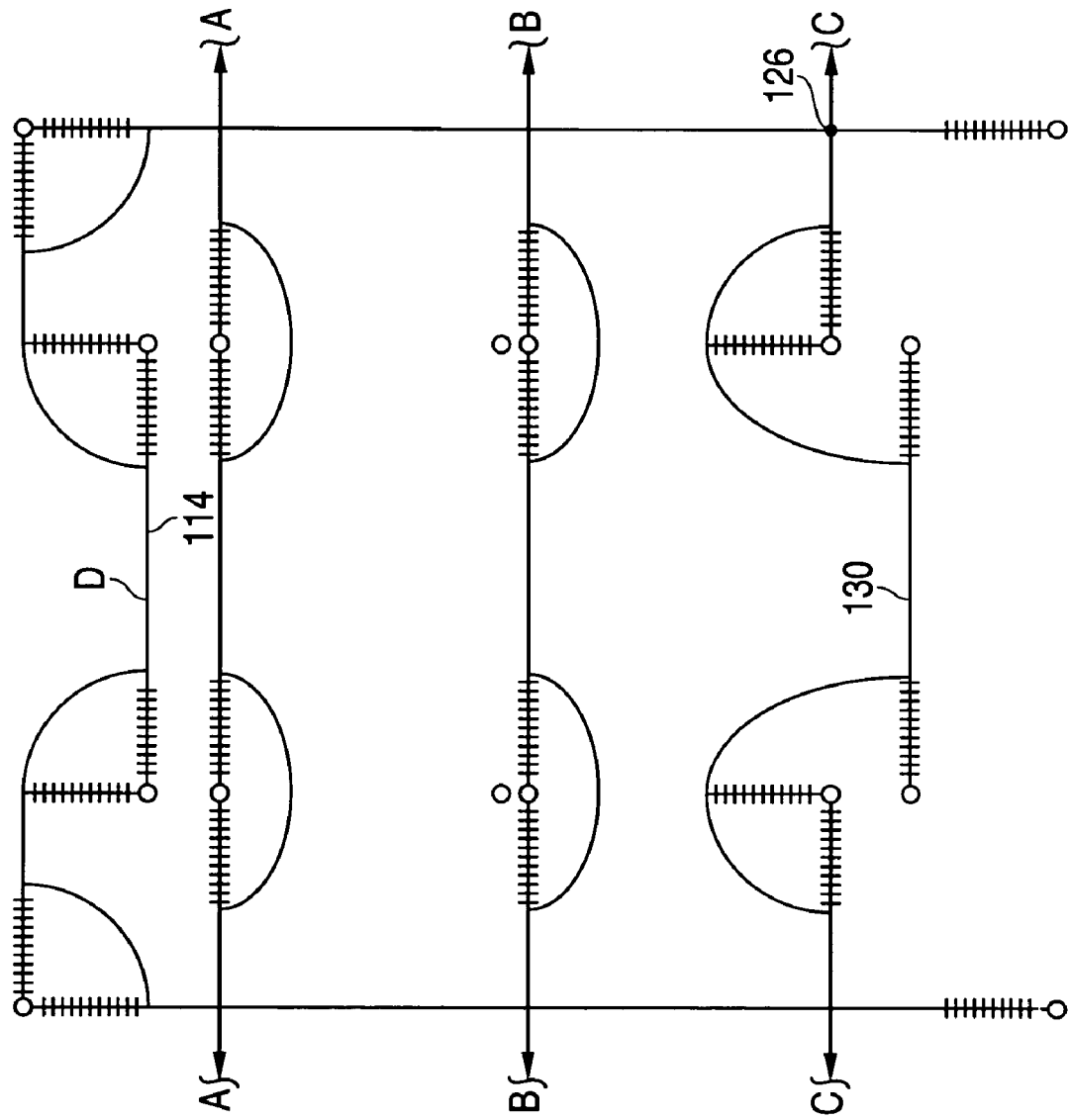
FIG. 13 is a schematic diagram illustrating the power transfer system of FIG. 12 showing one end of the D phase disconnected from the C phase conductor.

Next, the connection 128 is removed as shown in FIG. 13. The disconnection can, if the voltage and/or the mass of the conductor 114 is low enough, be done by using hot sticks. If the voltage and/or mass of the conductor 114 load is too high, other means of breaking the connection 128 may be used which may include a switch or circuit breaker described in more detail later below. Thus, the layout shown in FIG. 13 has only the connection 126 between the C phase conductor 130 and the D phase conductor 114. The D phase conductor 114 is now at the same potential as the C phase conductor 130, however, all current now flows through the C phase conductor 130, and no current now flows through the D phase conductor 114.

Figure 14:
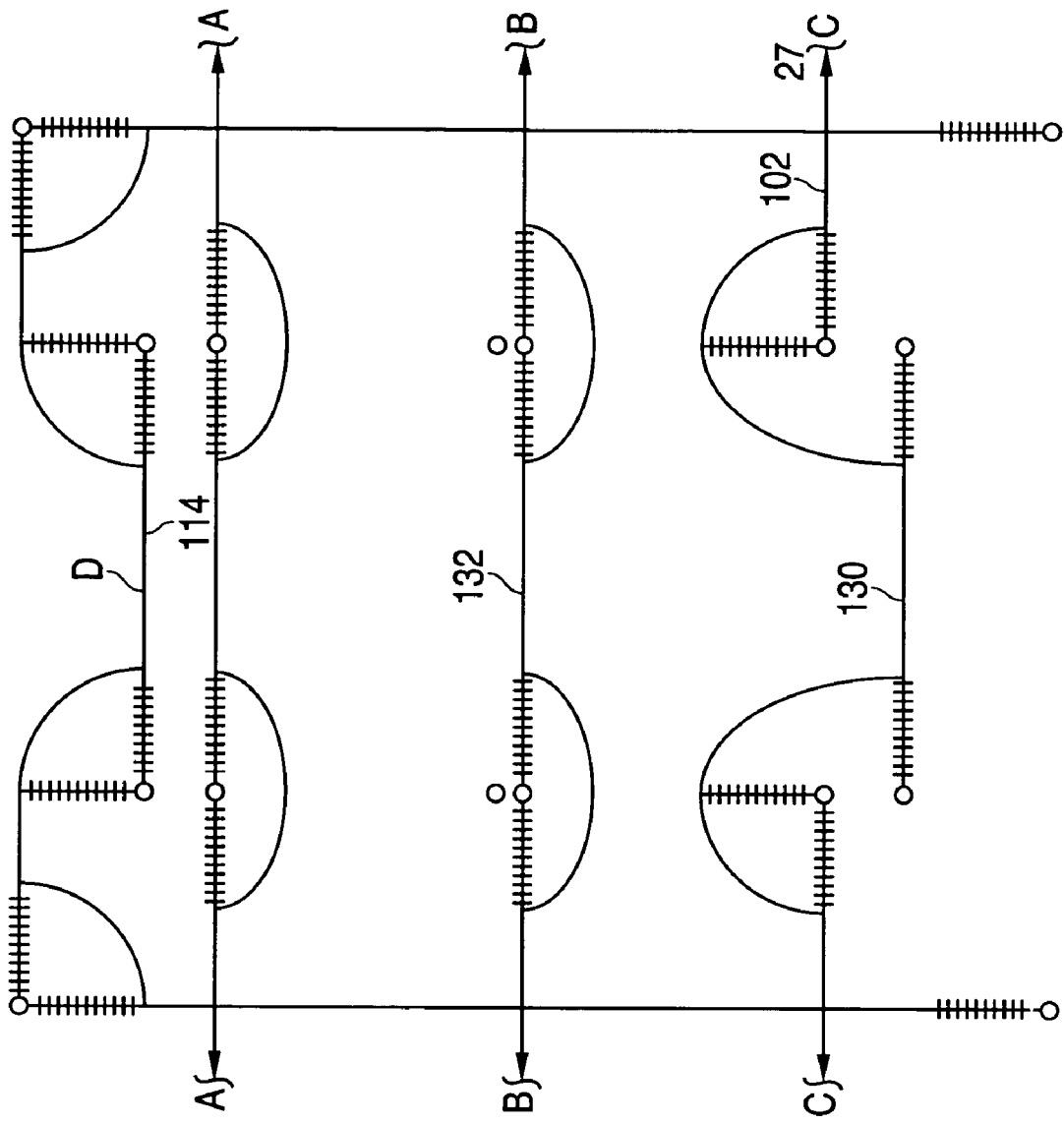
FIG. 14 is a schematic diagram illustrating the power transfer system of FIG. 13 showing the other end of the D phase disconnected from the C phase de-energizing and isolating D phase conductor.

Next, as shown in FIG. 14, the connection at 126 between the C phase conductor 102 and the D phase conductor 114 (via the transfer buss 118) is removed, thus isolating the D phase conductor 114 (and transfer busses 118) from the C phase conductor 102, 130. The disconnection at 126 can, if the voltage and/or the mass of the conductor 114 is low enough, be done by using hot sticks. If the voltage and/or mass of the conductor 114 load is too high, other means of breaking the connection 128 may be used which may include a switch or circuit breaker described in more detail later below.

Figure 15:
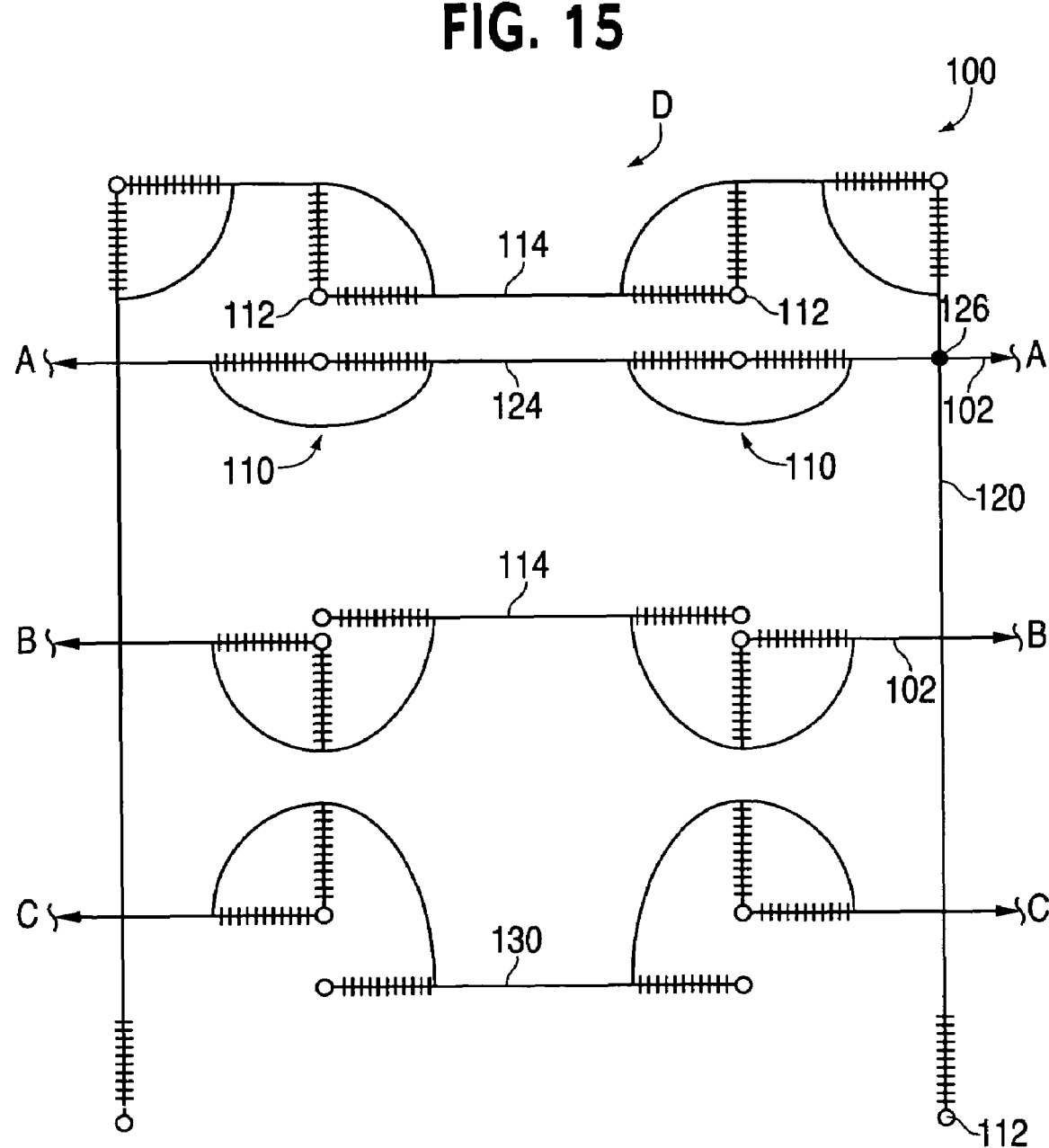
FIG. 15 is a schematic diagram of the system of FIG. 14 illustrating one end of the D phase conductor being connected to the A phase conductor.
Figure 16:
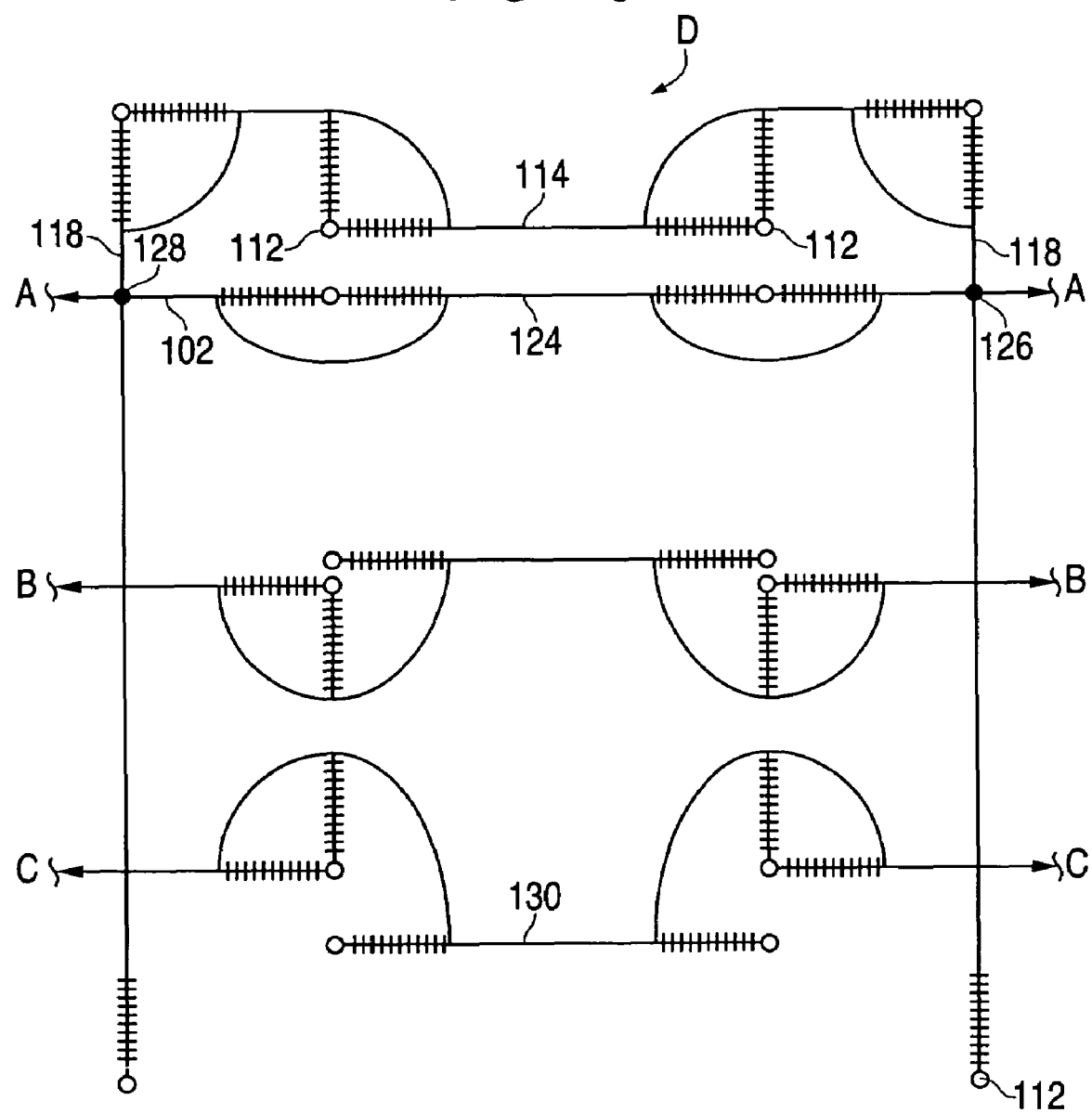
FIG. 16 is a schematic diagram of the system FIG. 15 illustrating the other end of the D phase conductor connected to the A phase conductor putting a section of the A phase conductor in parallel with the D phase conductor.

To replace the B phase conductor 132 located between dead ends 110 (see FIG. 14), the process described and shown with respect to C phase is basically repeated and applied to B phase and will not be repeated here. FIG. 15 shows a new B Phase conductor strung into a system 100.

In some embodiments of the invention, the process for replacing a live (energized) conductor with respect to A phase is also basically the same as was shown and described for C phase. However, sometimes the process for replacing the A phase conductor is modified in that the conductor used as the D phase conductor ends up being the new A phase conductor. FIGS. 15-26 show this process and will now be described.

Once the new support structure 112 and transfer buss 118 are in place, and connected to the new D phase conductor 114, a connection 126 is made between a conductor 120 on the transfer buss 118 and the A phase conductor 102. The connection 126 can, if the voltage and/or the mass of the conductor 114 is low enough, be done by using hot sticks. If the voltage and/or mass of the conductor 114 load is too high, other means of making the connection 126 may be used which may include a switch or circuit breaker described in more detail later below. The connection 126 is made outside the dead end 110 located at one end of the A phase conductor 124 that is to be isolated and replaced. Because the D phase conductor 114 is connected by one connection to the A phase conductor 102, the two conductors are at the same potential, but all current flows through the A phase conductors 102, 124.

A second connection 128 is now made between the D phase conductor 114 via the transfer buss 118 and the A phase conductor 102. (See FIG. 16). The connection 128 can, if the voltage and/or the mass of the conductor 114 is low enough, be done by using hot sticks. If the voltage and/or mass of the conductor 114 is too high, other means of making the connection 128 may be used which may include a switch or circuit breaker described in more detail later below. This second connection 128 now provides a parallel path for current to flow through both the D phase conductor 114 and the A phase conductors 102, 124.

Figure 17:
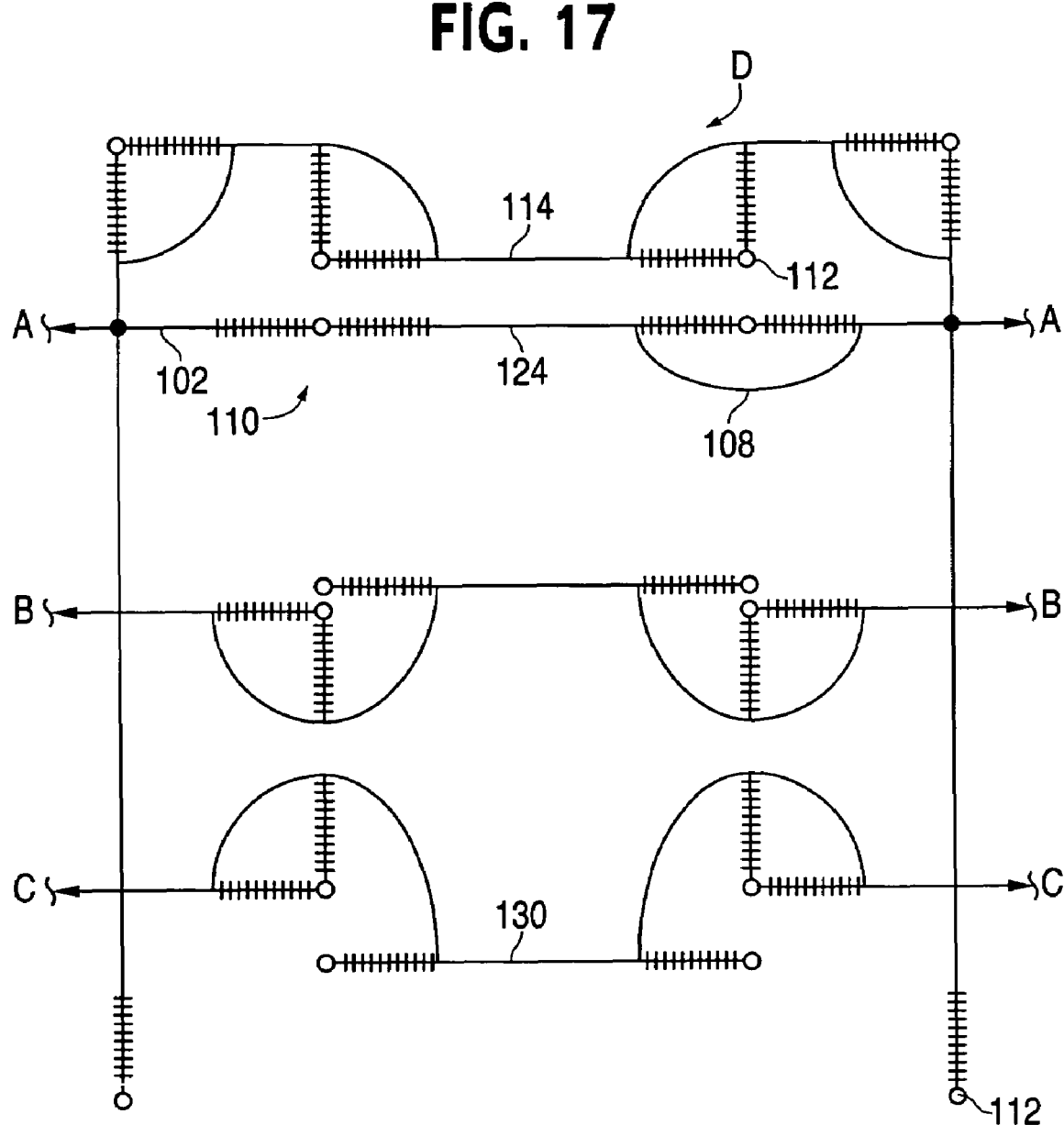
FIG. 17 is a schematic diagram illustrating the system of FIG. 16 illustrating a jumper being removed to break parallel of a the A phase conductor with the D phase conductor.
Figure 18:
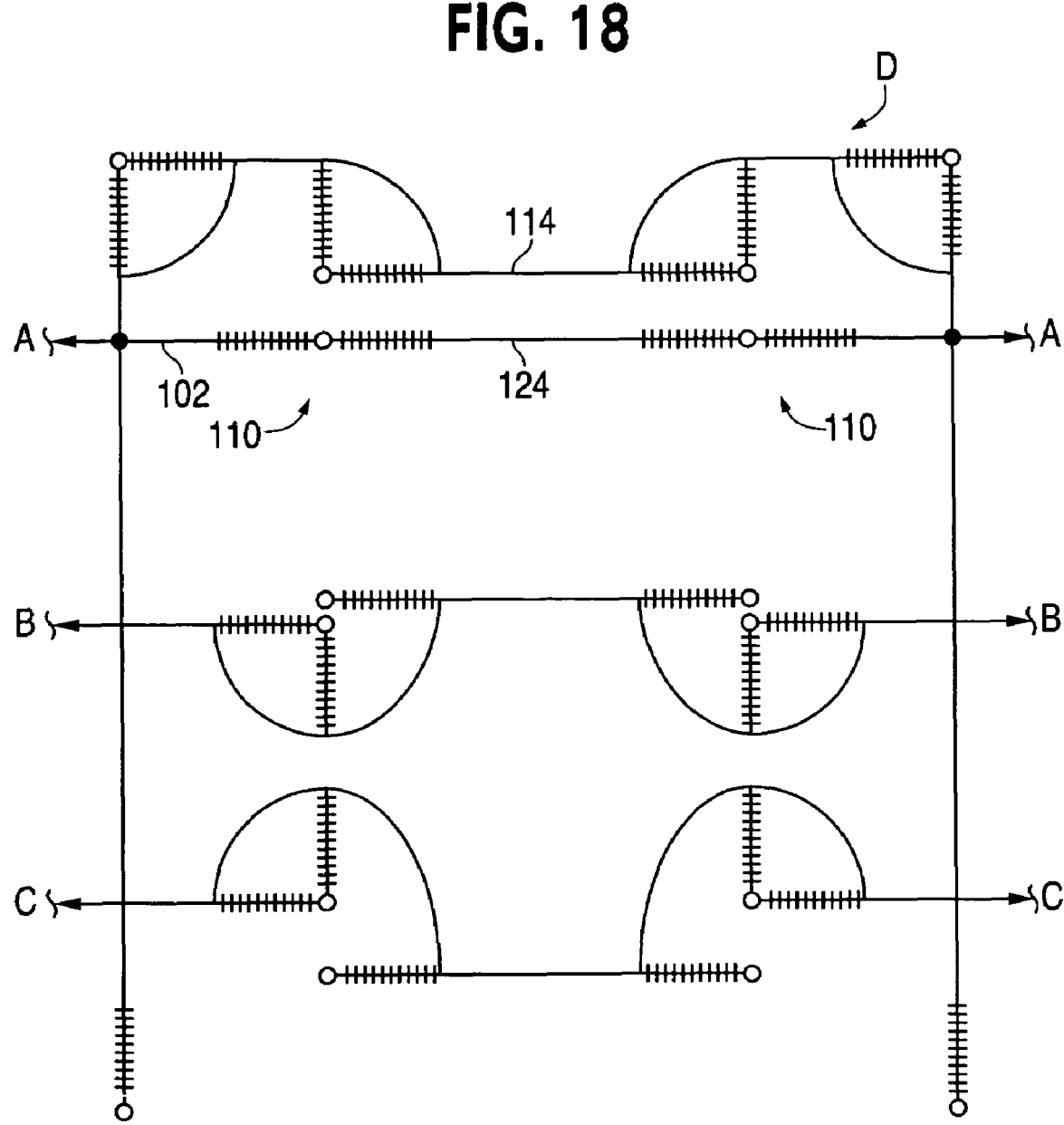
FIG. 18 is a schematic diagram illustrating the system of FIG. 17 illustrating a second jumper being removed isolating a section of A phase conductor.

A shown in FIG. 17, a jumper 108 is removed around a dead end 110 breaking the current path through conductor 124 of the A phase. The disconnection of the jumper 108 can, if the voltage and/or the mass of the conductor 124 is low enough, be done by using hot sticks. If the voltage and/or mass of the conductor 124 is too high, other means of breaking the connection of the jumper 108 may be used which may include a switch or circuit breaker described in more detail later below. Now the conductor 124 is at the same potential as the D phase conductor 114, but all A phase current flows through the D phase conductor 114.

The second jumper 108 providing a current path around the dead end 110 on the A phase conductor 124 is removed. (See FIG. 18) The disconnection of the jumper 108 can, if the voltage and/or the mass of the conductor 124 is low enough, be done by using hot sticks. If the voltage and/or mass of the conductor 124 is too high, other means of breaking the connection of the jumper 108 may be used which may include a switch or circuit breaker described in more detail later below.

Figure 19:
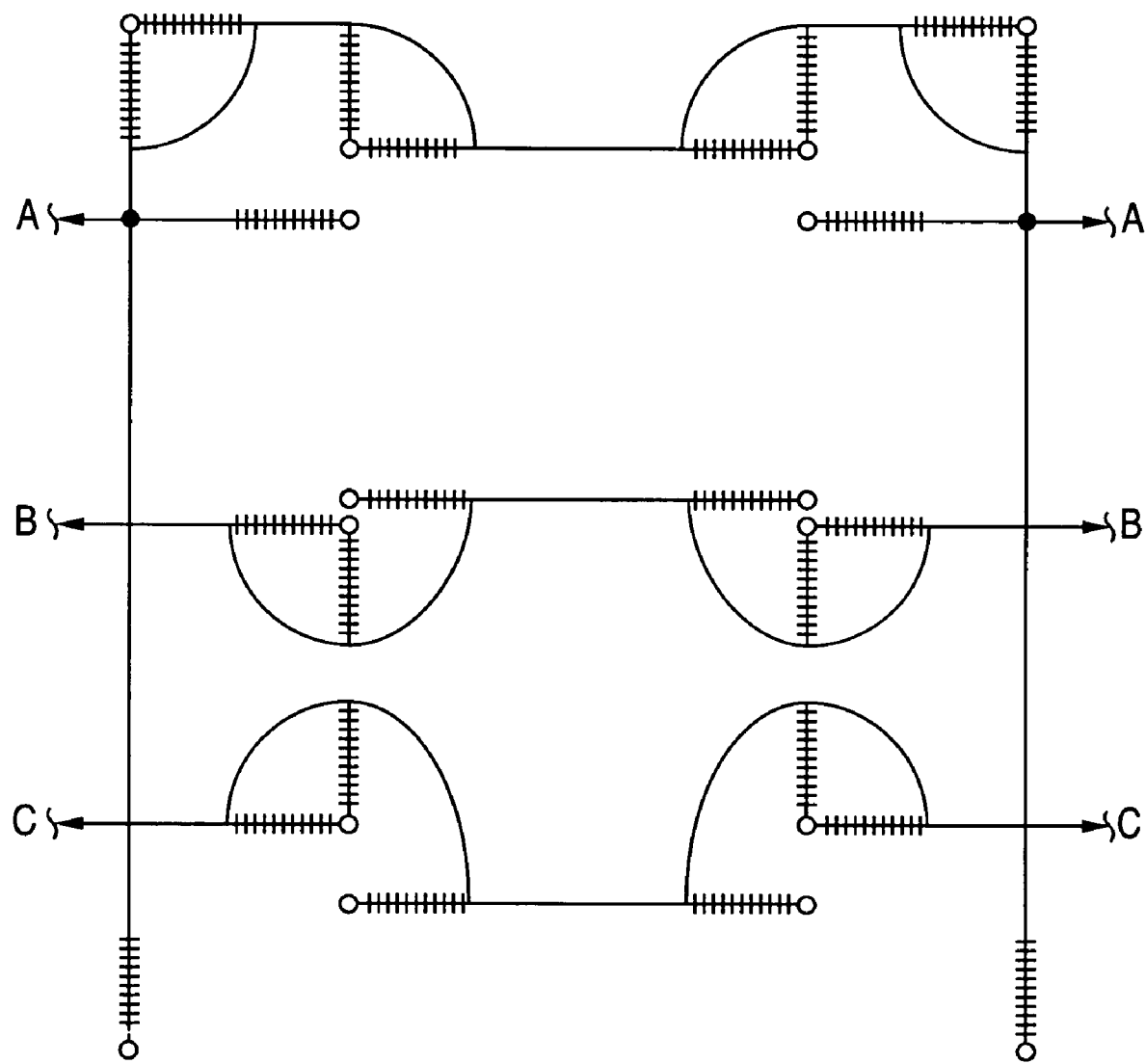
FIG. 19 is a schematic diagram illustrating the system of FIG. 18 illustrating a section of the A phase conductor being removed from the system.

Now the old A phase conductor 124 is electrically isolated from the A phase current and voltage. However, the old A phase conductor 124 is subject to induction current by its location near other energized conductors (The B, C, and A phase conductors) and are treated as a live conductors. The old A phase conductor 124 is now removed as shown in FIG. 19.

Figure 20:
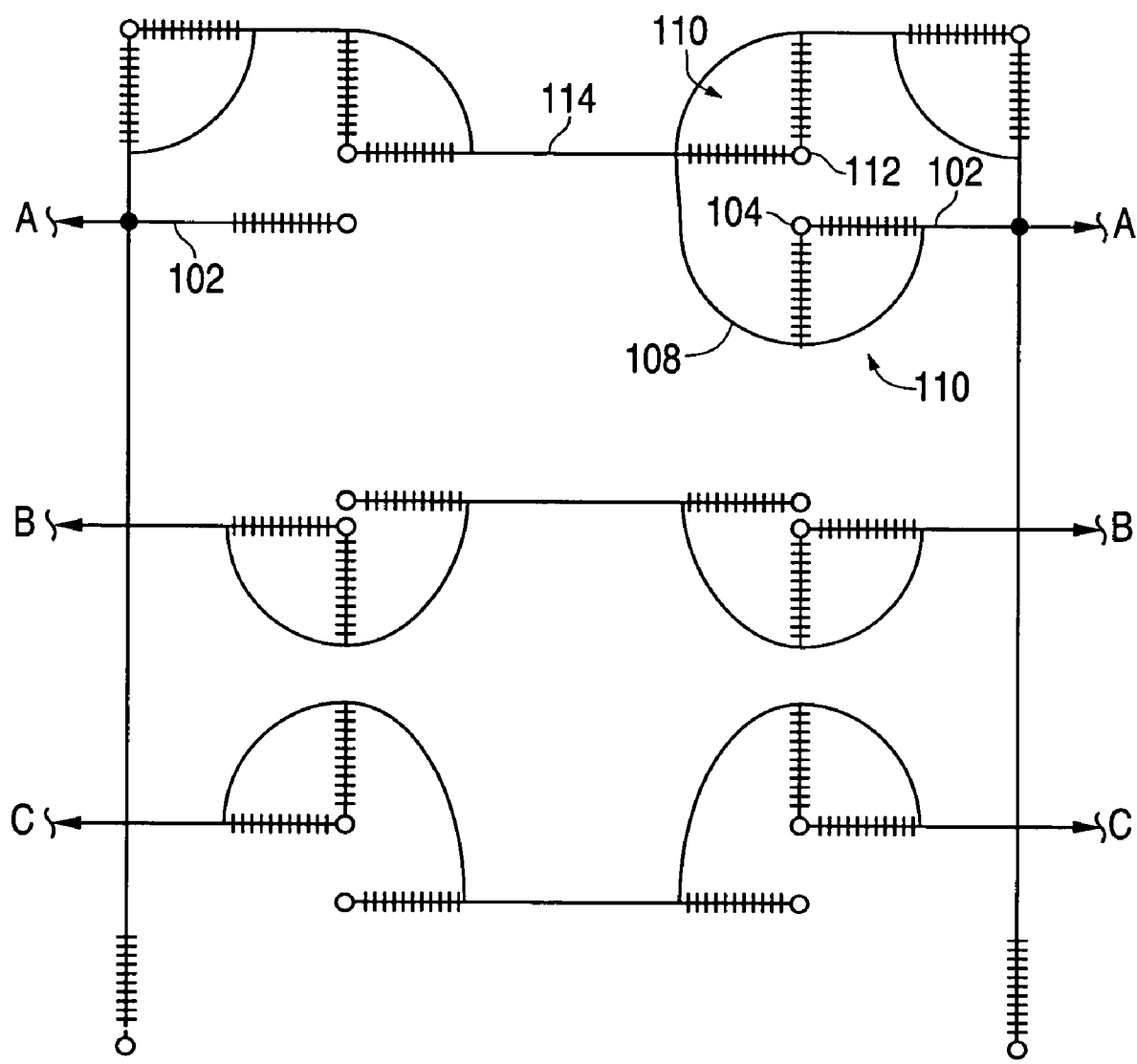
FIG. 20 is a schematic diagram illustrating the system of FIG. 19 illustrating a jumper installed connecting an old A phase conductor with the D phase conductor.

In the particular embodiment shown in FIGS. 1-26, the D phase conductor 114 will become the new A phase conductor. To accomplish this end, a jumper 108 is installed between the A phase conductor 102 attached to the dead end 110 located on the old support structure 104 and the D phase conductor 114 attached to the dead end 110 on the new support structure 112, as shown in FIG. 20. The connection of the jumper 108 can, if the voltage and/or the mass of the conductor 114 is low enough, be done by using hot sticks. If the voltage and/or mass of the conductor 114 is too high, other means of making the connection of the jumper 108 may be used which may include a switch or circuit breaker described in more detail later below.

Figure 21:
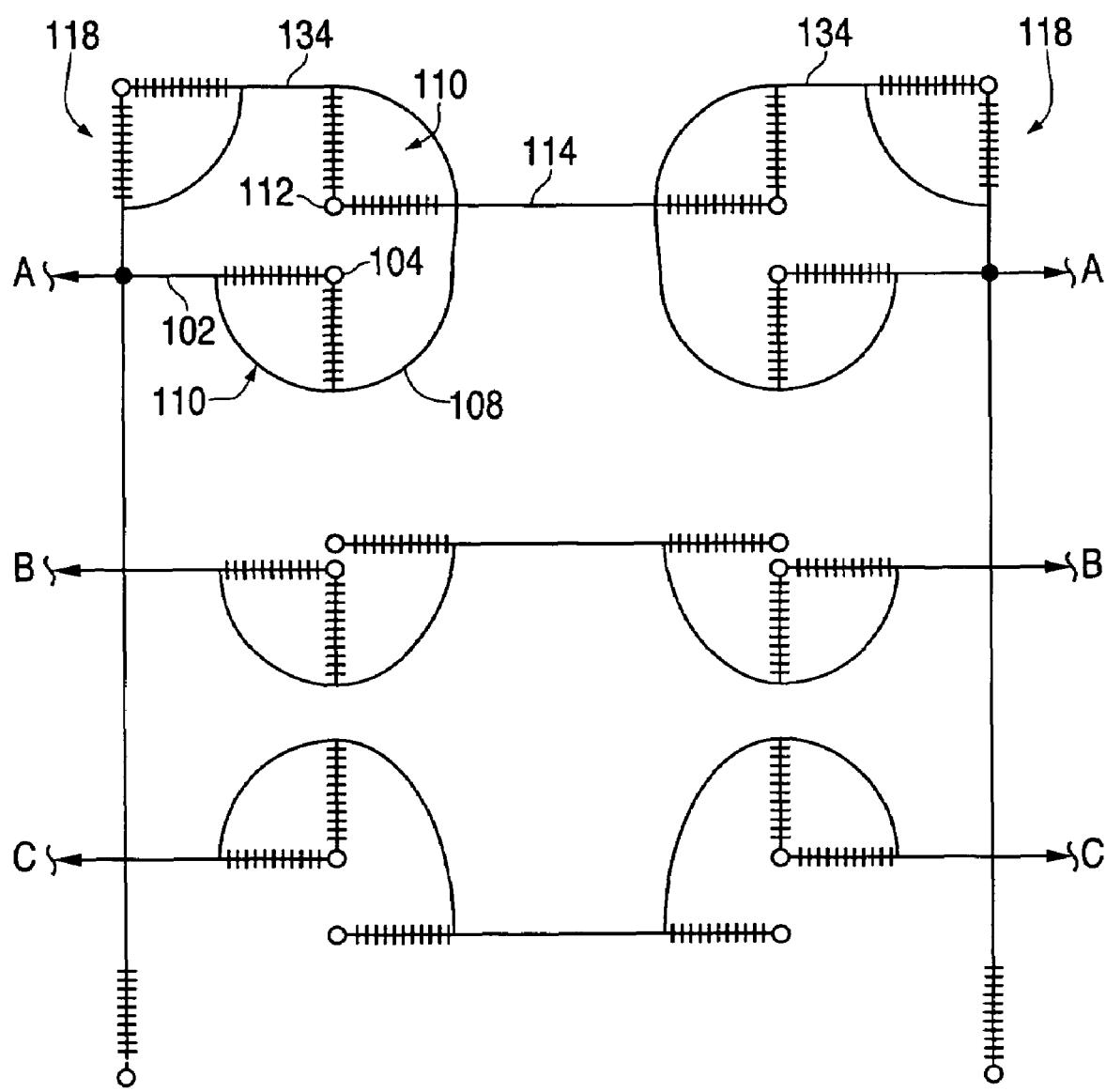
FIG. 21 is a schematic diagram illustrating the system of FIG. 20 illustrating a second jumper installed connecting an old A phase conductor with a D phase conductor.

A similar jumper 108 is located at the other end of the conductor 114 again connecting the A phase conductor 102 attached to the dead end 110 on the old support structure 104 to the D phase conductor 114 attached to the dead end 110 located on the new support structure 112, as shown in FIG. 21. The connection of the jumper 108 can, if the voltage and/or the mass of the conductor 114 is low enough, be done by using hot sticks. If the voltage and/or mass of the conductor 114 is too high, other means of making the connection of the jumper 108 may be used which may include a switch or circuit breaker described in more detail later below.

Figure 22:
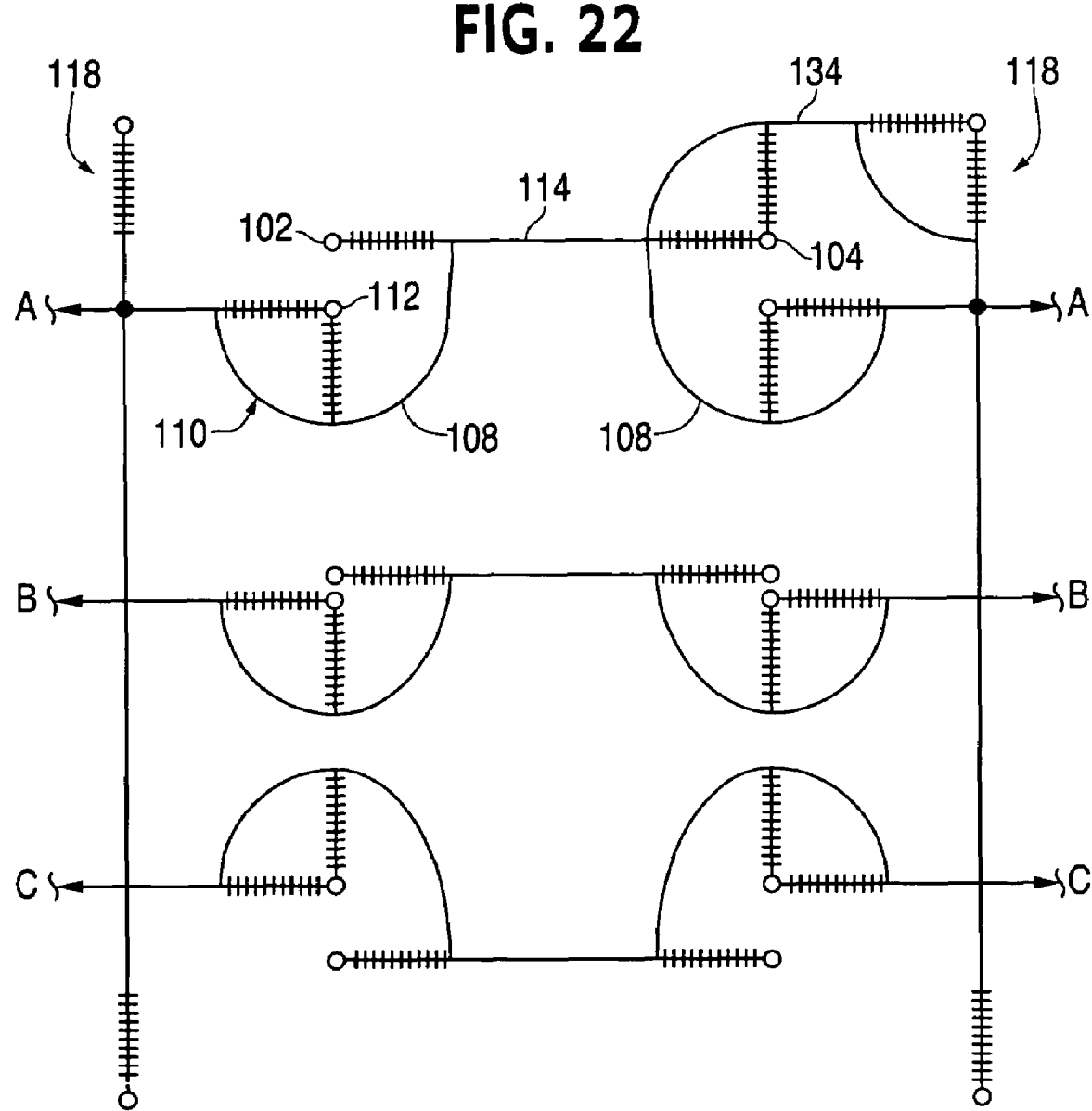
FIG. 22 is a schematic diagram illustrating the system of FIG. 21 illustrating a jumper connecting the D phase conductor to one transfer buss is removed.
Figure 23:
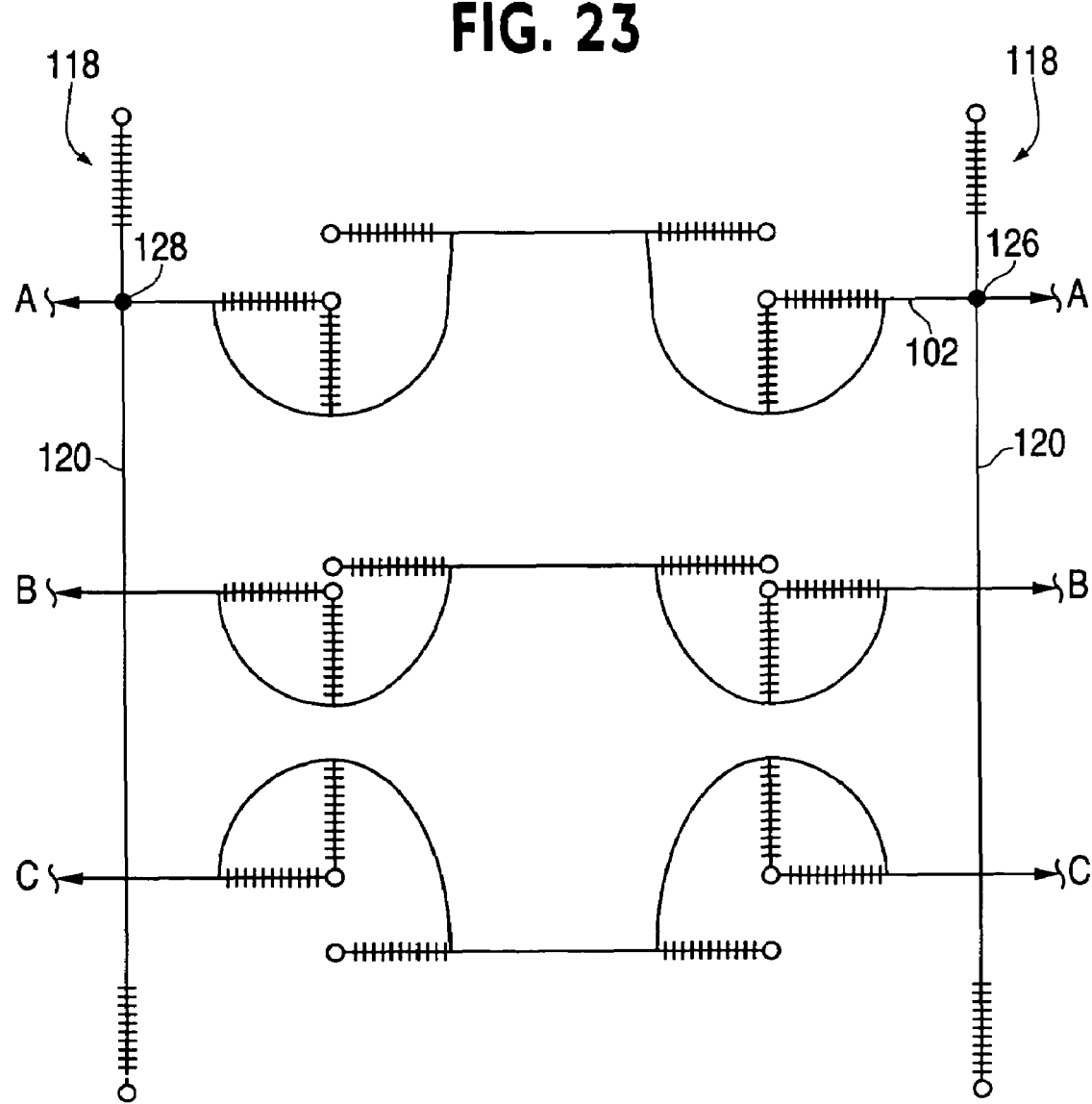
FIG. 23 is a schematic diagram illustrating the system of FIG. 22 illustrating a second jumper connecting the D phase conductor to the second transfer buss is removed.

At this point A phase current is flowing through the jumpers 108 installed between the old dead ends 110 and the new conductor 114. The transfer buss 118 and its associated jumpers 134 are no longer needed. Therefore, as shown in FIG. 22, one of the transfer buss 118 jumpers 134 is removed. As shown if FIG. 23, a jumper 134 associated with the other transfer buss 118 on the other side of the conductor 114 is also removed. Because of the connections 126, 128 between the A phase conductor 102 and the transfer buss 118 conductors 120, the transfer buss 118 conductors 120 are still energized.

Figure 24:
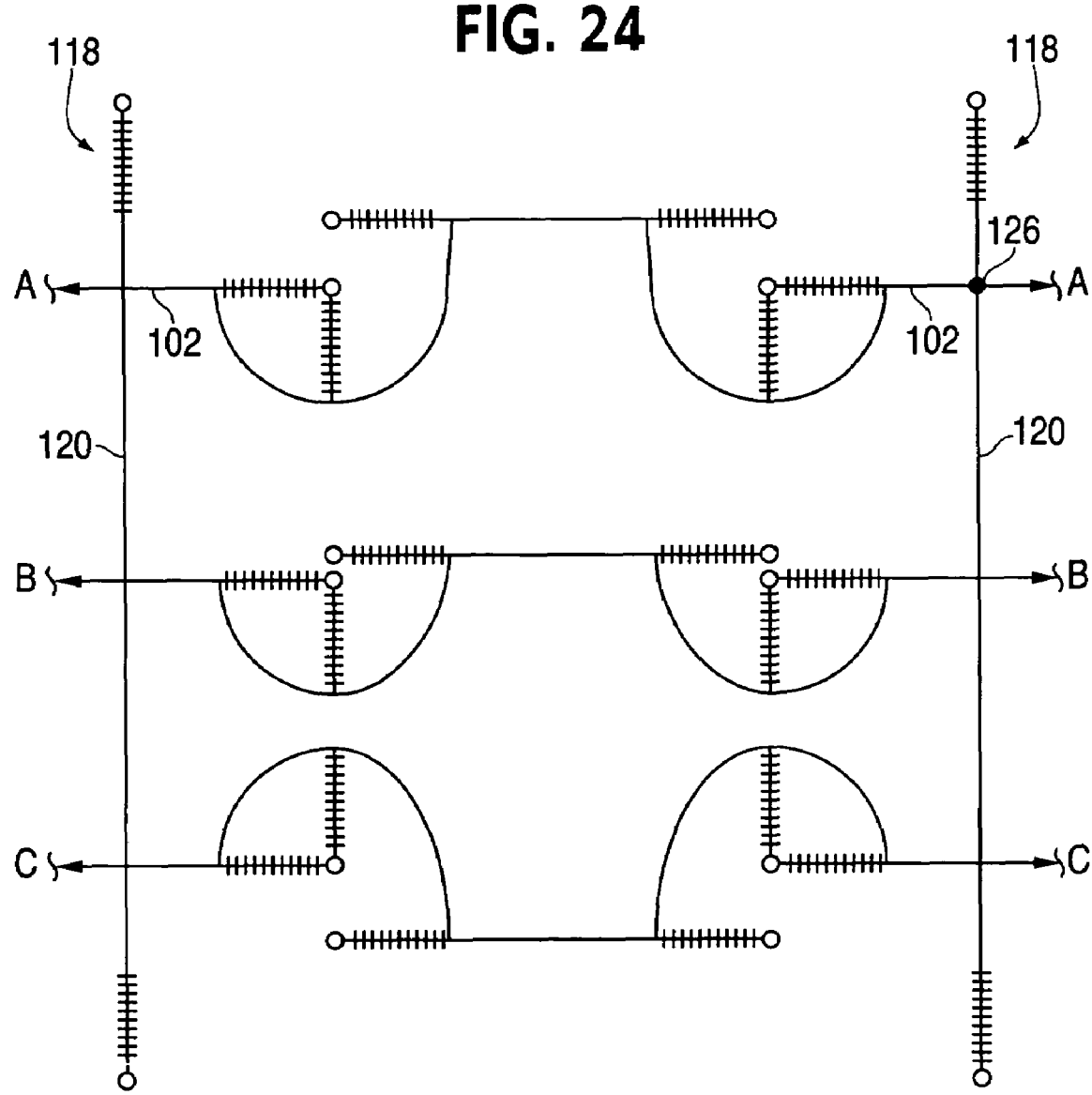
FIG. 24 is a schematic diagram illustrating the system of FIG. 25 illustrating one transfer buss disconnected from an old A phase conductor.
Figure 25:
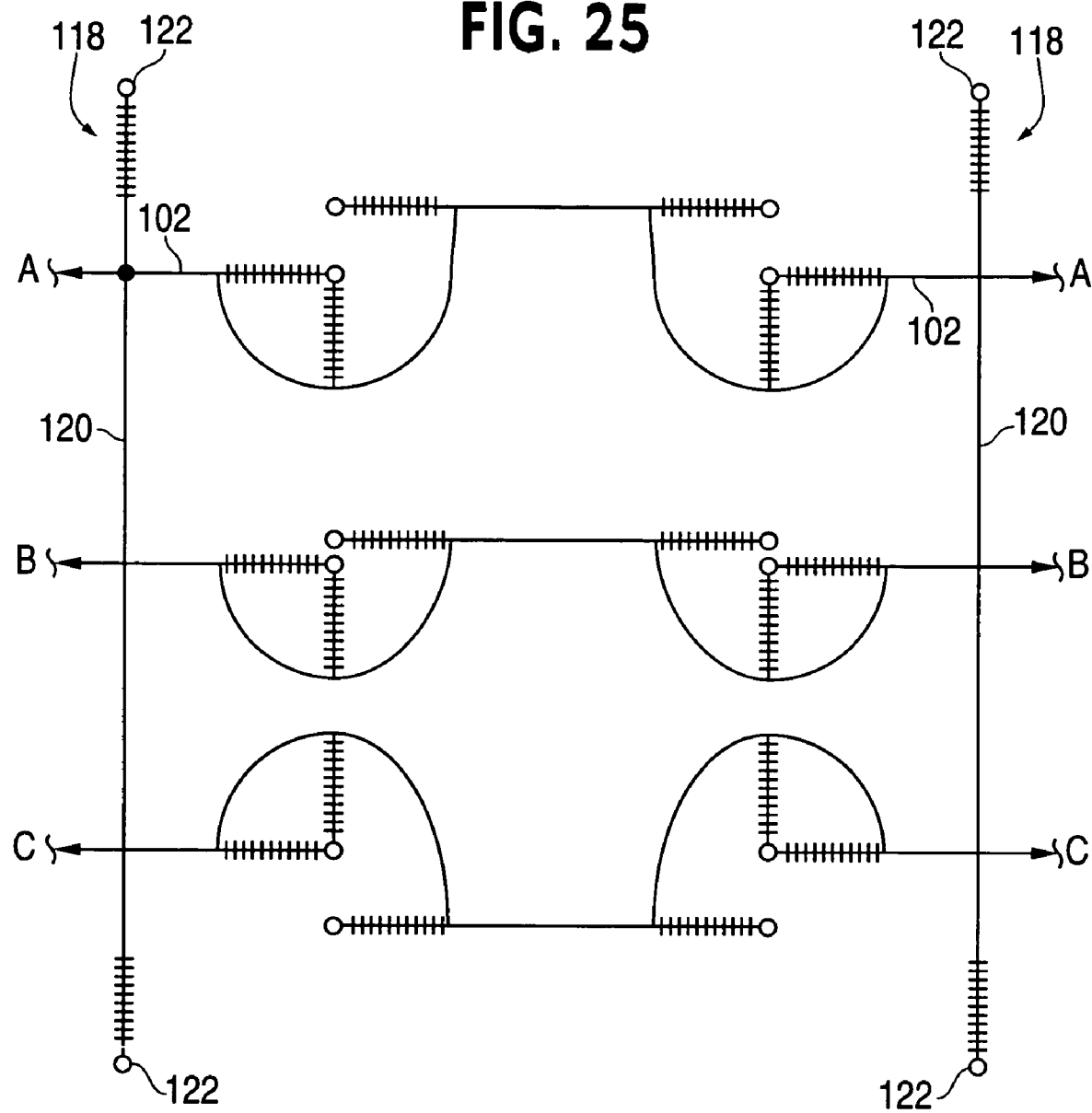
FIG. 25 is a schematic diagram illustrating the system of FIG. 24 illustrating the second transfer buss disconnected from an old A phase conductor.
Figure 26:
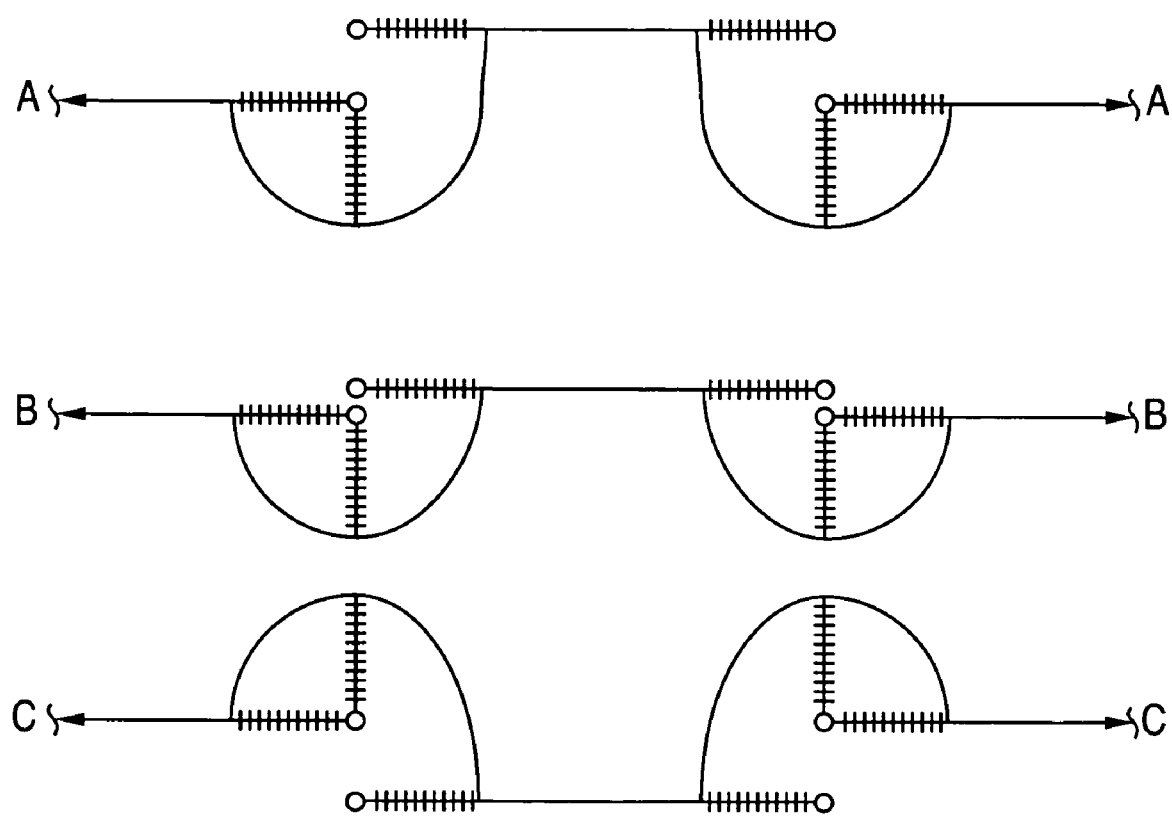
FIG. 26 is a schematic diagram illustrating the system of FIG. 25 illustrating the transfer busses removed.

As shown in FIGS. 24 and 25, the connections 126, 128 between the transfer busses 118 and the conductors 102 are removed. Thus the conductors 120 associated with the transfer busses 118 are now electrically isolated from the A phase conductors 102. The transfer busses 118 and the support structure 122 for the transfer buss 118 are removed, and the re-conductoring of the A, B, and C phase conductors is now complete (See FIG. 26).

In FIGS. 1-26 new conductor was strung and supported on new support structures 112, however, the invention is not limited to this embodiment. In some embodiments of the present invention, temporary support structures may be installed for the D phase conductor and the power load from A phase, B phase and C phase, one at a time, will be diverted to the D phase path. While the power load is diverted to the D phase path, the old conductor may be removed and a new one strung in the place of the old conductor. The power load can then be transferred to the new A, B, or C phase conductor and the temporary D phase conductor can be removed. In other embodiments of the invention, multiple temporary or permanent D phase conductors may be constructed for each of the conductors to be replaced, rather than a single D phase conductor used for each of the A phase, B phase or C phase.

According to some embodiments of the present invention, only a single D phase will be constructed and the current currently flowing on A, B or C phase will, be diverted to the temporarily constructed D phase while the A, B or C phase line is being worked on or replaced. Alternatively, a D phase line may be constructed and power from one of the other phases A, B, or C is diverted to the D phase line. The line then not carrying power may then be used to carry power from one of the other phases and act as another D phase line. Decisions made for how to exactly implement the invention will differ according to the individual circumstances of a particular project. One skilled in the art after reviewing this disclosure and considering a particular project will appreciate and make appropriate design choices to implement aspects of the invention for an individual project.

As mentioned above, care must be taken when connecting or disconnecting an energized conductor from another conductor in high voltage applications such as the voltages associated with high voltage power lines, because when the conductors are near each other, either before connection or after the disconnection, a large potential will exist between the energized conductor and the non-energized conductor. Due to the large potential between the conductors, large arcs can form between the conductors if the difference in potential is high enough.

Connections and disconnections between conductors when one conductor is energized can be done in at least three ways, First, live line equipment such as hot sticks may be used to physically connect each end of a jumper to a conductor. Second, a transfer buss including a switch maybe used. The switch will be set in the open position, and each end of the transfer buss may be connected to a conductor using a jumper and hot sticks. Once the two ends of the transfer buss are each connected to a conductor, the switch will be closed and provide a current path between the two conductors. The third way of connection between two conductors is similar to the second except a circuit breaker is used in place of the switch.

Which method to use, the hot sticks and jumpers, the transfer buss and switch or circuit breaker depends on several factors. Two factors to consider are the voltage potential between the conductors to be connected and the mass of the non-energized conductor to be connected to the energized conductor. If the mass of the conductor to be connected and/or the voltage potential is relatively minor, the two conductors may be connected by a jumper using hot sticks. As the mass of the conductor to be connected to the energized conductor increases and/or the voltage difference between the two conductors increases, a transfer buss including a switch may be used and finally with conductors having a large mass and/or a large voltage potential between the conductors, a transfer buss and circuit breaker is used.

If it is determined that for a particular installation a transfer buss with a switch will be used for a particular connection or disconnection of two conductors the procedure for setting up the transfer buss and switch will now be described with reference to FIG. 27 as follows.

Figure 27:
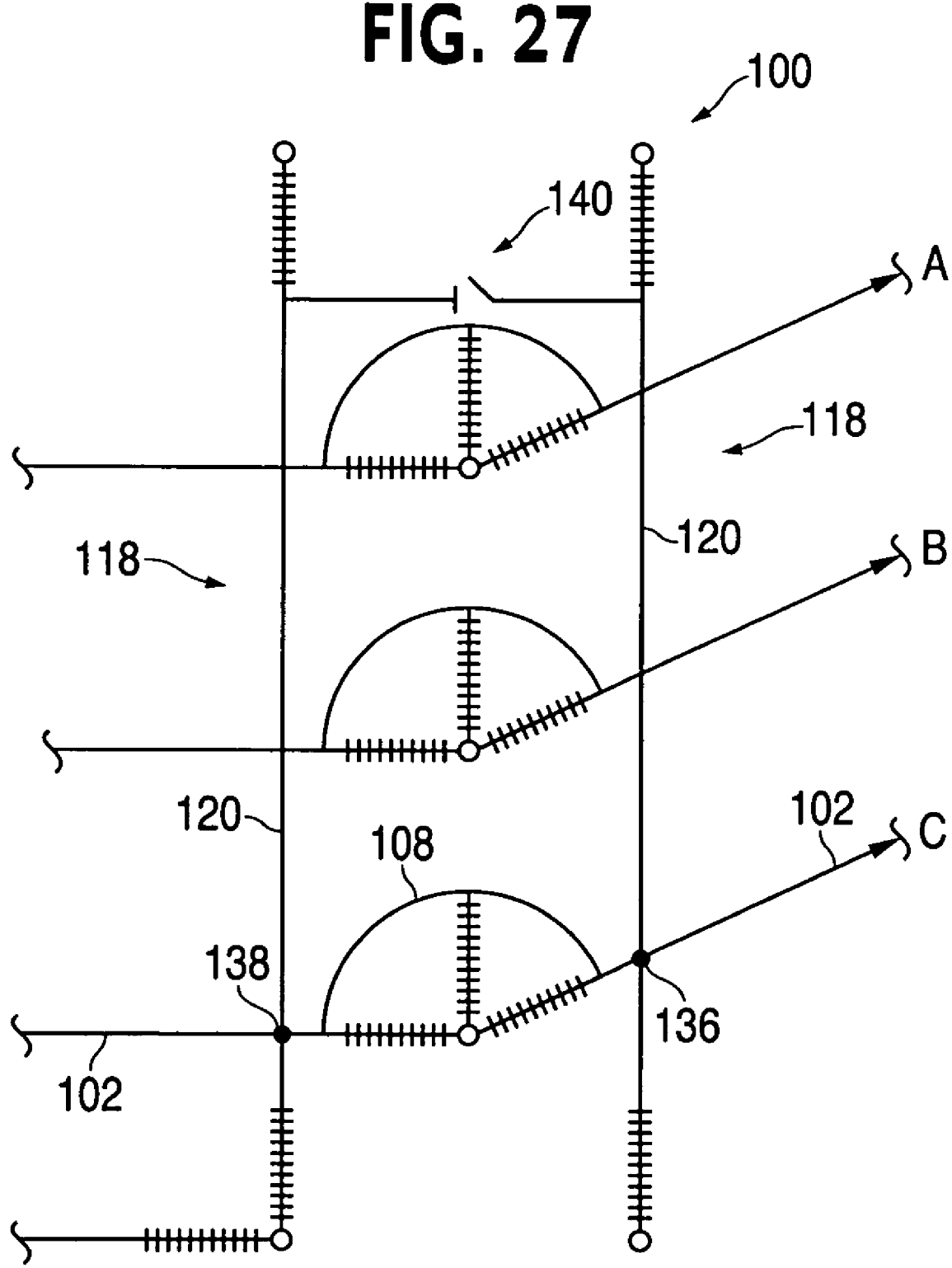
FIG. 27 is a schematic diagram illustrating a U shaped configuration for attaching an air break switch or circuit breaker to the system.
Figure 30:
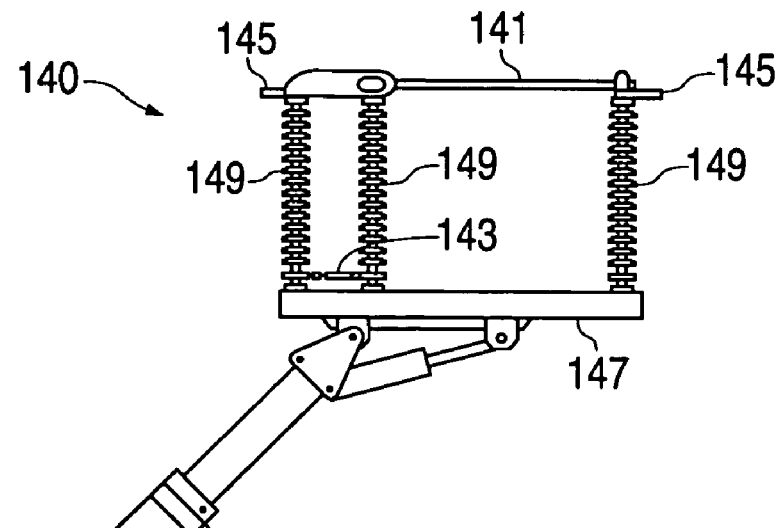
FIG. 30 is a top view of an air break switch in a closed position.

FIG. 27 is a schematic diagram of a three conductor system 100 having an A, B, and C phase. A temporary fourth D phase has been constructed. A transfer buss 118 has been installed having a switch 140 interrupting the two transfer buss connectors 120. The switch 140 is in the open position. Thus no current flows between the two transfer buss 118 conductors 120. The transfer buss 118 conductors 120 are connected to the C phase conductors 102 at connections 136 and 138 with a jumper using hot sticks. The jumper and hot stick connection is used because the mass of the transfer buss 118 conductors 120 are small thus the charging current for the conductors 120 is relatively small.

Once the connections 136, 138 between the transfer buss 118 conductors 102 are in place, the switch 140 is moved to the closed position, thus allowing current to flow through the transfer buss 118. At this point, the jumper 108 can be removed by using hot sticks. The configuration of the transfer busses 118 in FIG. 17 is such that once the C phase conductor is finished the transfer busses 118 may be used with the A and B conductors.

If the difference in the voltage, and/or mass of the conductor to be connected to the energized conductor is too great to use a switch 140, a circuit breaker 142 will be used. The use and application of the circuit breaker 142 in accordance with the invention will now be described. It is understood that the illustrated examples of use of the switch 140 and circuit breaker 142 are exemplary only. The switch 140 and/or circuit breaker 142 may be employed in various locations and at various times in performing some embodiments of the invention. One skilled in the art after reviewing this disclosure will know how to adapt the use of a switch 140 or circuit breaker 142 for an individual application.

FIG. 28 is an enlarged partial view of FIG. 8 and is used to illustrate how jumper 108 is removed to isolate conductor 124 as shown in FIG. 9. FIG. 28 shows a section 124 of conductor desired to be de-energized. Simply removing the jumper 108 would result in arcing and other problems so the circuit breaker 142 is used. As shown in FIG. 28, the circuit breaker 142 is placed in the open position (the position that provides no connection between the bushings 144, 146 located on the circuit breaker). Jumper 148 is used to connect the bushings 144 on the line side 152 of the circuit breaker 142 to the side of the C phase conductor 102 connected to the power source. Jumper 150 is used to connect the bushing 146 on the load side 154 of the circuit breaker 142 to the conductor 102 connected to the dead end 110. The circuit breaker 142 is located and connected so as to provide a current path around jumper 108 when the circuit breaker 142 is closed.

The circuit breaker 142 is then operated to achieve the closed position providing a parallel current around jumper 108. Next, the jumper 108 (located between the jumpers 148 and 150) is removed using hot sticks or other suitable live wire handling equipment as shown in FIG. 29 (a partial enlarged view of FIG. 9). The circuit breaker 142 is then operated to achieve the open position. Now, no current flows through any conductor or jumper connected to the load side 154 of the circuit breaker 142, nor is the conductor 102 connected to the load side 154 of the circuit breaker 142. The conductor 124 is now electrically isolated from the voltage on the C phase conductor 102.

At this point the jumper 108 as shown in FIG. 8 has been removed to isolate the section of conductor 124 as shown in FIG. 9. Now that the desired section 124 is de-energized and isolated from conductor 102, the circuit breaker 142 can be removed.

A procedure for removing the circuit breaker 142 is as follows. Jumper 148 is removed from the A phase conductor 102 by use of hot line tools and live line work methods. Jumper 148 is then disconnected from the bushing 144. Jumper 150 is then removed from conductor 124 using hot line tools and live line work methods and then disconnected from bushing 146 isolating the circuit breaker from any line potential. The jumpers 148 and 150 are removed by using hot sticks or other equipment used for handling energized conductors.

The circuit breaker 142 can be removed from the system 100 because the magnitude of the charging current is directly proportional to the mass being connected or disconnected. Other capacitive and magnetic relationships between proximate energized and de-energized isolated conductors also dramatically increase associated charging currents. There is a small mass in the circuit breaker 142 and no magnetic or capacitive effects, thus, the negligible charging currents. However some arcing may occur during the disconnection of the circuit breaker 142 and the jumpers 148 and 150.

Connecting a conductor to an energized conductor is similar to the disconnection method done in reverse. With reference to FIG. 29, the circuit breaker 142 is placed in the open position jumpers 148 and 150 connected to conductors 102 and 124 respectively. The circuit breaker is then operated to the closed position. Now conductor 124 is energized to the same voltage as conductor 102, using hot sticks and live line work methods to attach jumper 108 (see FIG. 28).

To remove the circuit breaker 142, the circuit breaker is operated to the open position, jumper 148 and 150 are removed with hot sticks.

Figure 31:
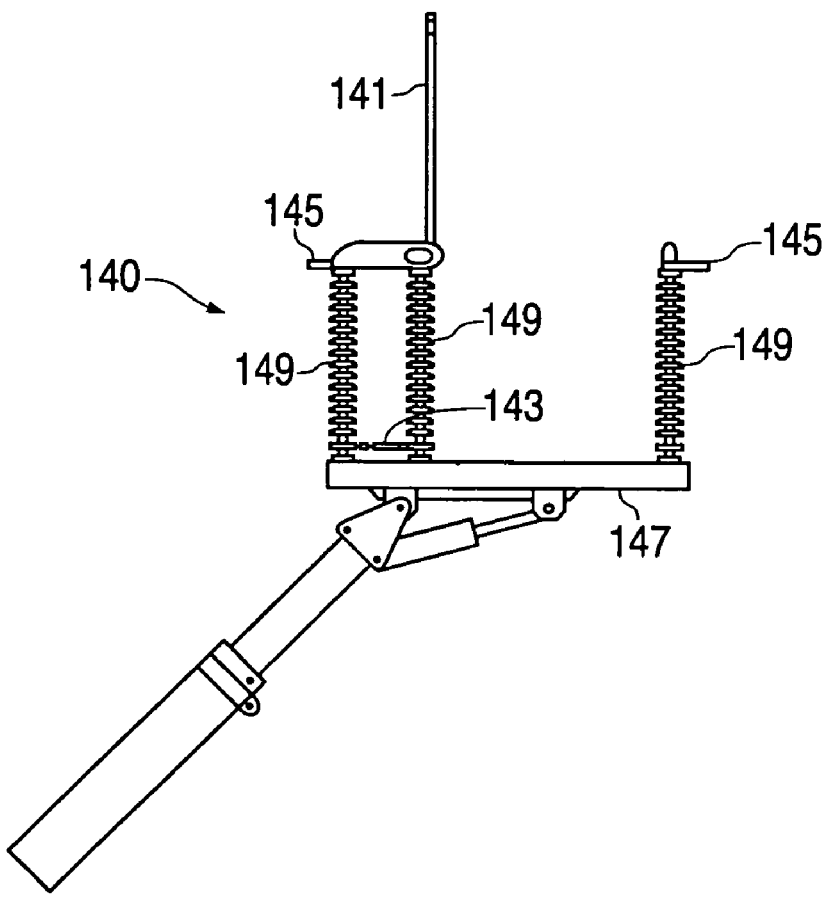
FIG. 31 is a top view of an air break switch in an opened position.

The switch 140 may be used in place of the circuit breaker for lighter applications. Operation using the switch in place of a circuit breaker is basically the same and will not be repeated. Once the switch or circuit breaker has performed its function a conductor can be used to take the load of the switch or circuit breaker so that the switch or circuit breaker can be used somewhere else in the system 100. For example a conductor may be placed in parallel with the switch or circuit breaker and then the switch or circuit breaker operated to open and then may be removed. The switch 140 used in accordance with the invention as shown in FIG. 27 will now be further shown and described in FIGS. 30-31. The switch 140 is a typical air break disconnect switch. It has a disconnect blade 141 that can be operated to a closed position (see FIG. 30) and an open position (see FIG. 31). The switch has connectors 145 on each end that permits conductors to be electrically connected to the switch 140. When the disconnect blade 141 is in the closed position, it provides an electrical connection between the two conductors via the switch 140. When the disconnect blade 141 is in the open position, there is no electric connection between the two conductors.

The switch 140 has an actuator 143 that operates the disconnect blade 141. The opening and closing of the switch is controlled by the actuator 143. The switch 140 is supported on a frame 147 that provides mechanical support for the switch 140. The frame 147 is insulated from the conductors by insulators 149. According to some embodiments of the invention, the switch 140 may be mounted on temporary support structure or a lift apparatus such as a boom of a vehicle for ease and convenience in practicing some embodiments of the invention.

Figure 32:
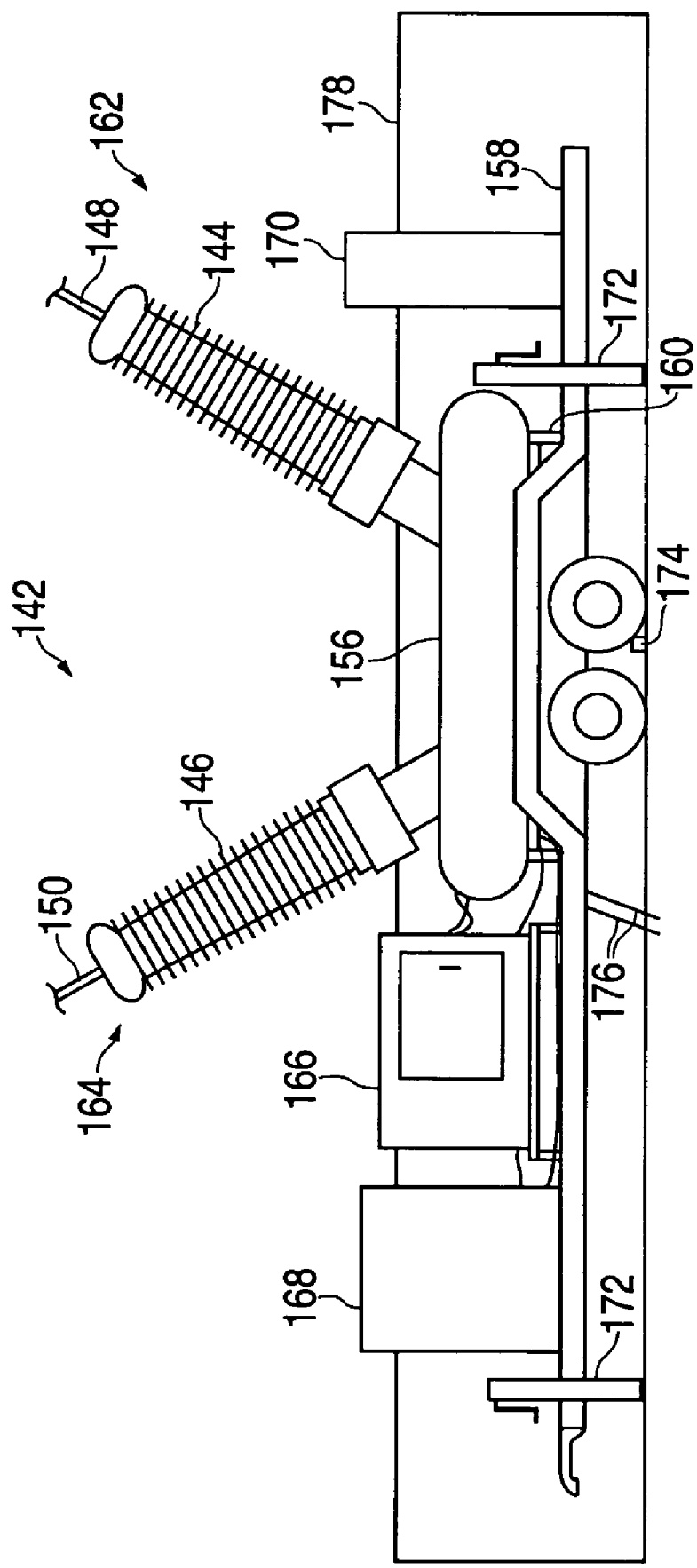
FIG. 32 is a side view of a portable circuit breaker in accordance with one embodiment of the invention.

The circuit breaker 142 shown schematically in FIGS. 28-29 will now be further shown and described with reference to FIG. 32. In some embodiments of the invention, the circuit breaker 142 is a single pole (phase) of a 345 kV breaker that has been modified to be portable. A typical circuit breaker of this magnitude consists of three single pole circuit breakers mechanically connected together to be a three phase circuit breaker and break all three circuits at once. The three phase breaker includes three breakers connected together and configured to act in unison. Because only a single phase needs to be disconnected or energized at once in many embodiments of the invention, only one pole (or phase) of a circuit breaker is needed. To make the circuit breaker more portable, one pole is separated from the 3 phase unit and modified to be portable as described in more detail below.

A circuit breaker 142 in accordance with the invention is a 2,000 amp SF6 breaker. Where SF6 is an insulating gas that is used in the circuit breaker 142. In other embodiments of the invention, the circuit breaker 142 could be a minimum oil breaker, or any other circuit breaker suited to the applied voltage. The circuit breaker 142 has two insulated bushings 144, 146 projecting from a housing 156. Jumpers 148, 150 are attached to an end of the bushings 144, 146 for connecting the circuit breaker 142 to conductors.

The circuit breaker 142 has a closed position that permits an electrical connection from a conductor connected to one bushing 144 via jumper 148 through the circuit breaker 142 to a conductor connected to the other bushing 146 via jumper 150. When it is desired to break the electrical connection between the two conductors, the circuit breaker 142 is operated and the circuit breaker 142 achieves an open position. In the open position, the two jumpers 148. 150 connected to the two bushings 144, 146 are isolated from each other.

Normally a circuit breaker 142 having the capacity for high voltage power is in fixed locations such as power generating faculties, terminals, switching stations or substation and consists of three poles or phases. In accordance with the invention, a standard circuit breaker 142, such as a 345 kilovolt, 2000 amp SF6 circuit breaker is used. Because these types of breakers have three poles or phases, a single pole or phase is separated out from the other two phases and is modified to be portable. As shown in FIG. 32, the circuit breaker 142 is mounted onto a trailer 158. A support structure 160 mounts the circuit breaker 142 to the trailer 158. Optionally, the circuit breaker 142 could be mounted on a truck bed or some other suitable type of vehicle.

The circuit breaker has a housing 156 from which two insulated bushings 144, 146 project. One of the bushings 144 is located on, what is referred to as, the line side 162, meaning that that bushing 144 connects to the conductor connected to the power source. The other side 164 of the circuit breaker 142 is referred to as the load side 164 and includes the other bushing 146. Within the housing 156 a non-conductive gas SF6, for example, is for insulation. Other circuit breakers in accordance with the invention may be oil filled circuit breakers.

A control panel 166 for operating the circuit breaker 142 is located on the trailer 158 and operatively connected to the circuit breaker 142. Optionally, the control panel 166 may be the same one that would normally operate a standard non-portable circuit breaker. A portable power generator 168 is located on the trailer 158 and is operatively connected to the circuit breaker 142 and/or control panel 166 to provide power to operate the circuit breaker 142. The generator 168 may be gasoline powered and is of sufficient capacity to permit operation of the circuit breaker 142, including charging of the springs in the circuit breaker 142. Preferably, the generator 168 can produce 120 volts.

Additional containers 170 of SF6 gas are kept on the trailer 158 in order to permit recharging of the circuit breaker 142 with gas if necessary. The manufacturer's recommendations for gas pressure in the circuit breaker 142 should be observed.

The exact modifications necessary to make the circuit breaker 142 portable will vary depending on what type of circuit breaker is being modified. One skilled in the art after reviewing this disclosure will be able to appropriately fashion a portable circuit breaker 142.

Before use of the circuit breaker 142, the tow vehicle is detached, and the trailer 158 is held in place by jacks 172 and a wheel chocks 174. The trailer 158 and the circuit breaker 142 is bonded to ground with grounding cables 176. A temporary protective fence 178 is constructed around the unit 158.

The first embodiment of the invention for replacing conductors in a high voltage power system which included stringing a D phase conductor along with the methods and apparatus for making and breaking the connections associated with the method has been described. Now a second embodiment of the invention, which includes moving the conductors to a temporary position, stringing new conductors in or near the old conductor's original position, transferring the power load from the old conductor to the new conductors, and removing the old conductors will now be described with reference to FIGS. 33-52.

Figure 33:
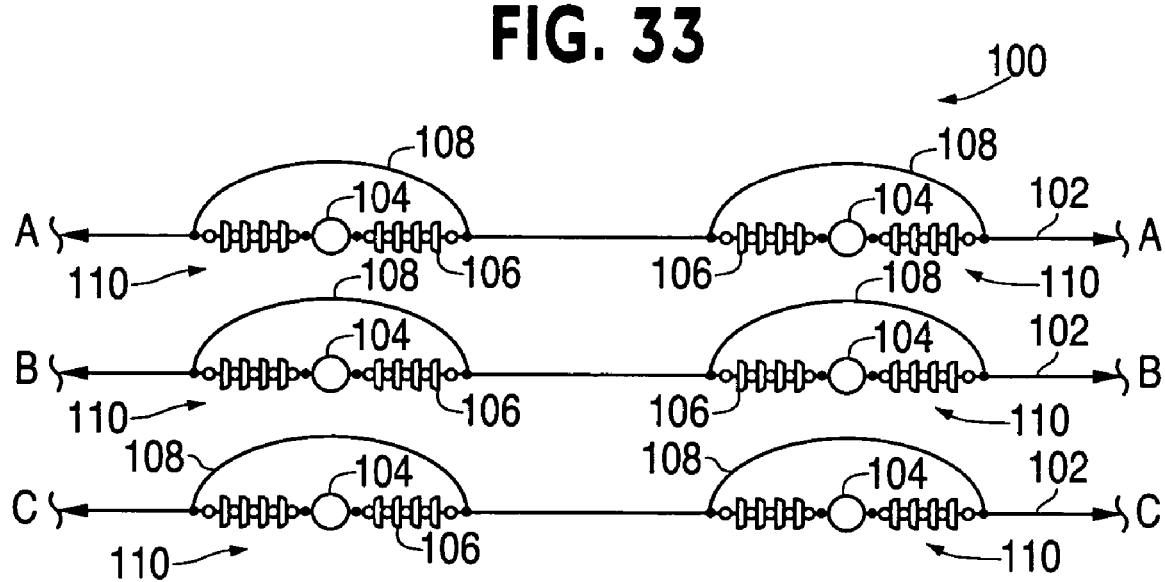
FIG. 33 is a schematic diagram of a three phase power transfer system in an initial condition.

FIG. 33 shows a three-phase high voltage power system 100 with three conductors 102. Each conductor 102 carries the power load associated with one phase A, B, or C phase. The conductors 102 are supported by support structure 104. The support structure 104 may be a power pole, a tower or any other suitable support structure. The conductors 102 are attached to the support structure 104 via insulators 106 in a dead end configuration. The power load is transferred around the dead ends 110 by jumpers 108.

Figure 34:
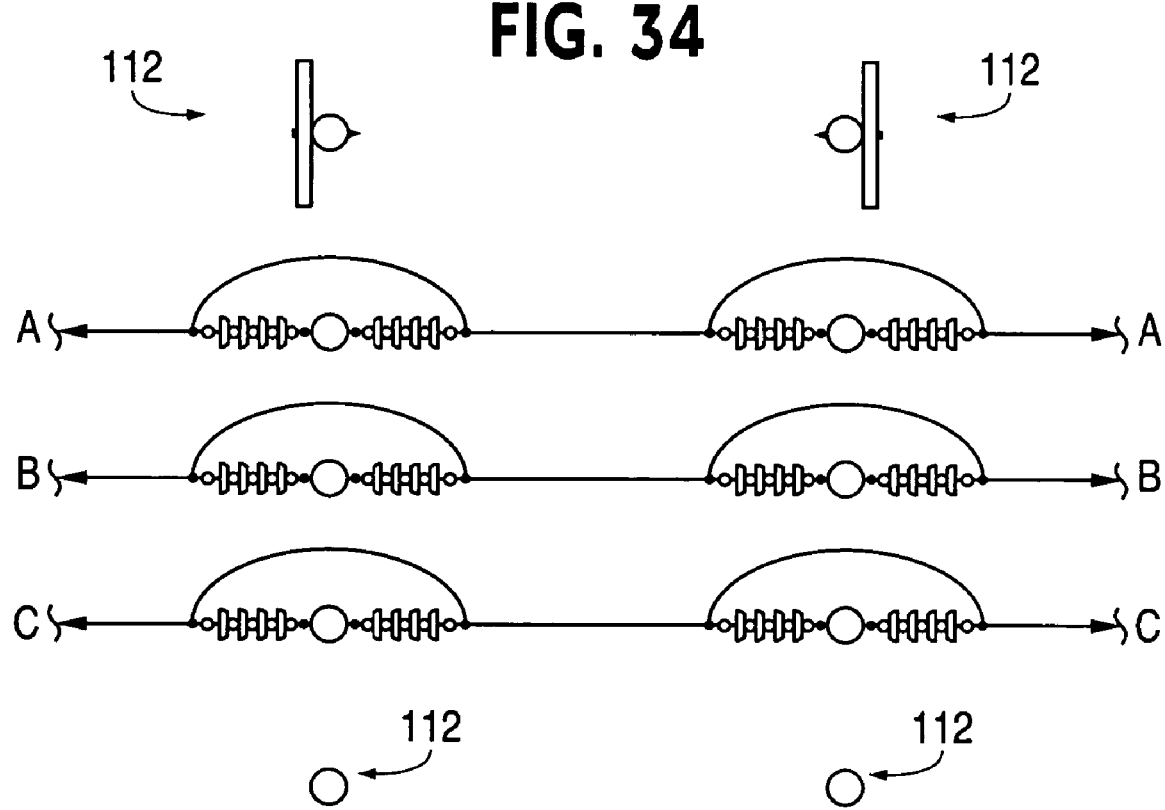
FIG. 34 is a schematic diagram of the system of FIG. 33 further showing temporary support structure located near the system.

A new temporary support structure 112 is constructed near the existing support structure 104 (in some cases attached to the existing support structure 104) as shown in FIG. 34. The section 180 of conductor to be moved is located between the dead ends 110.

The conductor to be moved 180 and accompanying insulators 106 for each A, B, and C phase are moved one at a time to the temporary support structure 112. Care is taken to ensure adequate tension is maintained on the conductor 180 while it is being moved to ensure the conductor 180 does not contact the ground or violate clearance limits with other conductors 180. If needed, the conductor 180 can be attached to a tensioning device, such as a winch or vehicle applying tension, via an insulating rope. If needed, longer jumpers 182 can be attached parallel to the existing jumpers 108 using hot sticks or other live line equipment. The existing jumpers 108 can then be removed using hot sticks or other live line equipment, and the conductor can be transferred to the new support structure 112.

Figure 35:
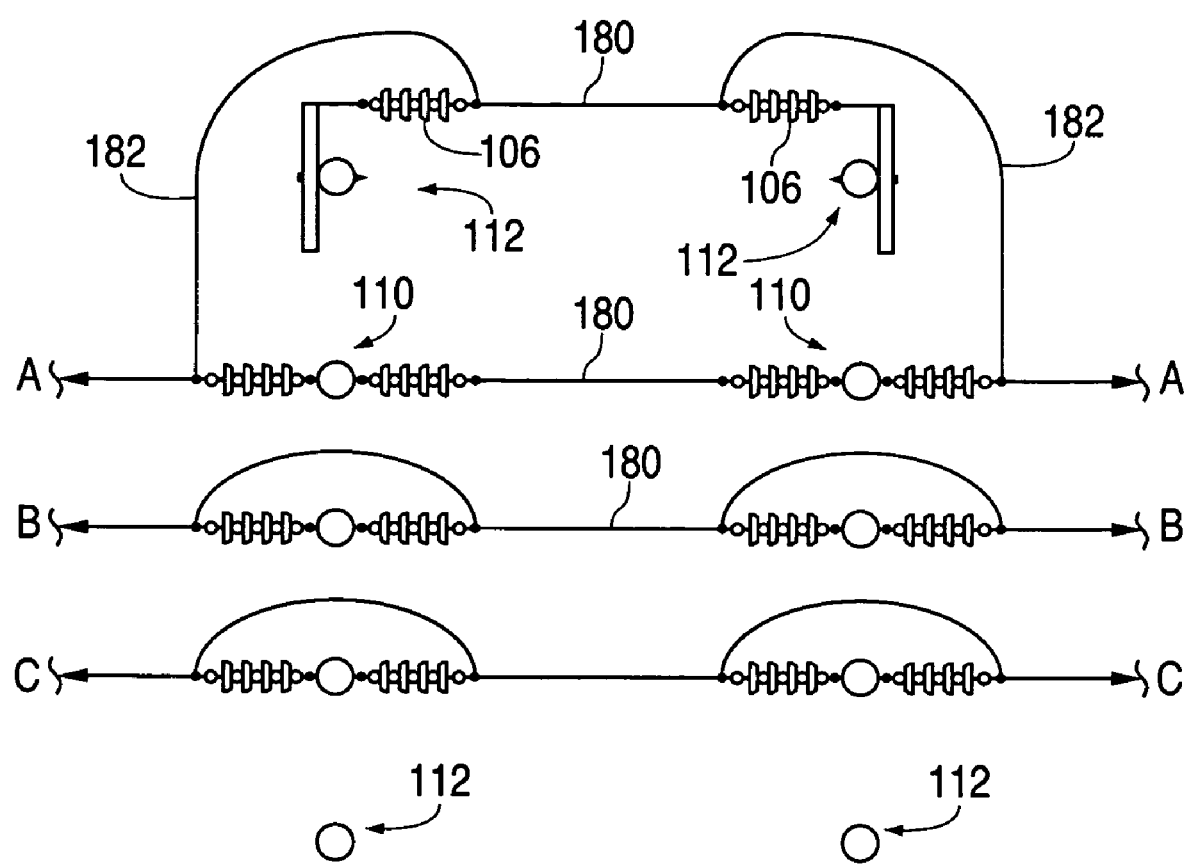
FIG. 35 is a schematic diagram of the system of FIG. 34 further showing an A phase conductor moved to the temporary support structure.
Figure 36:
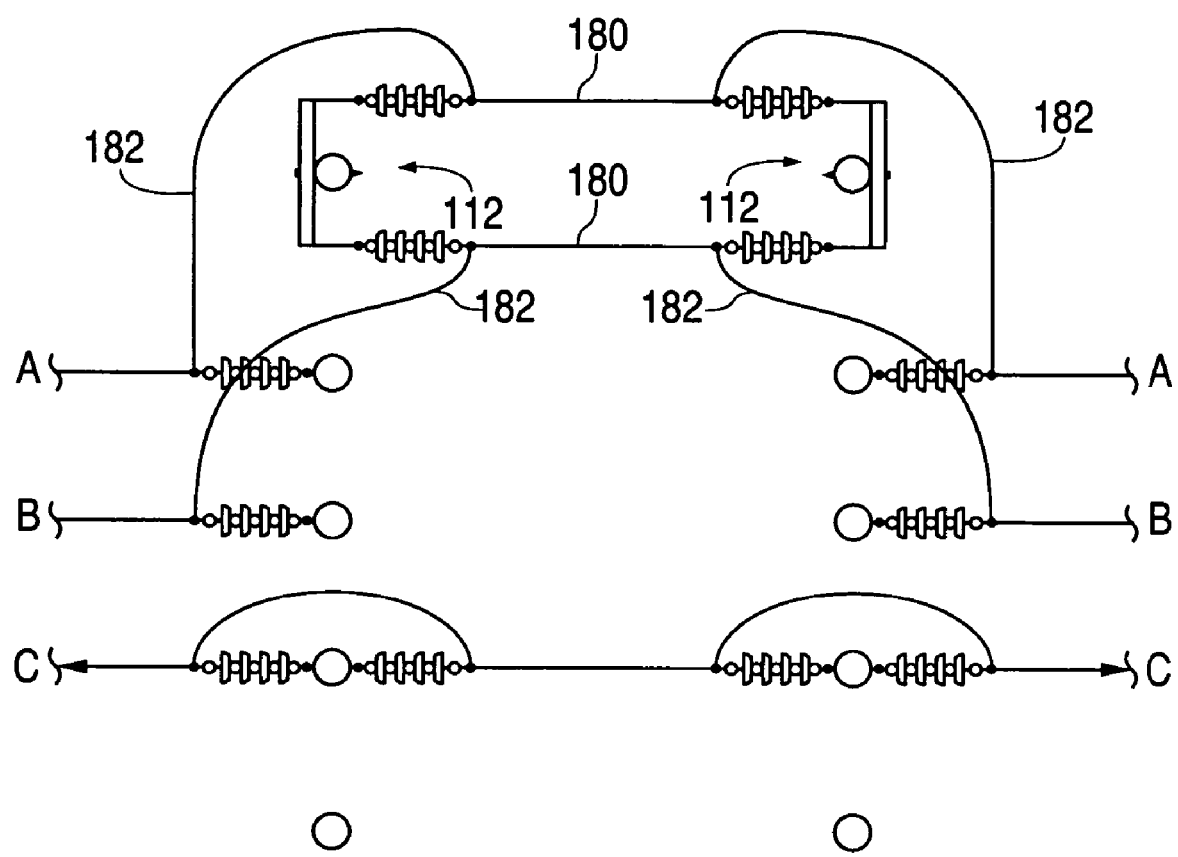
FIG. 36 is a schematic diagram of the system of FIG. 35 further showing a B phase conductor moved to the temporary support structure.
Figure 37:
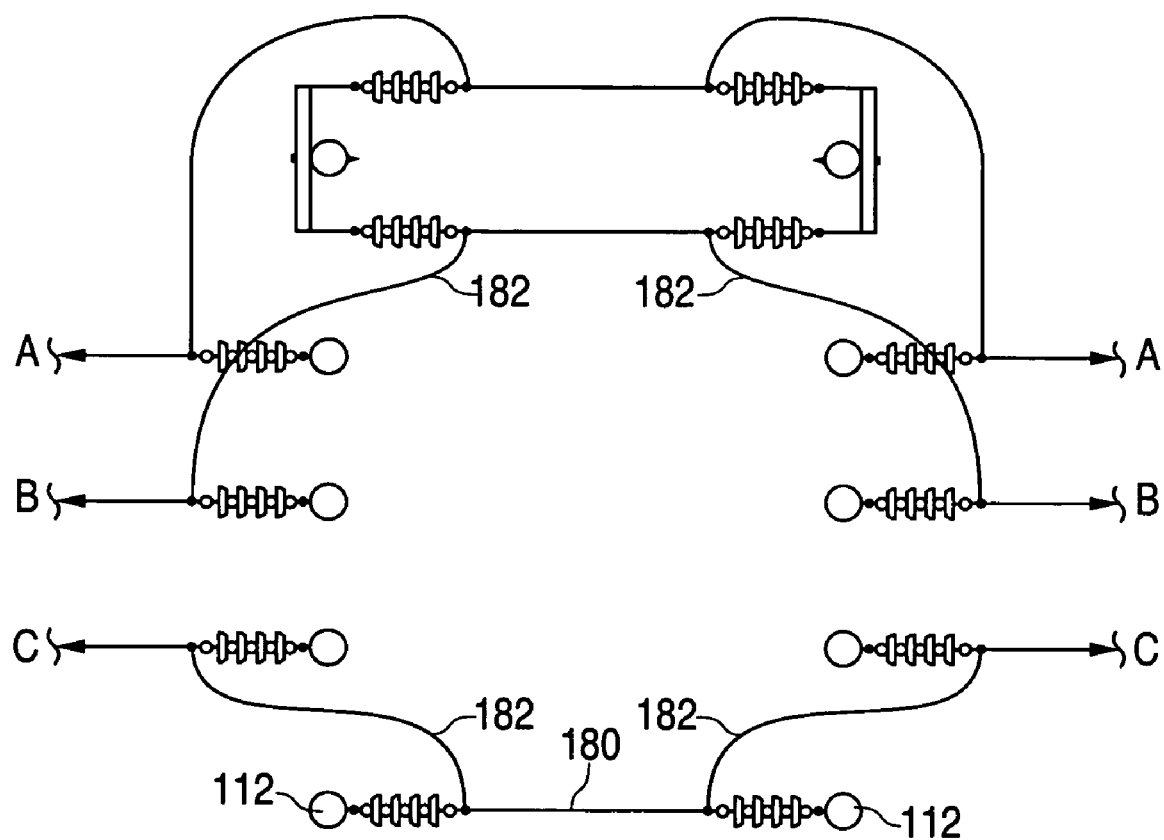
FIG. 37 is a schematic diagram of the system of FIG. 38 further showing a C phase conductor moved to the temporary support structure.

In accordance with some embodiments of the invention, FIG. 35 shows the A phase conductor to be moved 180 attached to the new support structure 112. FIG. 36 shows the B phase conductor to be moved 180 attached to the new support structure 112 and electrically connected to the B phase with longer jumpers 182. FIG. 37 shows the C phase conductor to be moved 180 attached to the new support structure 112 and electrically connected to the C phase with longer jumpers 182.

Figure 38:
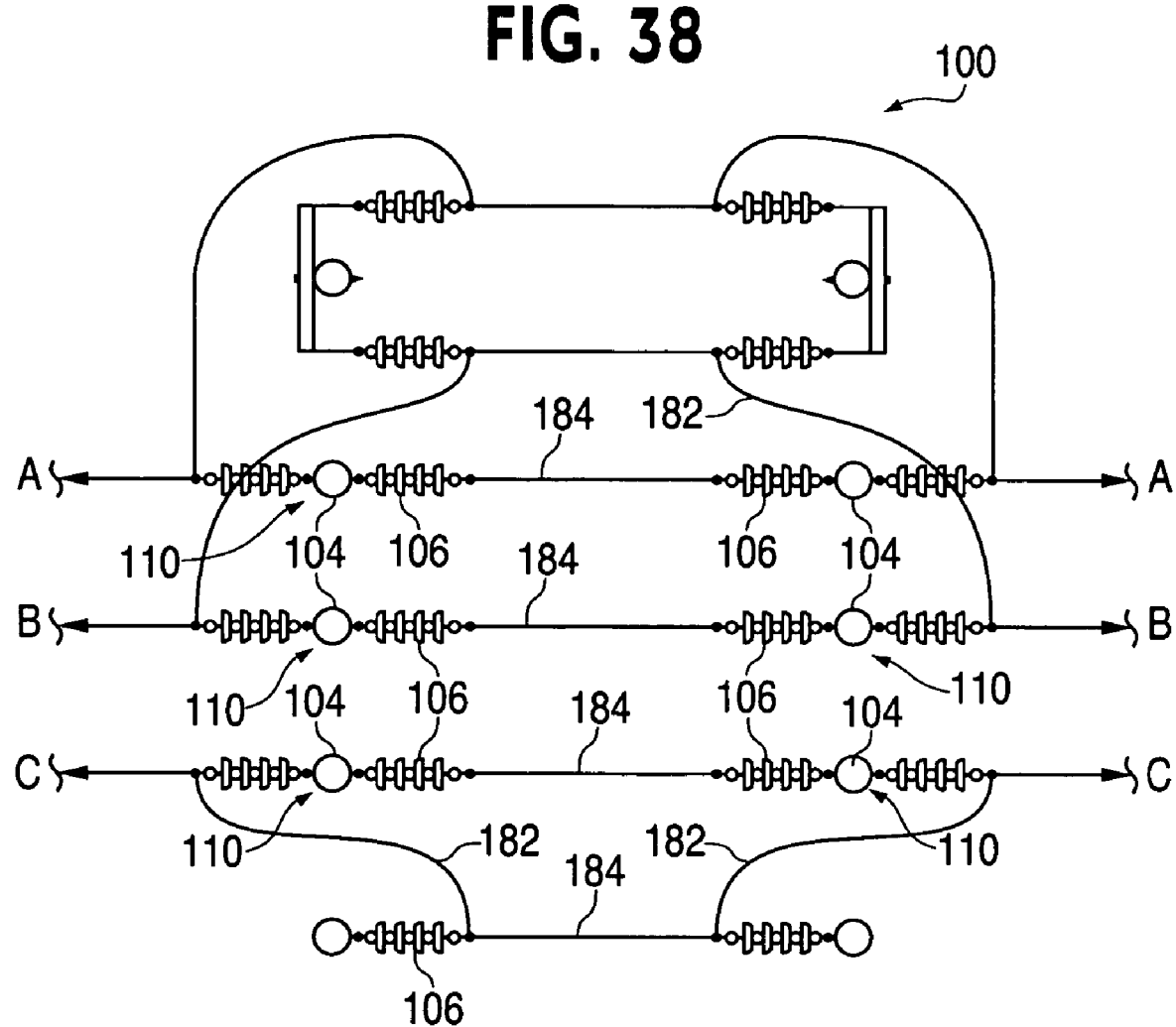
FIG. 38 is a schematic diagram of the system of FIG. 37 further showing new conductors strung in the vacancies left by the moved conductors.

Once the conductors to be moved 180 have been relocated to the new/temporary support structure, 112, new replacement conductors 184 and corresponding insulators 106 are strung into the system 100 as shown in FIG. 38. All three-phases of the new conductors 184 may be strung with a pulling rope and a hard line if the size of the conductor 184 requires it. The new conductor 184 is pulled in by a rope puller or a hard line puller under tension to keep the conductor 184 off the ground and to clear any obstacles below the line. Once the conductors 184 are installed, they are dead ended on one end, pulled to the correct sag (tension) and dead ended on the other end. The conductor 184 between the dead ends 110 is clipped (connected) to insulators located on an intermediate support structures (not shown). The stringing is accomplished in accordance with the invention and described in detail later herein.

Figure 39:
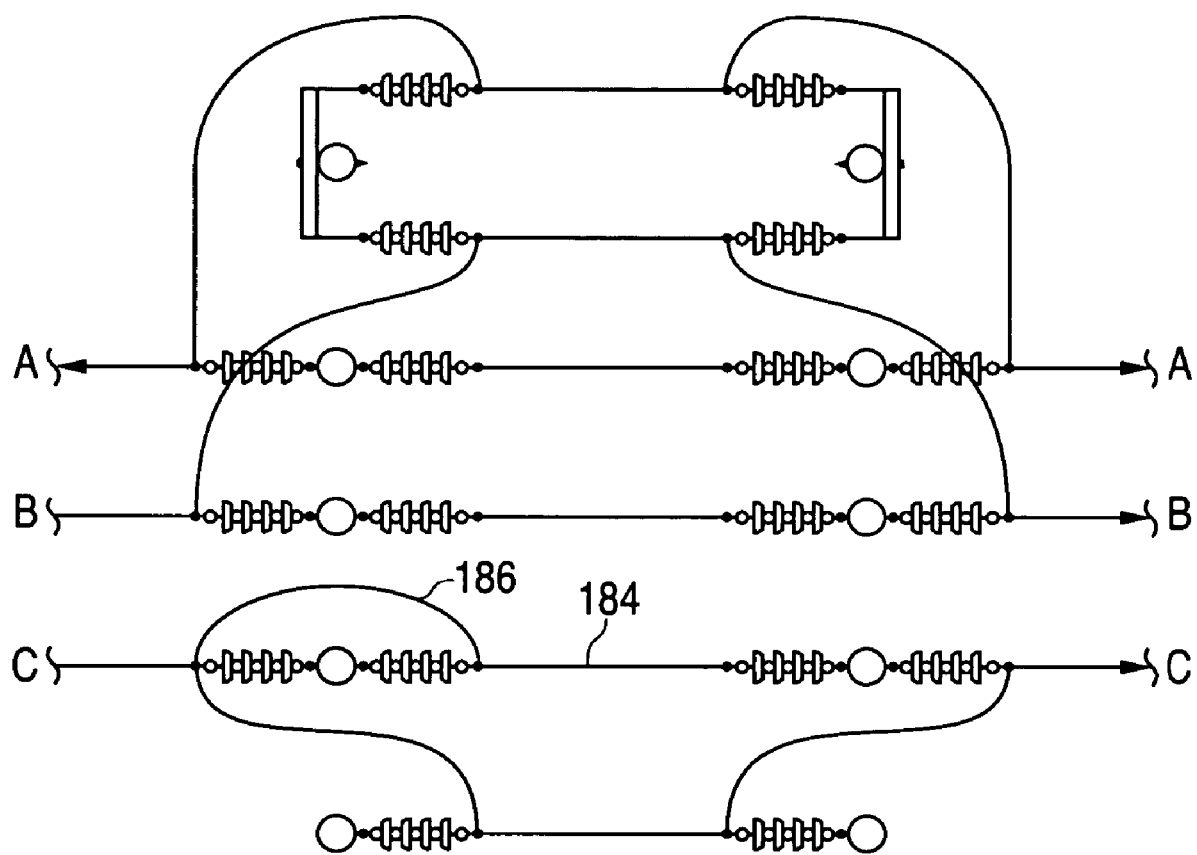
FIG. 39 is a schematic diagram of the system of FIG. 38 further showing a jumper connected to the new C phase conductor.

Once the new conductors 184 are installed, the power load is transferred from the old conductors 180 to the new conductors 184 in a step-by-step process. As shown in FIG. 39, the new 184 C phase conductor is energized to the C phase voltage by a new permanent jumper 186 installed by use of a hot stick, a boom or structure mounted air break switch 140, or a portable circuit breaker 142.

Figure 40:
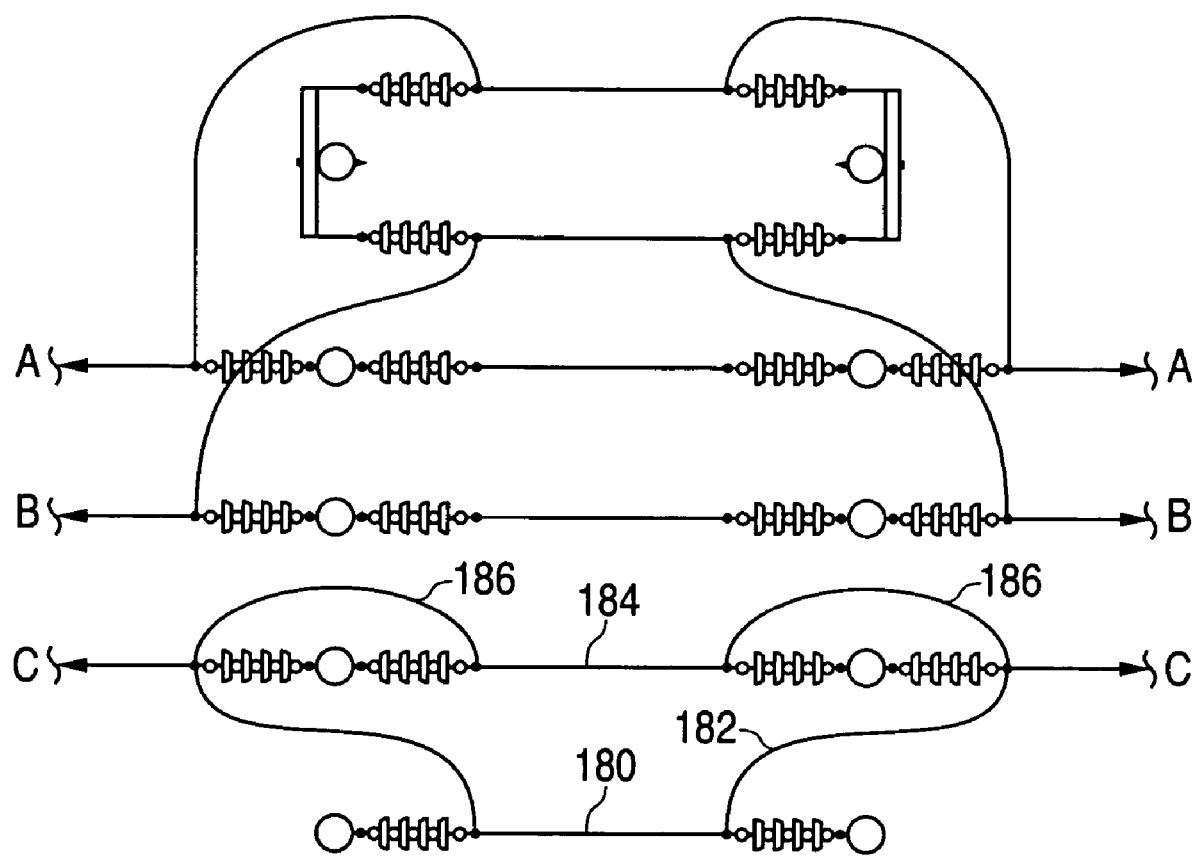
FIG. 40 is a schematic diagram of the system of FIG. 39 further showing a second jumper connecting the new C phase conductor in parallel to the moved C phase jumper.

Next, as shown in FIG. 40, the new C phase conductor is paralleled by a new permanent jumper 186 installed by use of a hot stick, a boom or structure mounted air break switch 140, or a portable circuit breaker 142. Now current flows through both the new and old C phase conductors 180, 184.

Figure 41:
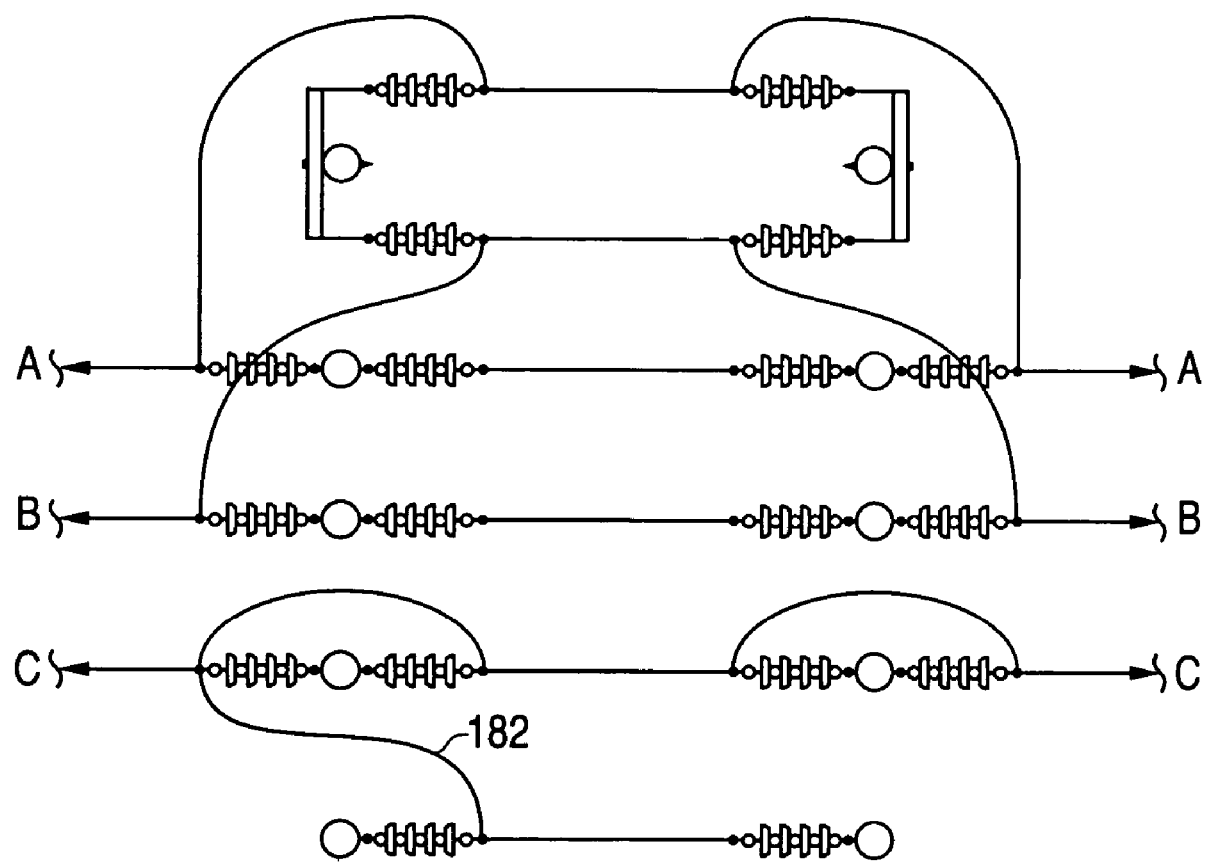
FIG. 41 is a schematic diagram of the system of FIG. 40 further showing a jumper removed from the moved C phase conductor breaking the parallel connection between the two C phase conductors.

Next, as shown in FIG. 41, the long temporary jumper 182 is removed breaking the parallel current flow through the old and new C phase conductors 180, 184. The long temporary jumper 182 is removed by use of a hot stick, a boom or structure mounted air break switch 140, or a portable circuit breaker 142.

Figure 42:
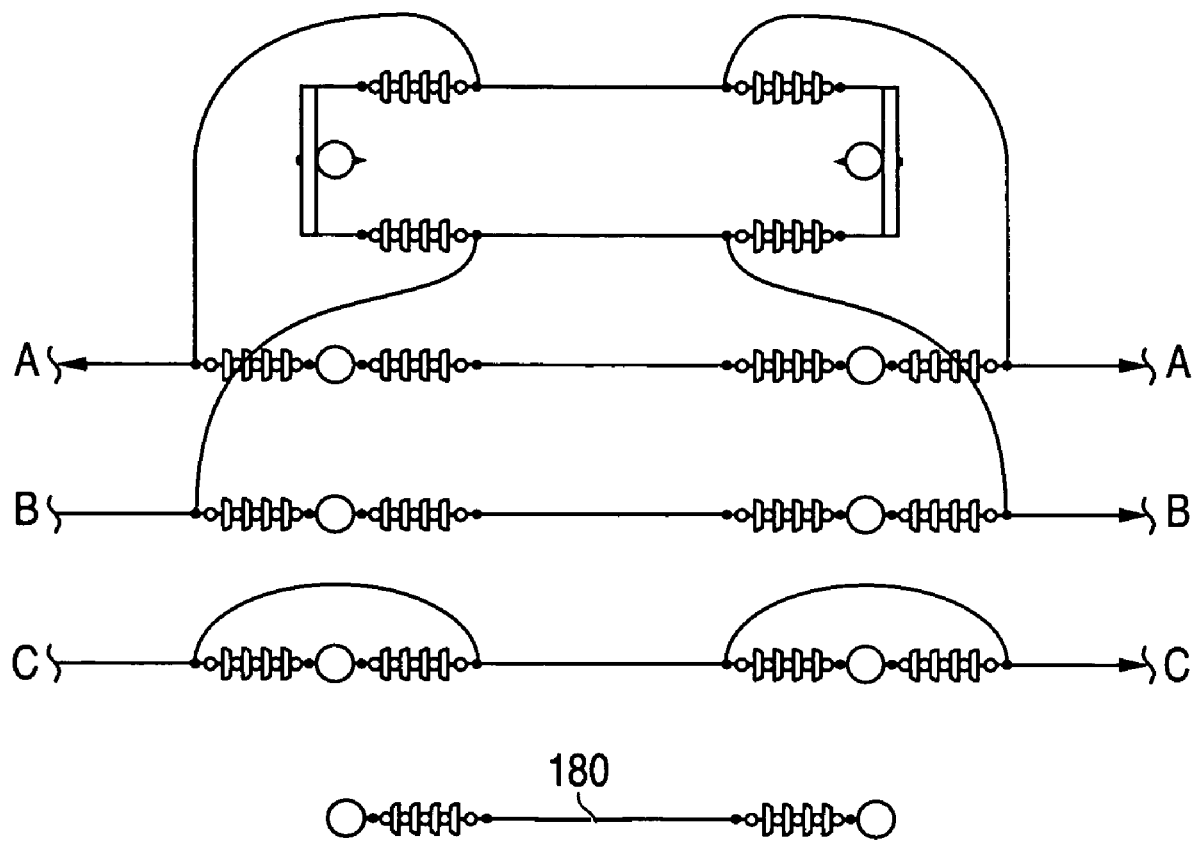
FIG. 42 is a schematic diagram of the system of FIG. 41 further showing a second jumper removed from the moved C phase conductor isolating the moved C phase conductor.
Figure 43:
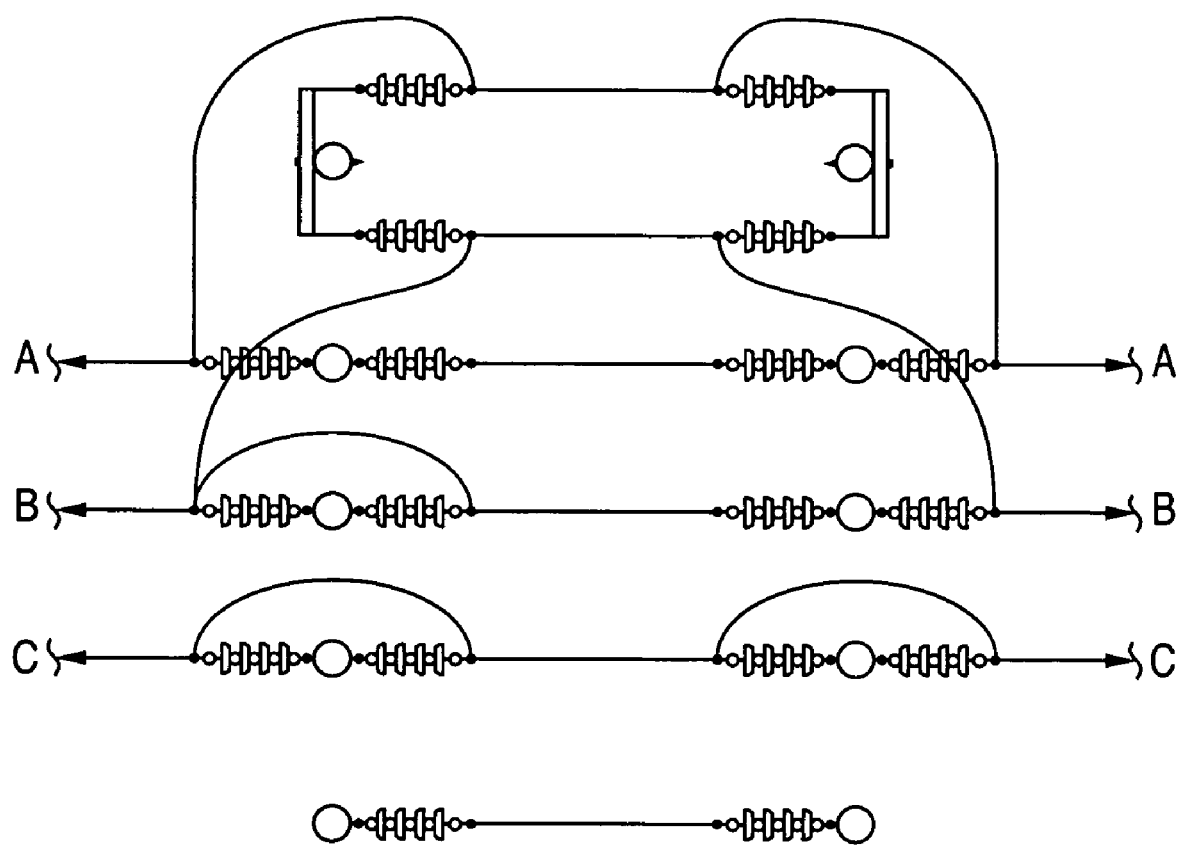
FIG. 43 is a schematic diagram of the system of FIG. 42 further showing a jumper connected to the newly strung B phase conductor.
Figure 44:
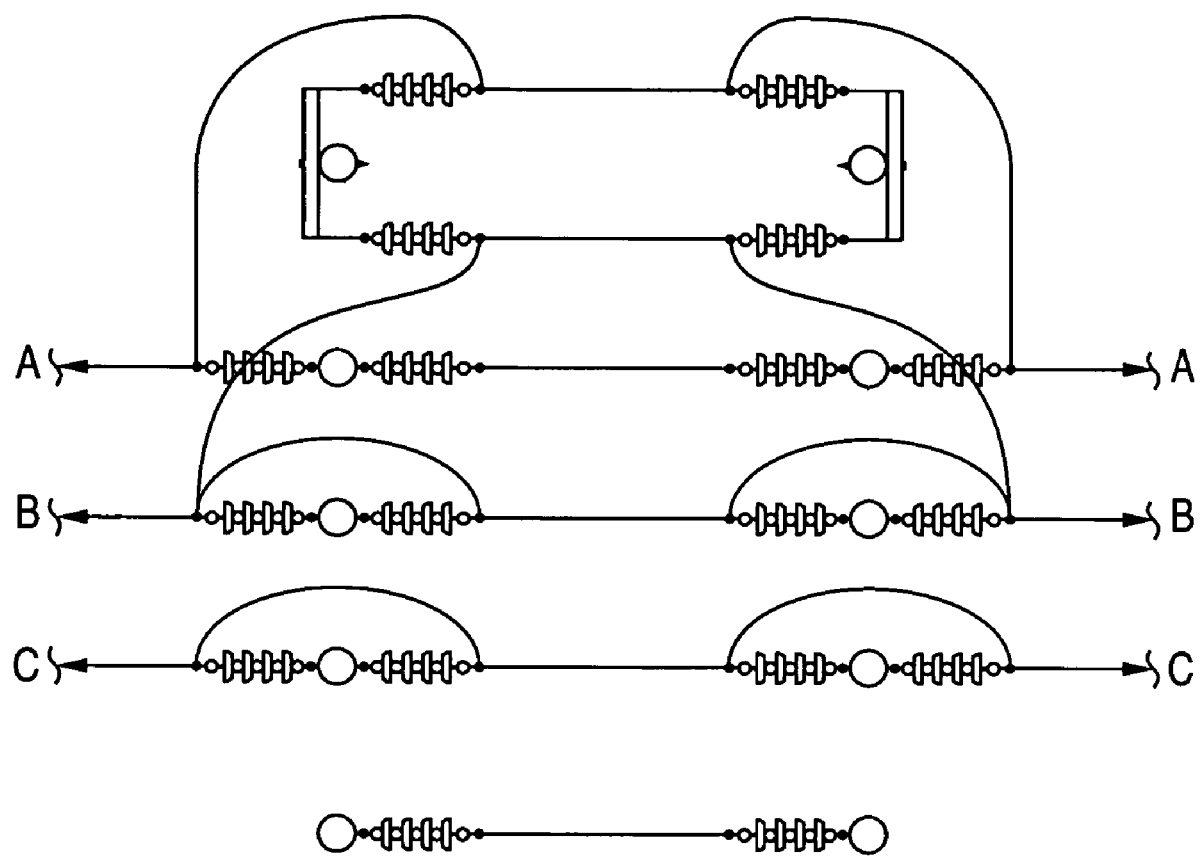
FIG. 44 is a schematic diagram of the system of FIG. 43 further showing a second jumper connecting the new B phase conductor in parallel with the moved B phase conductor.
Figure 45:
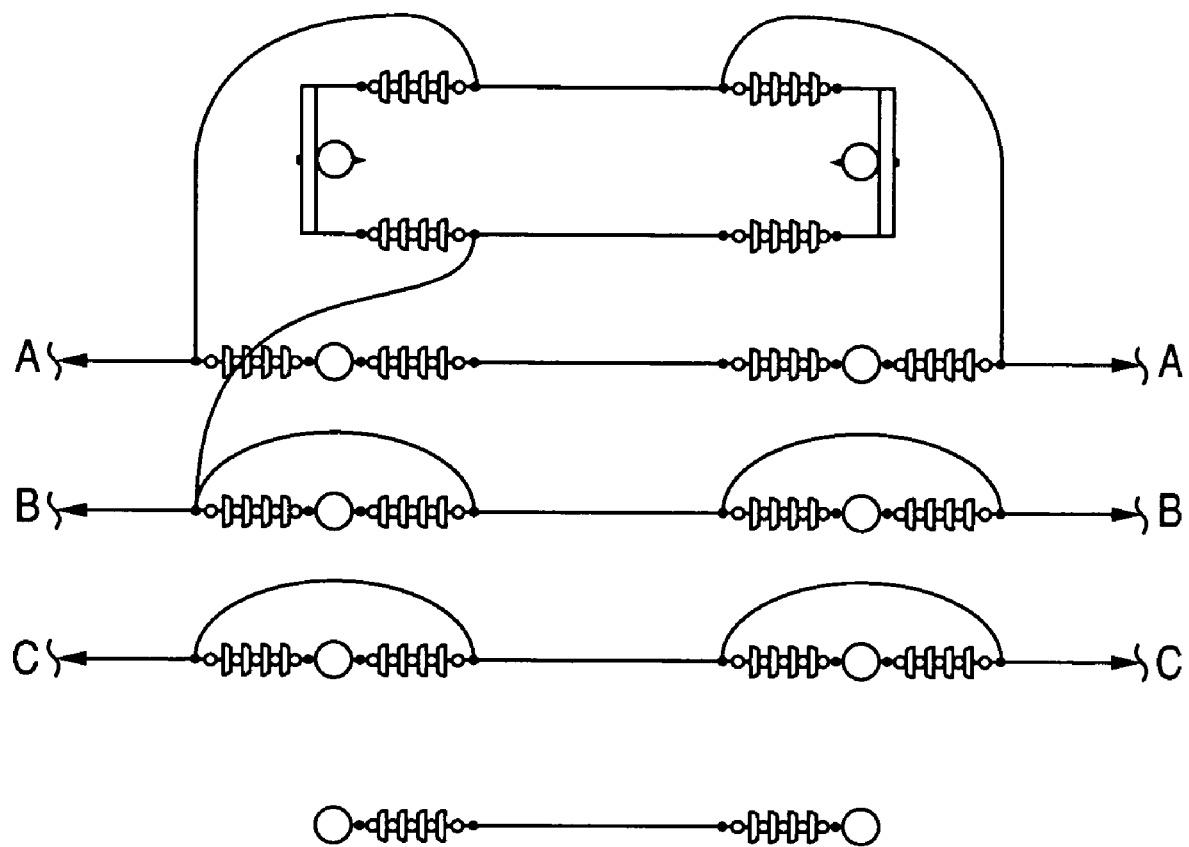
FIG. 45 is a schematic diagram of the system of FIG. 44 further showing a jumper removed from the moved B phase conductor breaking the parallel connection between the two B phase conductors.
Figure 46:
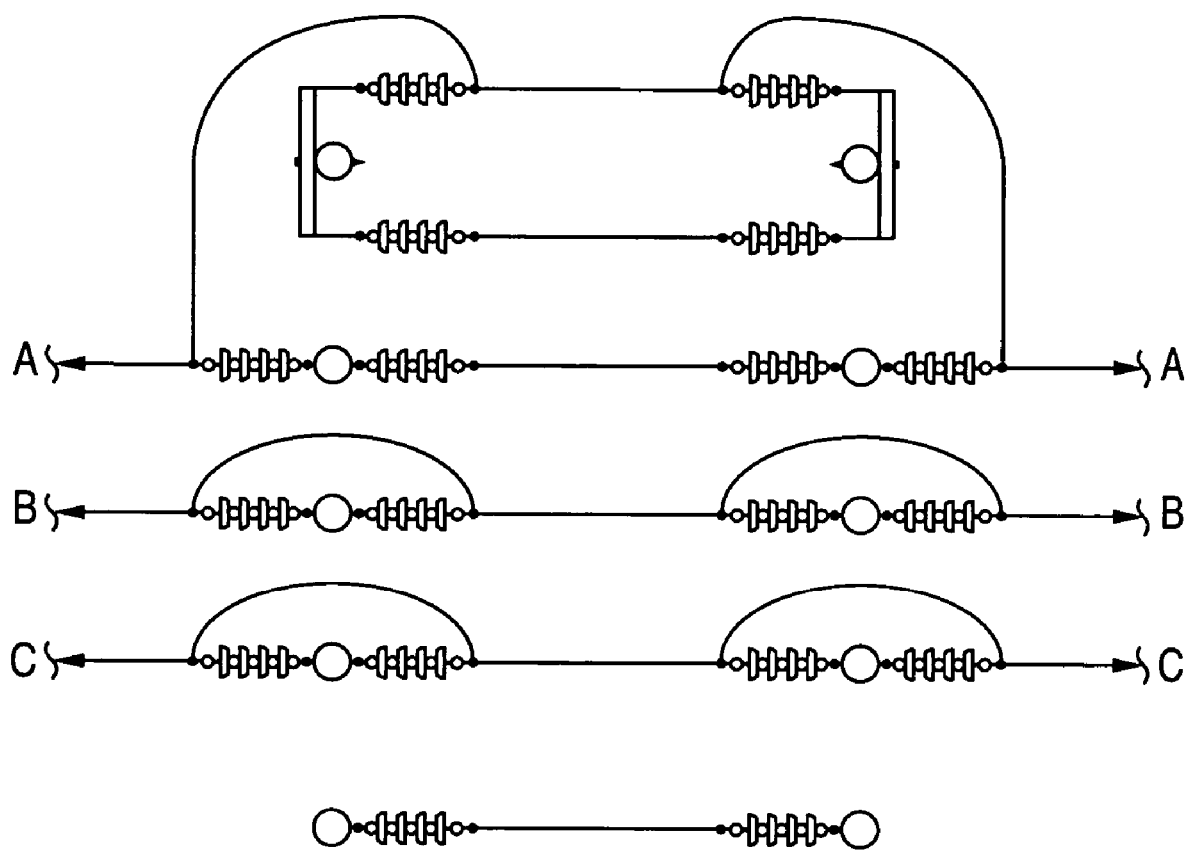
FIG. 46 is a schematic diagram of the system of FIG. 45 further showing a second jumper removed from the moved B phase conductor isolating the moved B phase conductor.
Figure 47:
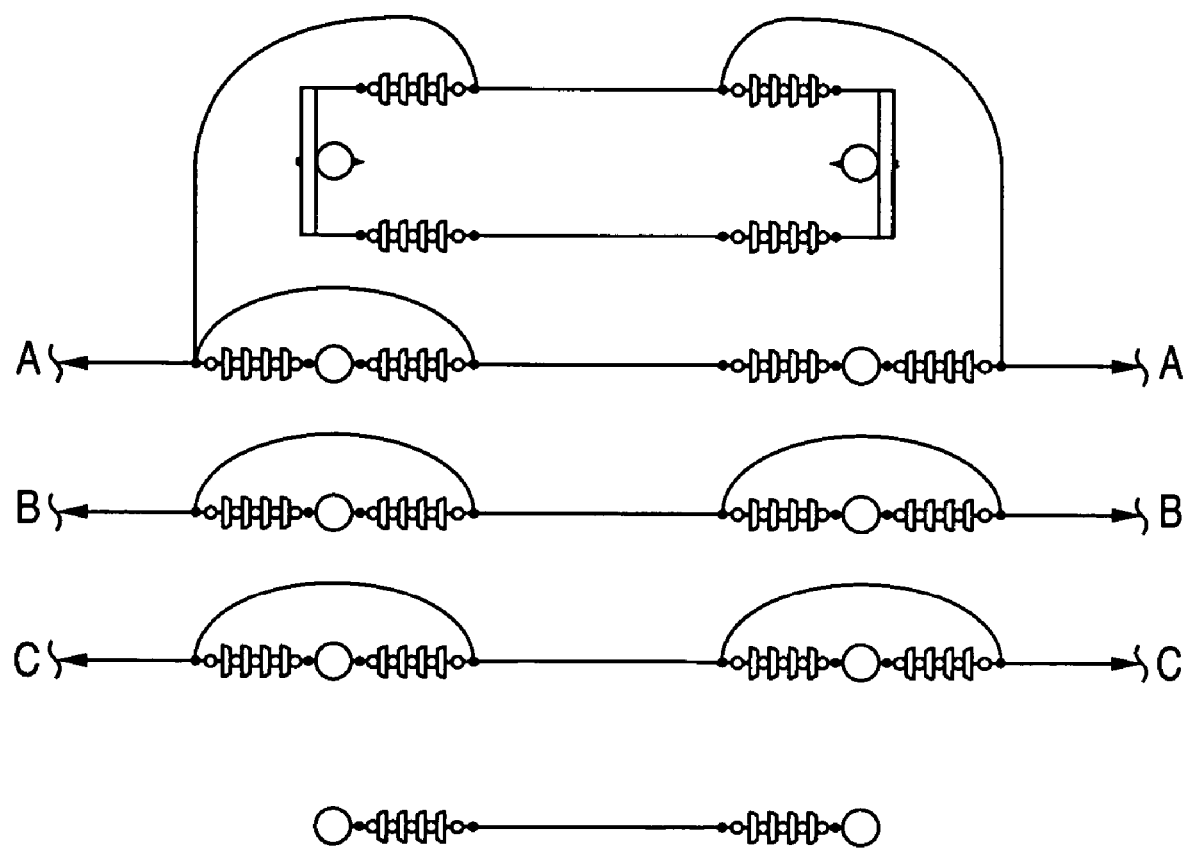
FIG. 47 is a schematic diagram of the system of FIG. 46 further showing a jumper connected to the newly strung A phase conductor.
Figure 48:
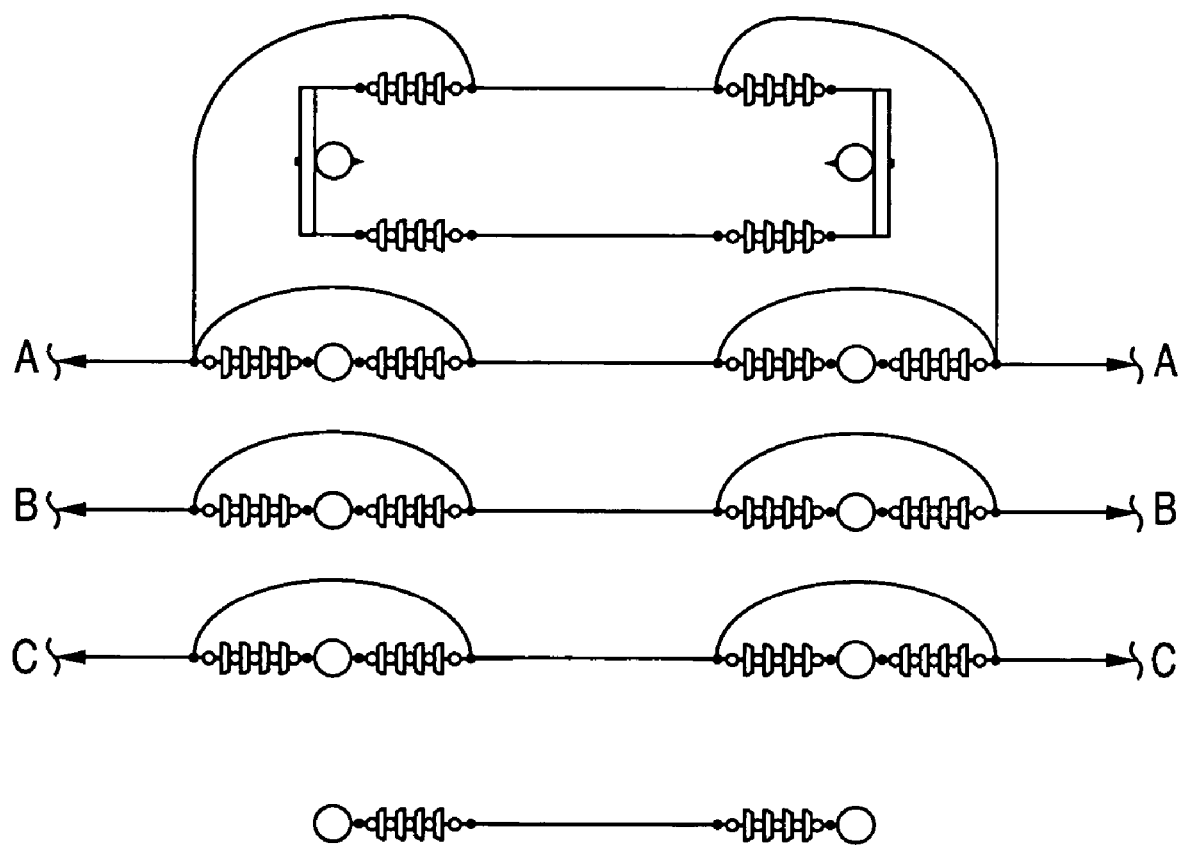
FIG. 48 is a schematic diagram of the system of FIG. 47 further showing a second jumper connecting the new A phase conductor in parallel with the moved A phase conductor.
Figure 49:
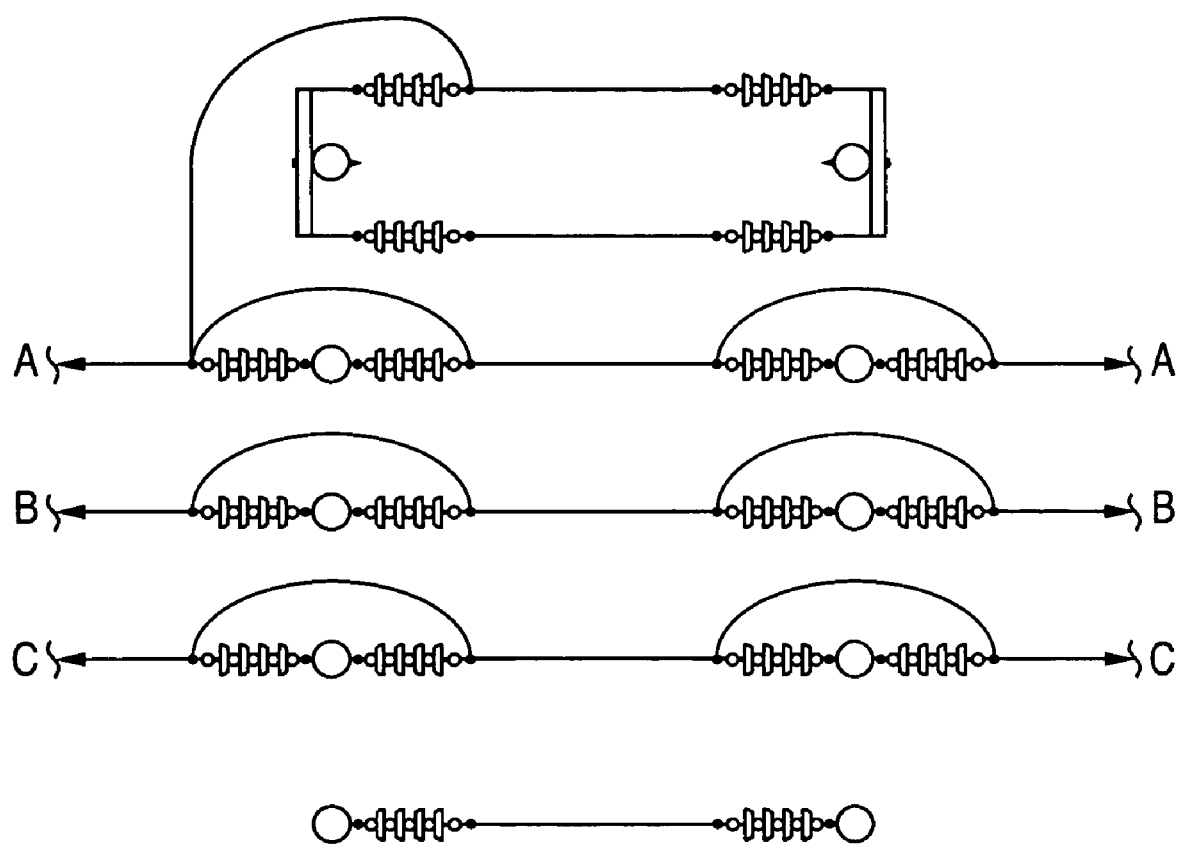
FIG. 49 is a schematic diagram of the system of FIG. 48 further showing a jumper removed from the moved A phase conductor breaking the parallel connection between the two A phase conductors.

The old C phase conductor 180 is de-energized by removing the other temporary long jumper 182 as shown in FIG. 42. The temporary long jumper 182 is removed by use of a hot stick, a boom or structure mounted air break switch 140, or a portable circuit breaker 142.

FIGS. 43-50 show the process of transferring the power load from the old B phase conductor 180 to the new B phase conductor 184 and then transferring the power load from the old A phase conductor 180 to the new A phase conductor 184 using the same process as shown and described with respect to the C phase in FIGS. 39-42. Because the process is the same, it will not be repeated herein.

Figure 50:
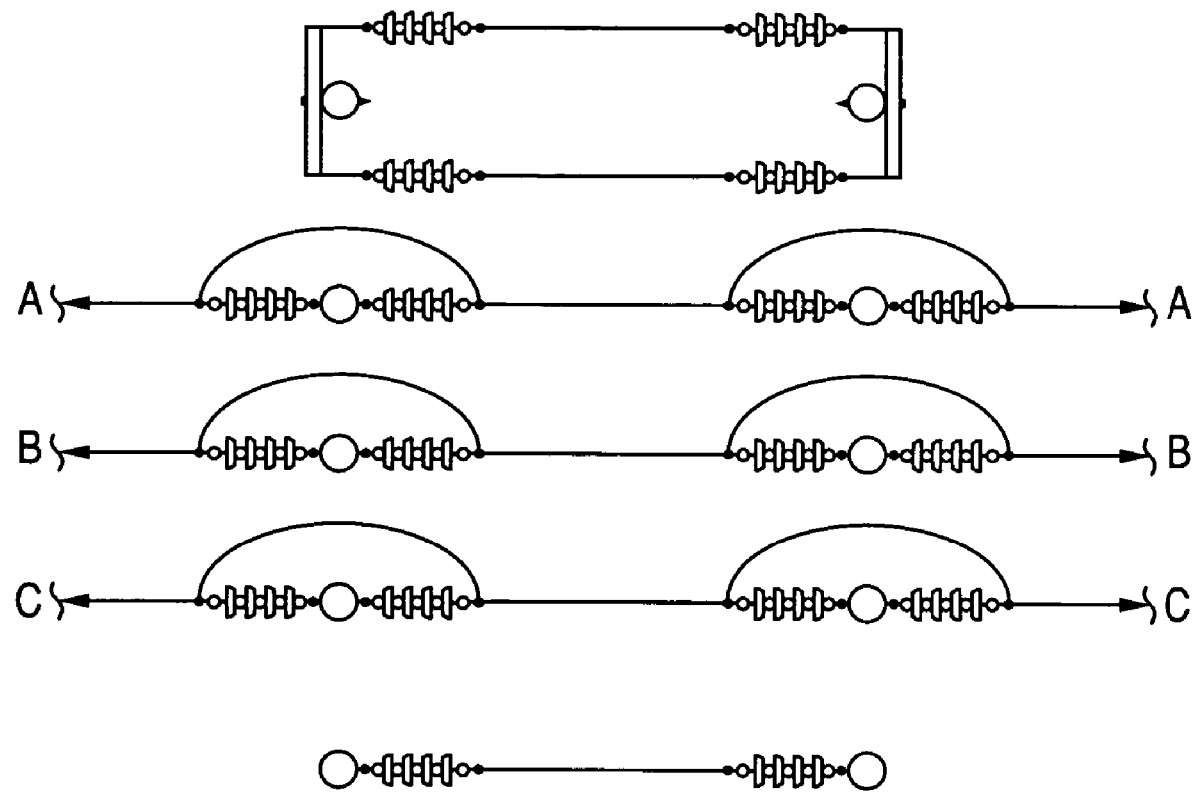
FIG. 50 is a schematic diagram of the system of FIG. 49 further showing a second jumper removed from the moved A phase conductor isolating the moved A phase conductor.
Figure 51:
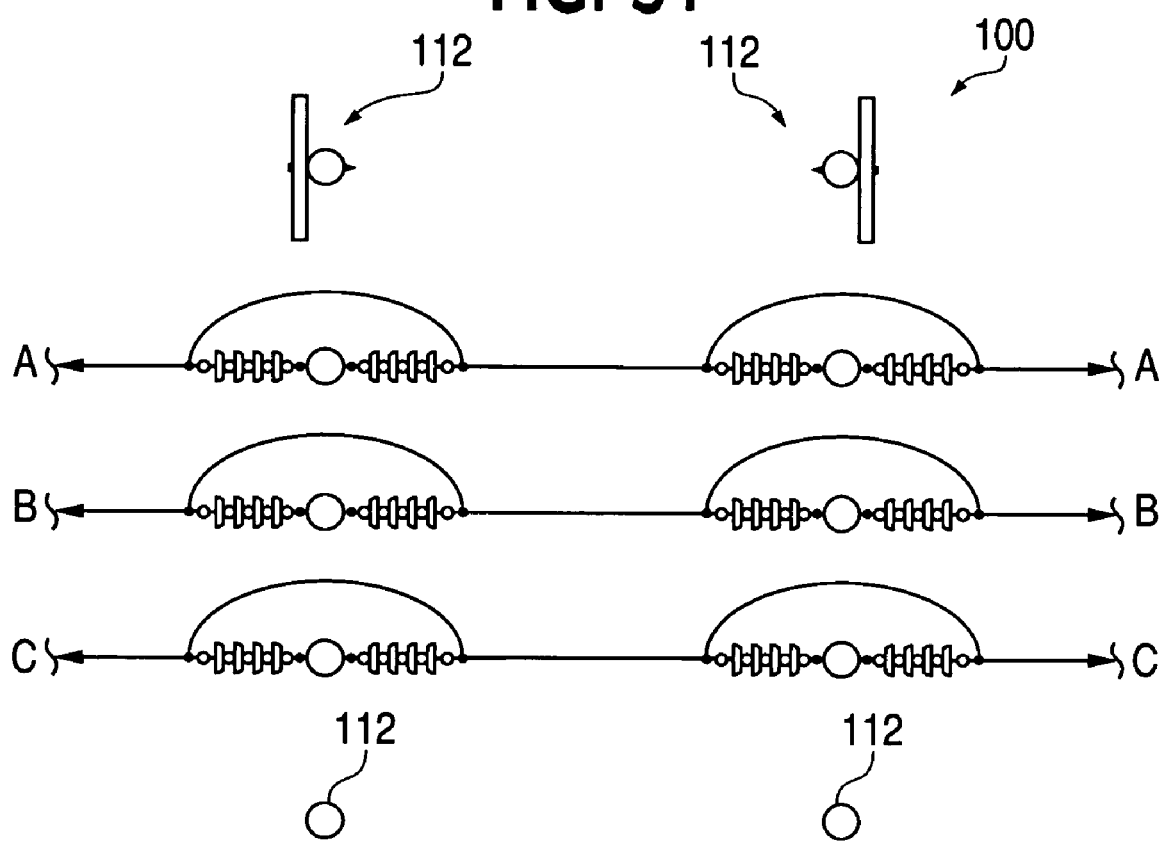
FIG. 51 is a schematic diagram of the system of FIG. 50 further showing the moved, isolated A, B, and C phase conductors removed from the system.

Once the new conductors 184 are energized and carrying current through them, and the old conductors 180 have been de-energized and isolated from the power source as shown in FIG. 50, the old conductors 180 and any accompanying attachments such as insulators 106 are removed from the system 100 as shown in FIG. 51. The old conductors 180 are and should be treated as energized conductors due to induction currents they may have by nature of their close proximity to the load carrying new conductors 184. A detailed process for removing the old conductors from the system is described in detail later herein.

Figure 52:
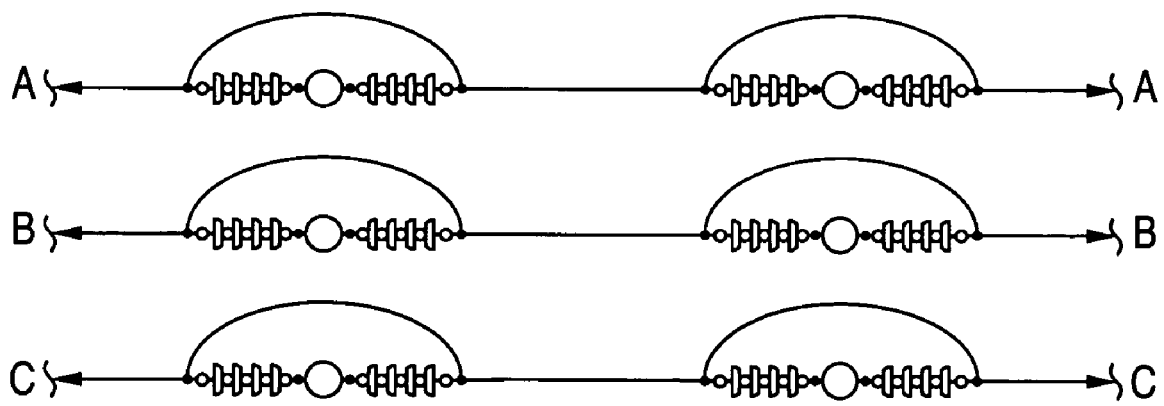
FIG. 52 is a schematic diagram of the system of FIG. 51 further showing the temporary support structure removed.

The temporary support structures 112 may be used again if moving of conductors 184 needs to be done with respect to another part of the system 100. Otherwise, the temporary support structures 112 are removed as shown in FIG. 52.

Both of the embodiments of the invention that have been described, using a D phase conductor to transfer the load temporarily and temporarily relocating the conductors, permits sections of new conductors, located between dead ends to be strung one at a time. If it is desired to string new conductors along the entire length of a system 100, or a length longer than practical for stringing conductors, then the re-conductoring methods are used for lengths that are practical and repeated along the length of the system until a desired length of new conductor is installed along the system.

Figure 53:
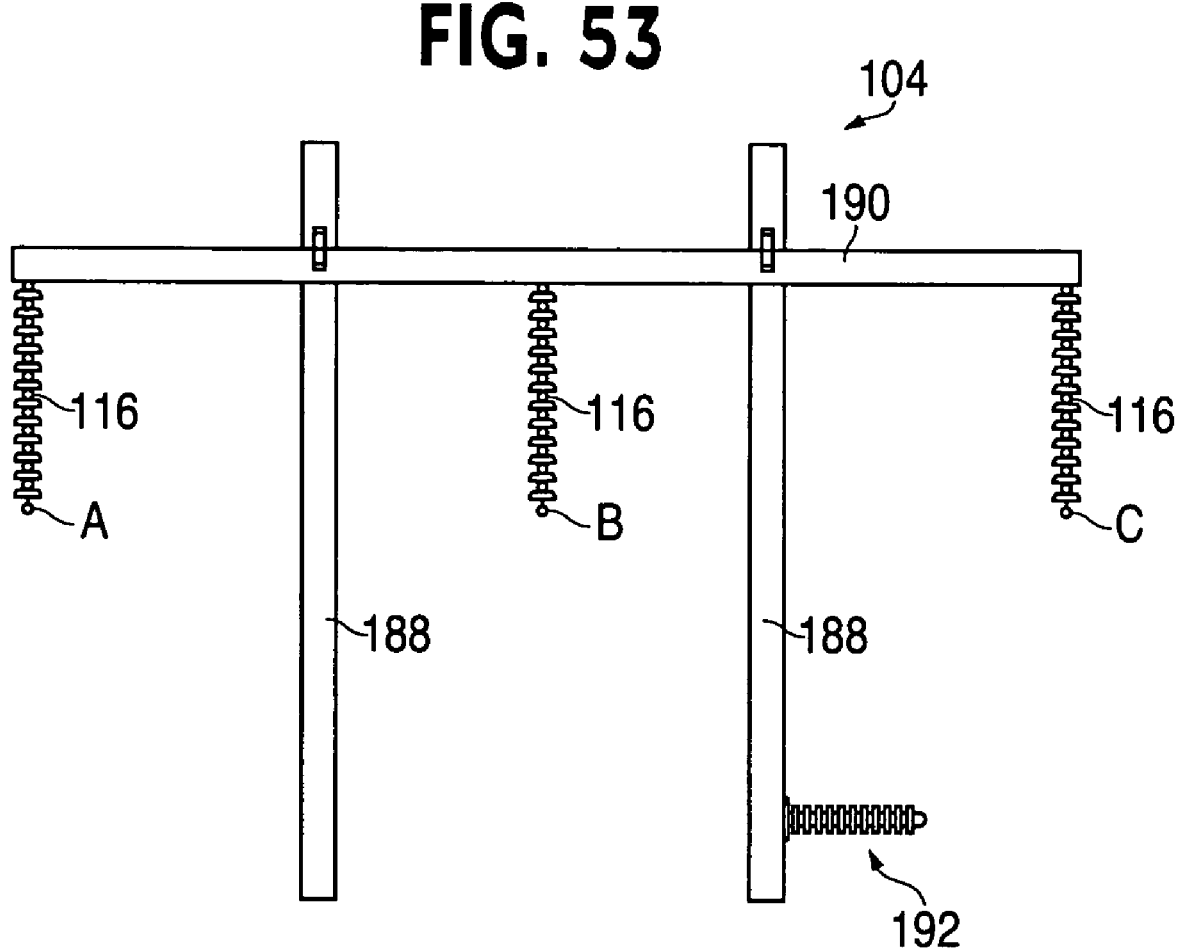
FIG. 53 is a side view of a support structure for a power transfer system showing an H frame structure configured to support the three A, B, and C conductors and a D phase conductor.

FIGS. 53 and 54 show different examples of temporary support structures 112 that may be used to support a temporary D phase conductor 114. FIG. 53 shows an example of an old support structure 104 configured to support A, B and C phase conductors 102. The old support structure 104 is comprised of two poles 188 and a crossarm 190. The conductors 102 for the A, B and C phases are supported by insulators 116 attached to the crossarm 190. A temporary D phase conductor 114 can be attached to the support structure 104 by a temporary insulator 192 that is cantilevered from one of the poles 188. At the end of the temporary insulator 192, the D phase conductor 114 may be attached. Care should be taken when configuring a D phase conductor 114 to allow ample spacing between the conductors 102, 114 for the required amount of clearance. For example, the limit of approach for 170 kilovolt line is 4 feet. One skilled in the art will know the proper amount of clearance between the conductors 102, 114 to provide working space based on the voltage on the conductors 102, 114.

FIG. 54 illustrates a support structure 104 similar the support structure 104 shown in FIG. 53. A temporary support structure 112 is attached to the support structure 104. The temporary support structure 112 includes a crossarm 194 attached to a temporary pole 196 at one end and the support structure 104 at the other end. Once the temporary support structure 112 is installed, a temporary insulator 192 can be attached to the crossarm 194 and the temporary D phase conductor 114 can be attached the insulator 192.

It is appreciated by one skilled in the art, that in some systems 100, more than one conductor 102 carries the power load for a particular phase. This may be done in instances when a load is greater that a single conductor can accommodate. In such cases multiple (bundled) conductors 102 are often located next to each other and may hang from the same insulator 116 as shown in FIG. 54. The conductors may be separated by spacers 198. Such bundle conductor systems 100 may be re-conductored in accordance with the invention by application of the procedures described herein to each conductor 102.

Figure 55:
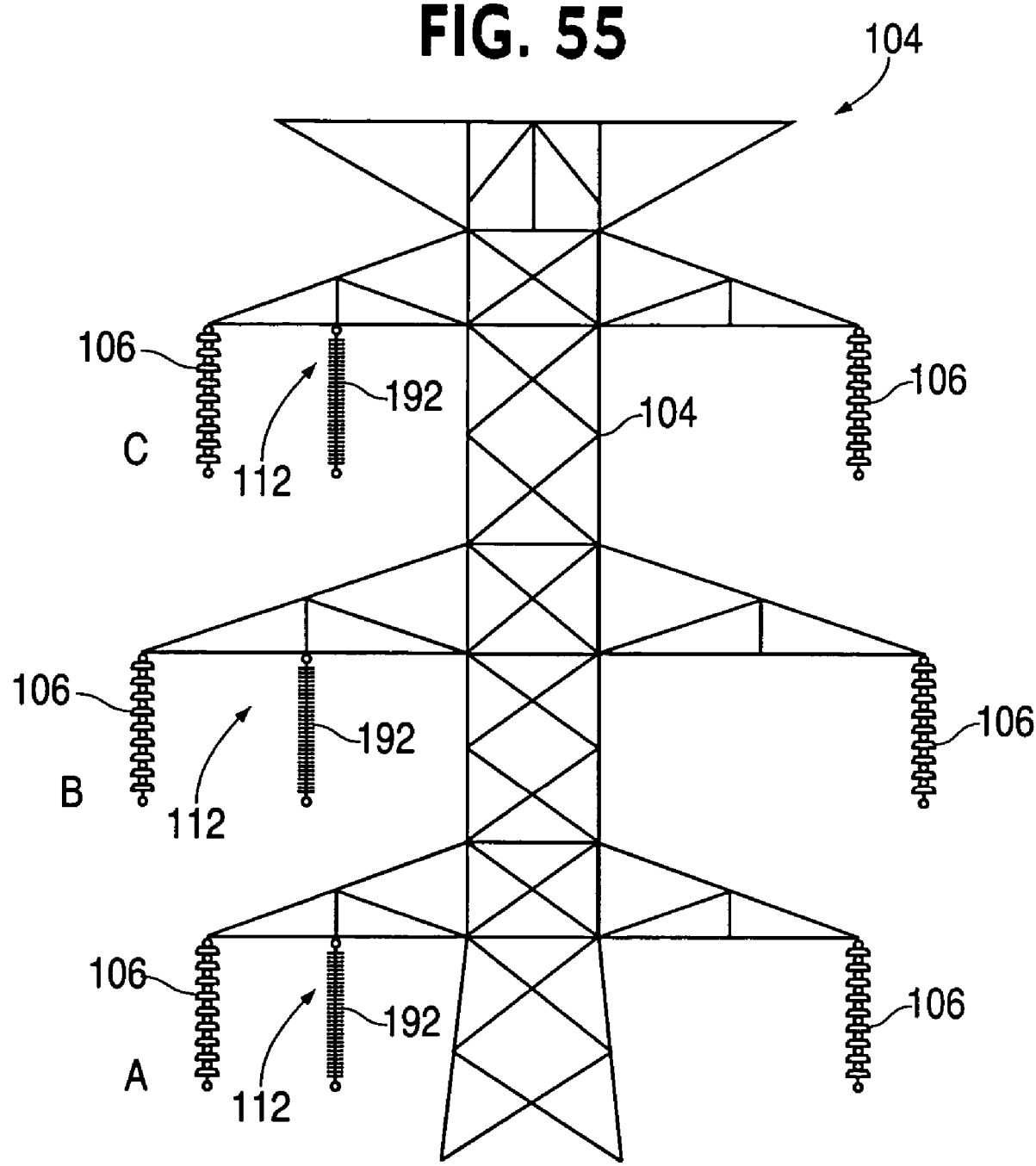
FIG. 55 is a side view of a support structure configured to carry six standard conductors and three temporary conductors.
Figure 56:
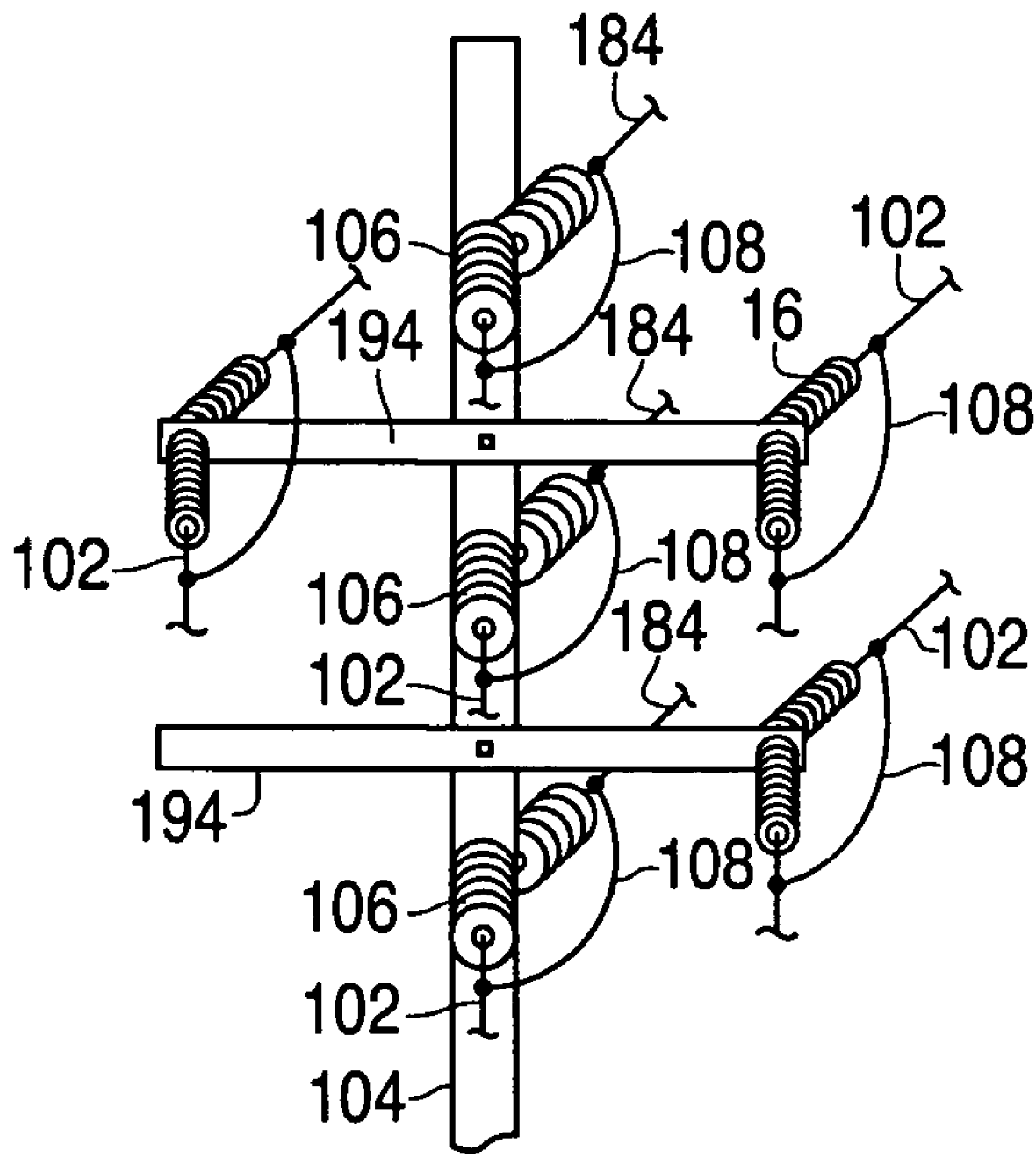
FIG. 56 is a side view of a dead end support structure configured to support six conductors in a dead end configuration, three standard conductors and three temporary conductors.

Other examples of support structures that may be used in accordance with some embodiments of the invention are shown in FIGS. 55-56. FIG. 55-56 show a temporary support structure 112 that may be added to existing support structure 104 by moving conductors 102 in accordance with the invention. FIG. 55 shows one optional type of support structure 104 in accordance with the invention. A support tower 104 is configured to carry the conductors 102 of two circuits on each side of the tower. An A, B and C conductor may be attached to the tower 14 via an insulator 106 on either or both sides of the tower. Temporary insulators 192 are installed halfway between the permanent insulators 106 and the tower body 14 and are attached to the support structure 104. The support structure 104 and insulators 106 are shown in a non dead end configuration in that the insulators 106 and 192 are configured to support the conductor 102 weight and do not require jumpers 108 to carry electrical current around to the conductor 102 position on the other side of the support structure 104. The type of support structure 104 shown in FIG. 55 would be an intermediate support structure and located between dead ends 110.

FIG. 56 shows an example of a dead end 110 support structure 104 in accordance with an embodiment of the invention. The support structure is a pole 104. The pole 104 supports insulators 106 and newly strung conductors 184 in a dead end configuration. Temporary support structures 112 in the form of temporary crossarms 194 are attached to old support structure 104 and will be removed when the old conductors 102 are removed.

Important aspects of some embodiments of the invention include stringing new conductors on an energized power system 100. A part of the stringing operation includes use of equal potential zones 200. The construction, purpose, and bonding of equipment to equal potential zones will now be described with reference to FIGS. 57-68. After which a stringing procedure in accordance with the invention will be described with reference to FIGS. 69-95.

An equal potential zone 200 as shown in FIGS. 57-68 will now be described. In order to bring workers to the same electrical potential as the lines that they are working on, an equal potential zone 200 is created. When workers and equipment are at the same electrical potential as the conductor, the conductor can be worked without the need for keeping the workers insulated from the conductor. Using an equal potential zone 200 is one way of keeping workers and conductors at the same potential.

In accordance with some embodiments of the invention, equal potential zones 200 include a large mat(s) 202 located on the ground. Workers and the equipment they will be using is located on the equal potential zone 200. All equipment and conductors currently being worked on are electrically bonded to the equal potential zone 200, which in turn, is connected to ground. In the event that a conductor being worked on becomes energized, or changes in potential, everything on the equal potential zone, including personnel, raises or lowers in voltage equal to the conductor so that there is no differences in potential between them.

Eliminating differences in potential between workers, equipment and conductors protects workers from currents that may flow between differences in potential. Energized conductors create an electromagnetic field around them, and stringing a conductor in close proximity to that electromagnetic field induces a voltage in the conductor being strung. Thus, even if a conductor is not connected to a power source, it may have a significant potential. The equal potential zone 200 also protects the workers from induced voltage occurring on the conductor when stringing a conductor in close proximity to energized conductors. However, when all stringing equipment and conductors being worked on are bonded to the equal potential zone 200 and to ground, the potential is the same between workers the equipment and the conductor being worked on.

The first step of preparing an equal potential zone 200 is to prepare the equal potential zone site. The site is prepared by leveling a large area, large enough for all of the equipment necessary to be parked on the equal potential zone 200. Next, conductive mats 202 are laid down on the leveled area. The mats 202 should be large enough to provide working room around the stringing equipment.

Figure 57:
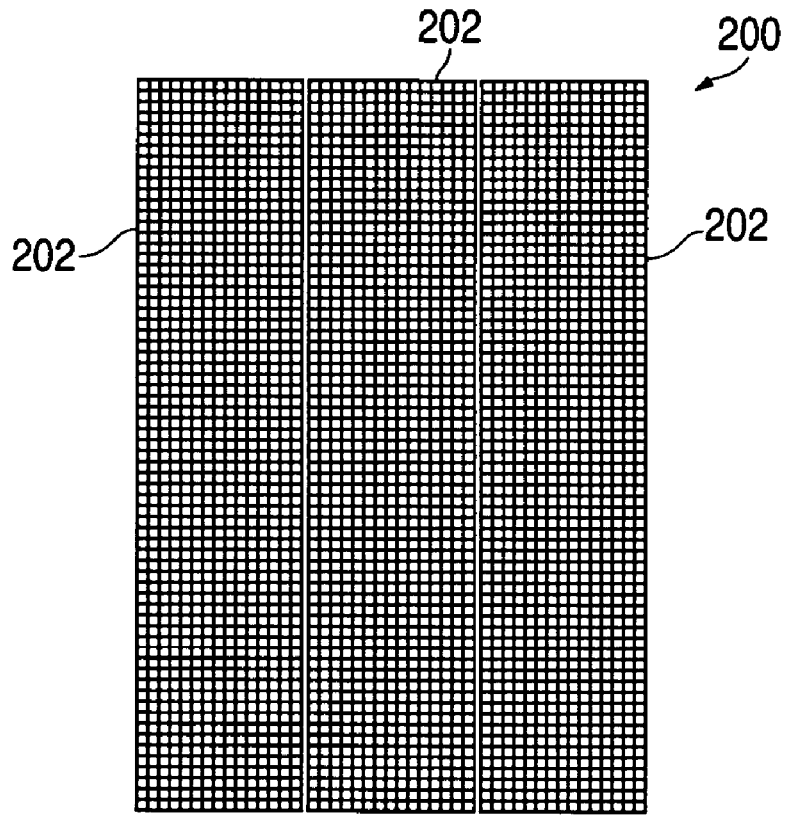
FIG. 57 is a top view of a partially constructed equal potential zone made of three conductive mesh mats laying side by side together.
Figure 58:
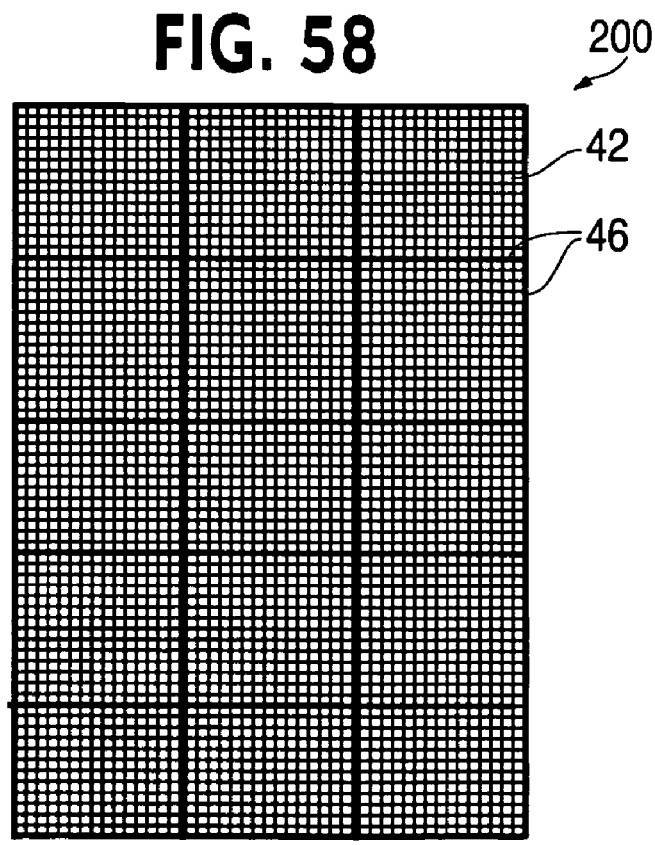
FIG. 58 is a top view of partially constructed equal potential zone showing the mats of FIG. 57 electrically bonded together.

FIG. 57 shows an example of mats 202 being laid down as a step in forming an equal potential zone 200. The mats 202 are preferably made of metal mesh fencing where the mesh is solid, not loose such as chain link. Alternatively, the mats 202 can be vinyl mats with copper braiding sewn into them, thus providing a electrical connection around and through each mat 202. If prefabricated fencing is used, the fencing pieces are electrically bonded together using a #2 ASCR conductor or similar conductor. Several mats 202 of metal fencing electrically bonded together create a zone of equal electrical potential as shown in FIG. 58.

Figure 59:
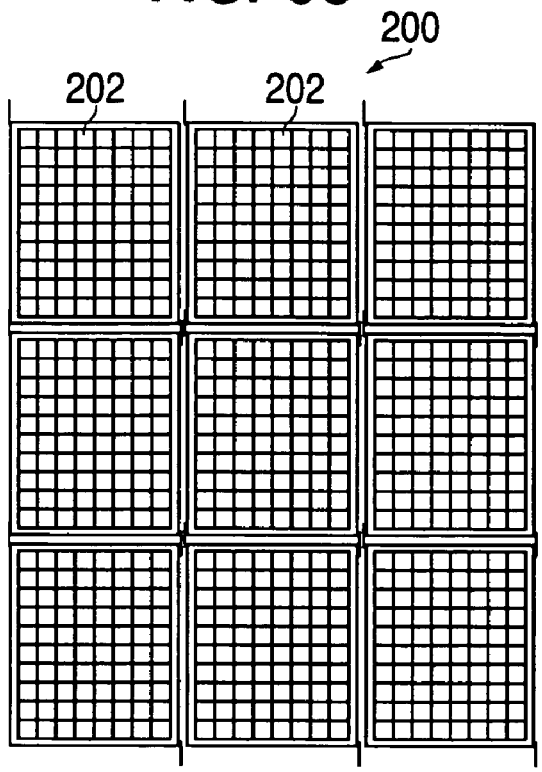
FIG. 59 is a top view of an alternate embodiment of a partially-constructed equal potential zone showing vinyl mat sections layed out together.

FIG. 59 shows an alternate embodiment in accordance with the present invention where an equal potential zone 200 is made of several vinyl mats 202 laid out and electrically bonded together.

Figure 60:
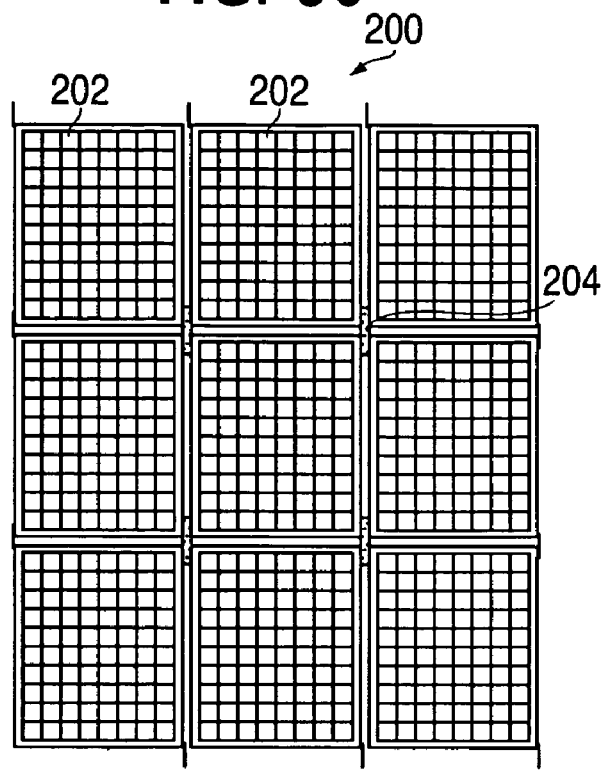
FIG. 60 is a top view of a partially-constructed equal potential zone showing the mats of FIG. 59 bonded together.

FIG. 60 shows an alternate way of making an equal potential zone 200 where the smaller vinyl mats 202 were laid out together and bonded by conductor 204 creating a partially-constructed equal potential zone 200.

Figure 61:
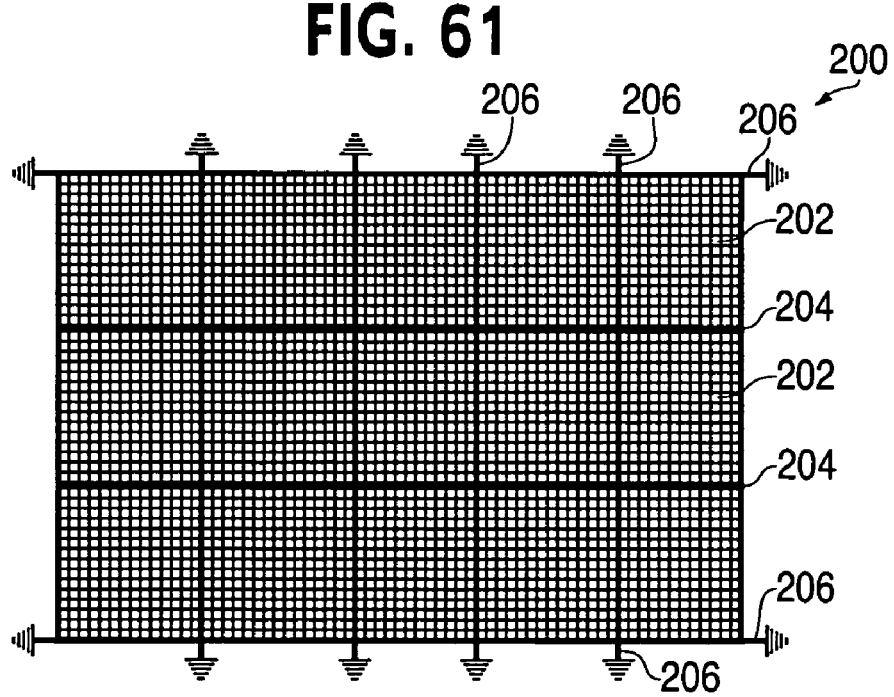
FIG. 61 is a top view of a partially-constructed equal potential zone showing the bonded together mats grounded by bonding the mats to ground rods.

Another step in creating an equal potential zone 200 is shown in FIG. 61. Ground rods 206 are placed around the perimeter and at other areas as needed of the equal potential zone 200. The ground rods 206 are bonded electrically to the mats 202 and/or the bonding conductor 204. The ground rods 204 are metal conductive rods driven into the ground and thereby grounding the equal potential zone 200.

To provide a transition for workers entering and exiting the equal potential zone 200, an insulated section 208 (see FIGS. 62 and 63), is installed. The insulated section 208 is used to avoid exposing workers to step potential. Because the earth is a poor conductor, the potential of the earth located a foot or so from the equal potential zone 200 may have a significantly different potential than the equal potential zone 200. If a worker where to have one foot on the equal potential zone, and one foot on the ground, each foot could be at a different potential. To avoid exposing workers to the difference in potential between the equal potential zone 200 and the earth a short distance way from the equal potential zone 200, workers will first step onto the insulated section 208 and then from there, step onto the equal potential zone 200.

Figure 62:
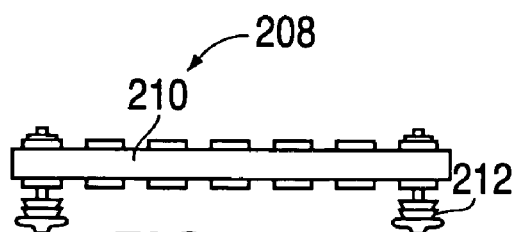
FIG. 62 is a side view of an insulated access point for an equal potential zone using insulators.

In one embodiment of the invention, the insulated sections 208 include multiple prefabricated insulating sections. For example, as shown in FIG. 62, the insulated section 208 can include a wood pallet or bridge 210 mounted on top of pin insulators 212 arranged on the corners or in some other suitable arrangement where the pin insulators 212 mechanically support the wood pallet or bridge 210 and provide electrical insulation for the pallet or ground 210 from the ground.

Figure 63:
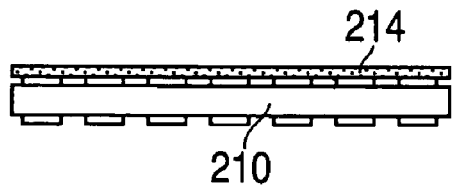
FIG. 63 is a side view of an alternate embodiment of an insulated access point for an equal potential zone using a rubber mat.

In other embodiments of the invention, the insulated sections 208 may include a wood pallet or bridge 210 with an insulated rubber mat 214 laying on top of the wood pallet or bridge 210 (as shown in FIG. 63). Several insulated sections 208 may be configured into a walkway 216 (see FIG. 64) having a wood pallet or bridge 210 with a rubber mat 214 laying on top of the wood pallet or bridge 210, then a wood pallet or bridge 210 on top of pin insulators 212 then another wood pallet or bridge 210 with an insulated rubber mat 214 laying on top of the wood pallet or bridge 214.

Figure 64:
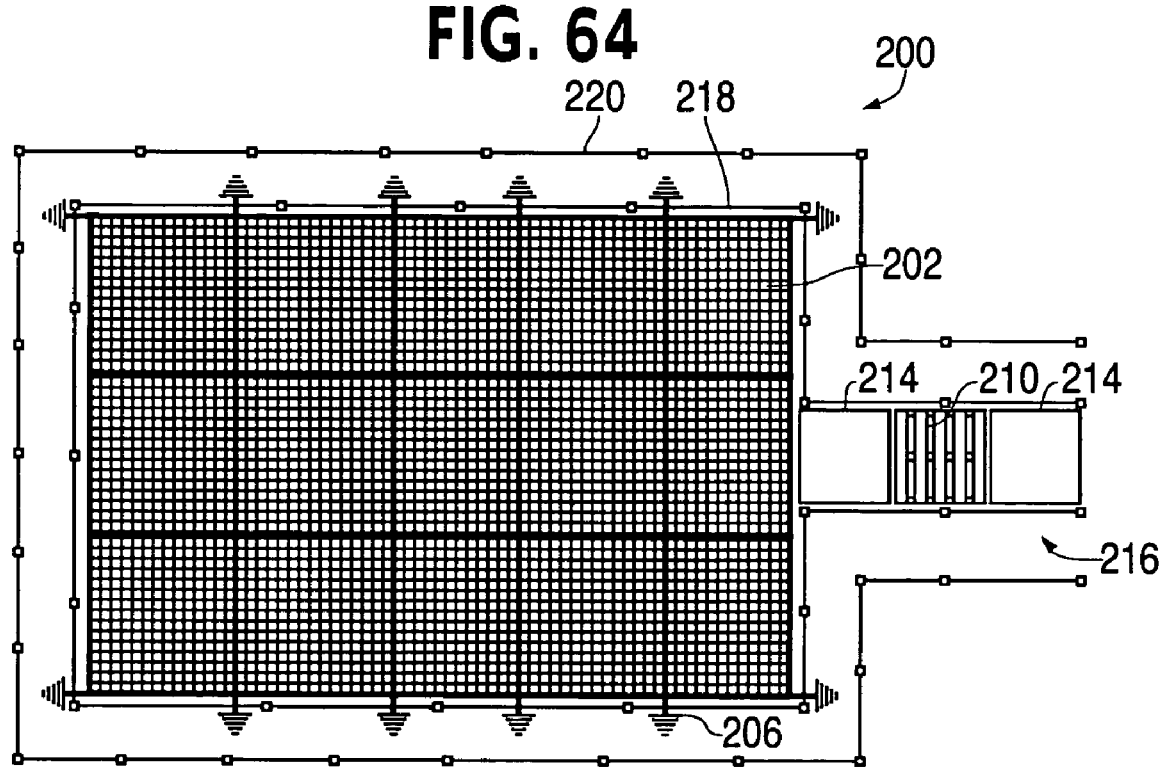
FIG. 64 is a top view of an equal potential zone.

All equipment should then be placed on and bonded to the equal potential zone 200. As shown in FIG. 64, barrier fences 218, 220 are erected around the perimeter of the equal potential zone 200 to keep personnel on the equal potential zone 200. The barrier fencing 218, 220 should also be placed next to the walk way 216 (as shown in FIG. 64) but open at one end to allow personnel onto the insulated section 208. The insulated sections 208 may include several pallets or bridges 210 (as shown in FIG. 64). A second barrier fence 220 is installed 6 to 10 feet outside the equal potential zone 200 to keep personnel from passing tools and equipment back and forth from the equal potential mat 202 and the area outside the mat. The second barrier fence 220 should also be installed around the insulated walkway 216.

Figure 65:
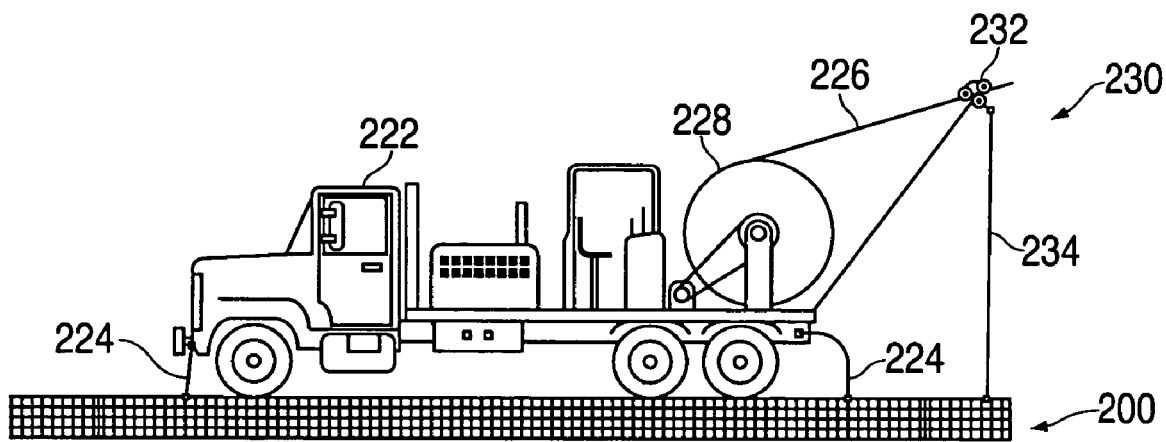
FIG. 65 is side view of a puller truck parked on top an equal potential zone where the truck is bonded to the equal potential zone and the puller line is also bonded to the equal potential zone.

As mentioned above, stringing equipment should be located on and bonded to the equal potential zone 200. The following description describes examples of locating and bonding equipment to the equal potential zone 200 with reference to FIGS. 65-68. As shown in FIG. 65, stringing equipment such as a puller 222 is located on the equal potential mat 202 and bonded to the mat 202 by a conductive jumper 224. The conductive jumper 224 electrically connects equipment such as a the puller 222 to the equal potential mat 202. It may be desired to bond the equipment at more than one location (as shown in FIG. 65) where the puller 222 is bonded at both the front and rear. The puller 222 has a pulling rope 226 wrapped on a reel 228, which is also bonded to the equal potential zone 200.

To electrically bond the pulling rope 226 to the equal potential zone 200, a running ground 230 is used. The running ground 230 includes a rolling ground 232 and a conductive jumper 234. The rolling ground 232 is configured to permit the pulling line 226 to move through the rolling ground 232 while maintaining an electrical connection between the pulling line 226 and the pulley assembly 232. The pull line 226 is electrically bonded to the equal potential zone 200 via a conductive jumper 234 connecting the rolling ground 232 to the equal potential zone 200. Thus, the running ground 230 permits the pulling line 226 to move off the reel 228 as it is being pulled and still maintain an electrical bond with the equal potential zone 200.

Figure 66:
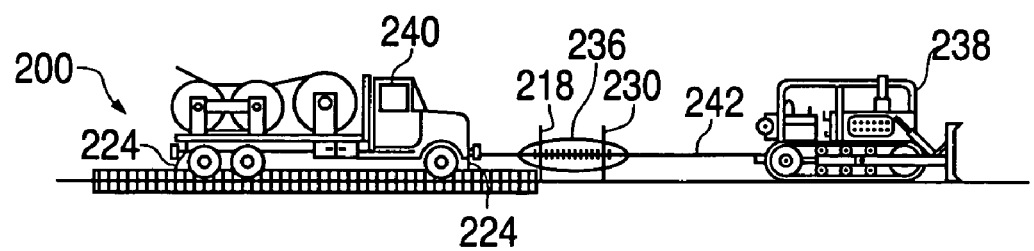
FIG. 66 is a side view of a payout truck parked on an equal potential zone, mechanically attached to, but electrically isolated from, a bulldozer.

Due to the high tensions sometimes associated with stringing conductors 102, some times anchors are used to secure stringing equipment in place. If an anchor located on the equal potential zone 200 is used to secure the stringing equipment in place on the equal potential zone 200, the anchor is bonded to the equal potential zone 200 as well. As shown in FIG. 66, a bulldozer 238 or some other vehicle may be used as an anchor for the stringing equipment. If the anchor is located off the equal potential zone 200 (as shown in FIG. 66) then the cable connecting stringing equipment to the anchor vehicle 236 is electrically insulated.

One way to insulate the stringing equipment from the anchor vehicle 238 is by using a polymer insulator 236. The polymer insulator 236 is installed at the edge of the equal potential zone 200 (as shown in FIG. 66). A piece of stringing equipment, such as a payout truck 240, or other stringing vehicle is located on the equal potential zone 200 and electrically bonded to the equal potential zone 200 via conductive jumpers 224. An anchor cable 242 mechanically connects the stringing equipment such as a payout truck 240 to the anchor vehicle 238, which is, in FIG. 66, a bulldozer. Thus, the stringing equipment 240 and the anchor 238 are mechanically connected but not electrically connected. The anchor cable 242 has, at least in part, a polymer insulator 236 section. In other embodiments of the invention, the anchor 242 is entirely made up using polymer insulators. The anchor cable 242 extends through the barrier fence 218 and the secondary or outer barrier fence 220.

Sometimes it may be desirable to transfer objects on and off the equal potential zone 200. For example, extra reels containing conductor, hard line, or pull rope may need to be moved on and off the equal potential zone. When loading anything on and off the equal potential zone, an insulator must insulate the equipment loading the objects on and off the equal potential zone. If a crane is used, the crane can be located off of the equal potential zone, but the cable portion of the crane that lifts the object may have an insulation rope or other insulator attached to it so that the crane and the object are electrically insulated for each other. Optionally the crane may lift the object via an insulation rope.

Figure 67:
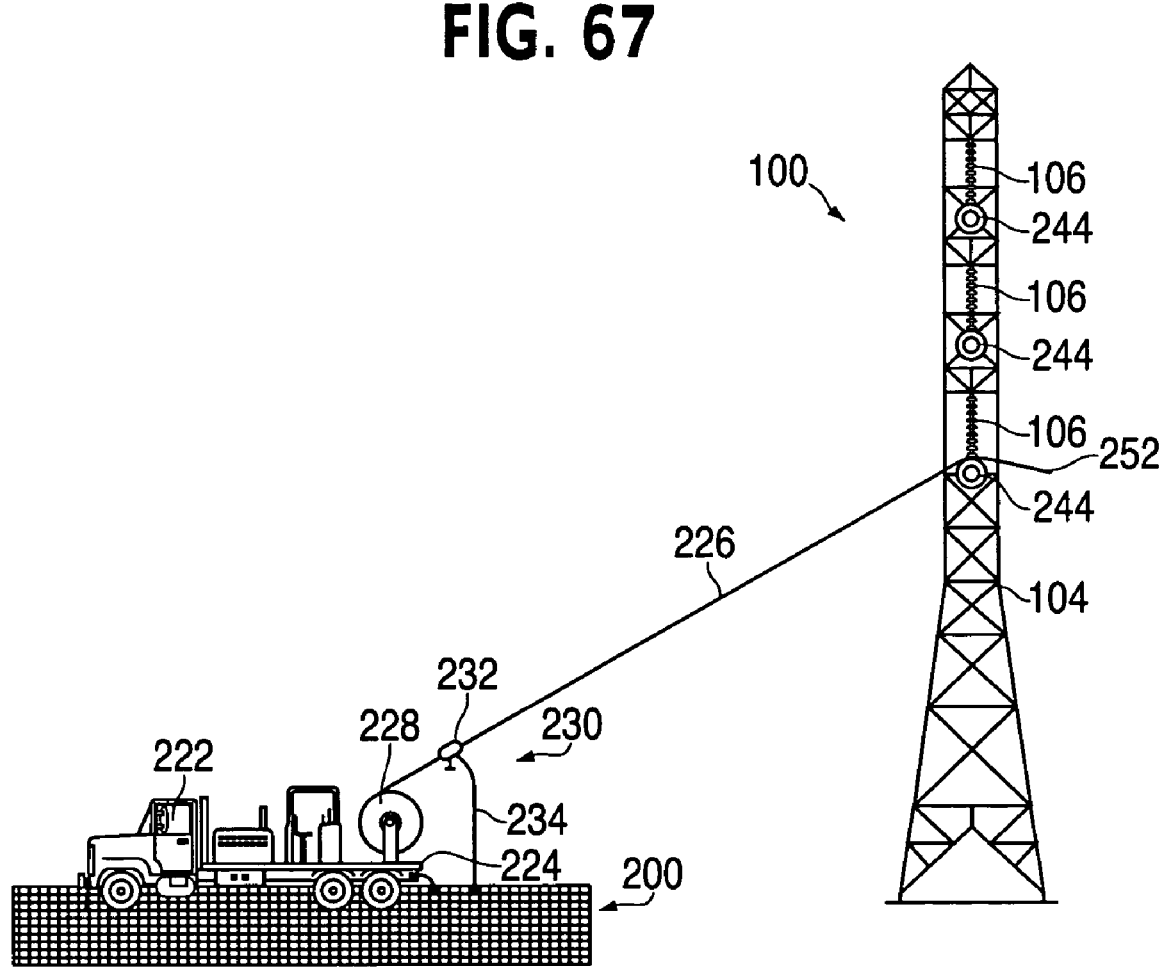
FIG. 67 shows a puller truck electrically bonded to an equal potential zone and the pulling truck line connected to the new conductor and running through a traveler on the support tower and the line is also bonded to the equal potential zone.

Once all of the equipment is in place and bonded to the equal potential zone 200, or electrically insulated as described with respect to the anchor vehicle 238, the stringing can proceed. Installation of the pulling rope 226 can be done in many ways. As shown in FIG. 67, the pulling rope 226 can be pulled off the puller 240 and passed through each support structure 104 using travelers 244. If there is a concern about the pulling rope 226 contacting energized conductors or energized apparatus, a length of tested insulated rope 252 can be attached to the front end of the pulling rope 226. This initial tested insulated rope 252 is what isolates workers and stringing equipment as the pulling rope 226 is strung through the system 100. It is preferable to test the pulling rope 226 and the insulated rope 252 to determine its di-electric value to ensure the ropes 226, 252 insulating qualities. Preferably, the pulling rope 226 and insulated rope 252 are tested using a method and apparatus for testing insulators described in U.S. Pat. No. 4,266,184, the disclosure of which is incorporated herein by reference in its entirety. Care should be taken to ensure the pulling rope 226 and the insulated rope 252 does not get dirty, wet, or subjected to high humidity as these factors can effect the di-electric value of the rope 226, 252.

Crosswinds can be a concern when installing the pulling rope 226. Because the pulling rope 226 is often a different weight than conductors 102, the pulling rope 226 and the conductors 102 may move differently when strung in the system 100. Thus, the possibility exists that the pulling rope 226 may contact a conductor 102. Preferably, stringing operations should be limited during high wind conditions. Preferably the pulling rope 226 is kept at a higher tension sag than the conductors 102, so that if a blowout occurs (rope or line deflection due to wind), it will stay above the conductors 102.

According to some embodiments of the invention and as shown in FIG. 67, a puller 222 is bonded by a conductive jumper 224 to an equal potential zone 200. The pulling rope 226 is bonded to the equal potential zone 200 by a running ground 230 which includes a conductive jumper 234 and a rolling ground 232. The pulling rope 226 is strung through the path to which a new conductor 102 is to be pulled. Travelers 244 are installed at the end of insulators 106 mounted to a support structure 104. The travelers 244 are pulley like devices which are discussed more in detail below. The travelers 244 permit both the pulling rope 226 and the conductor 102 to be strung and moved along the system 100.

Figure 68:
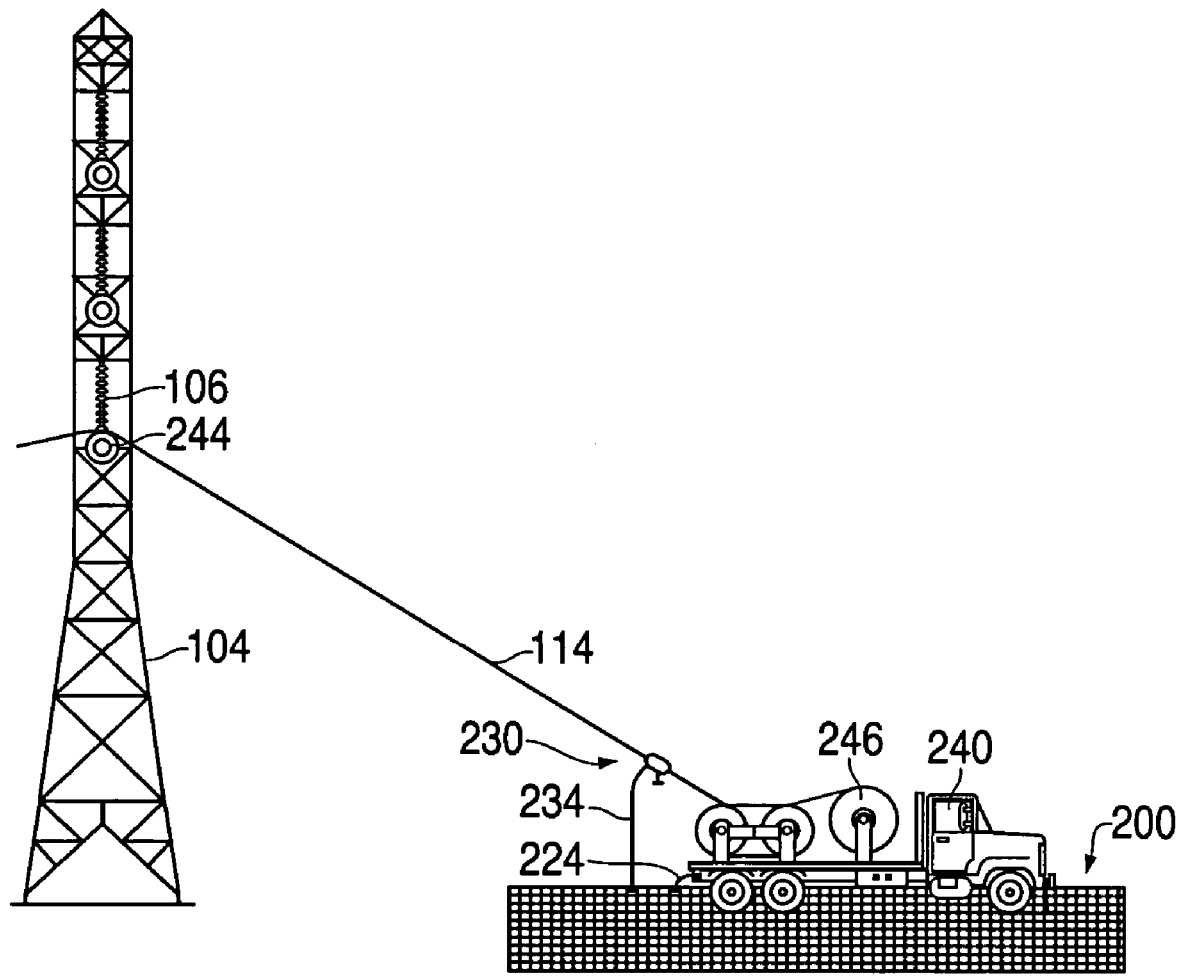
FIG. 68 shows a payout truck bonded to an equal potential zone with a new conductor strung to a support tower where the conductor is bonded to the equal potential zone.

In some embodiments of the invention, once a pulling rope 226 has been pulled to the end of the section currently being worked on, the pulling rope 226 is connected to a conductor 114 at the far end of the section being worked on (as shown in FIG. 68). The payout truck 246 contains new conductors 114 to be strung on a wire reel 246. The new conductor 114 is bonded to the equal potential zone 200 by a running ground 230. The new conductor 114 is attached to the pulling rope 226 and pulled back along the path the pulling rope 226 has been strung.

Often, once the pulling rope 226 is strung through the system 100 the pulling rope 226 is not strong enough to pull heavy conductors 114 through the system 100. In such cases, the pulling rope 226 will be attached to a hard line cable that is stronger than the pulling rope 226. The hard line cable will be pulled through the system 100 by the pulling rope 114. The hard line cable will then be attached to a conductor 114 and the conductor 114 will be strung through the system 100 by pulling the hard line cable through the system 100. The conductor 114 is strung in the travelers 244 attached to the end of the insulators 106 mounted to the support structure 104. The stringing method described briefly above will now be described in detail with reference to FIGS. 69-95.

FIGS. 69-95 illustrate one exemplary stringing procedure in accordance with some embodiments of the present invention. A stringing procedure will be described generally and then in detail with reference to FIGS. 69-95.

Generally a stringing procedure in accordance with the invention permits energized conductors to be handled and strung through the system 100. The conductor 114 to be strung will be located between two dead ends 110. If there are no dead ends 110 at each end of the section to be strung, temporary dead ends may be constructed or portable ones (described in more detail below) may be used. Equal potential zones 200 are constructed at each end of the pull (the section line to be strung). Equipment such as pullers, payout equipment, pulling lines 226, hard line 250, and new conductors are bonded to the equal potential zone on which they are located.

According to some embodiments of the invention, the new conductor 114 is not initially strung in the system 100. First a light, relatively easy to handle pulling line 226 (some times referred to as a pull rope) such as a power braid nylon rope 226 is strung through the system 100. In some instances, an isolating and insulating rope 252 may be attached to the front of the pulling rope 226. Next, the pulling rope 226 is attached to the new conductor 114 and the new conductor is strung through the system 100 by winding in the pulling rope 226. The pulling rope 226 may not be directly connected to the conductor 114, but may have a section of insulated rope 252 separating the conductor 114 and the pulling rope 226. Further, one or two swivels may be installed between the new conductor 144 and the pulling rope 226 in order to allow the conductor to twist as needed to relieve the torsional stress on the conductor 114 coming off of the wire reel 246. If fact, whenever connecting two lines together during the stringing procedure, it is preferred to separate the two lines by a section of insulating rope 252, and swivels. The swivels are made of high carbon tool steel and are not made to conduct current, therefore they should be used in conjunction with an insulating rope 252.

It is understood that the insulation ropes function is to be a flexible insulator. The term insulating or isolating rope is not meant to be limiting to rope, but to include any flexible insulator that can bear a mechanical tensile load.

In some cases stringing tension for the new conductor may be too heavy for the pulling rope 226 to pull the conductor through the system 100. In such cases, the pulling rope 226, will be attached to a stronger and heavier line 250 (sometimes referred to as a hard line) such as a steel cable. The hard line 250 is stronger than the pulling rope 226 and is strung through the system 100 by pulling the pull rope 226 through the system 100.

Once the hard line 250 is strung through the system 100, the new conductor 114 to be strung is attached to one end of the hard line 250 via an isolating and insulating rope 252 and pulled through the system 100 by the hard line 250. Once the conductor 114 is strung through the system 100, the conductor 114 is electrically connected to the system 100 to transport power load.

Optionally, in some instances, if a conductor 102 already exists in the system 100 and will be replaced by a new conductor 114, the old conductor 102 can be connected to the new conductor 114 and used to pull in the new conductor 114. An insulating rope 252 is used to separate the old and new conductors to reduce the likelihood of a ground circuiting current passing through the pulling socks (Kellum grip) and swivels. A Kellum grip sometimes referred to as a pulling sock. A Kellum grip is a mechanical device which permits two lines such as rope, cables, or conductors to be connected end to end and is configured so that the more tension that is placed on the two lines the grip connects, the tighter the grip holds. The grip is made of woven wire and provides a mechanical connection. Located between the conductors should be a swivel to allow the new conductor coming off of the wire reel to twist, whether it is an old conductor 102, hard line 250, or a pulling rope 226. This general description of stringing procedures in accordance with the invention will now be followed by a detailed description of one stringing procedure in accordance with the invention with reference to the accompanying FIGS. 69-95.

Figure 69:
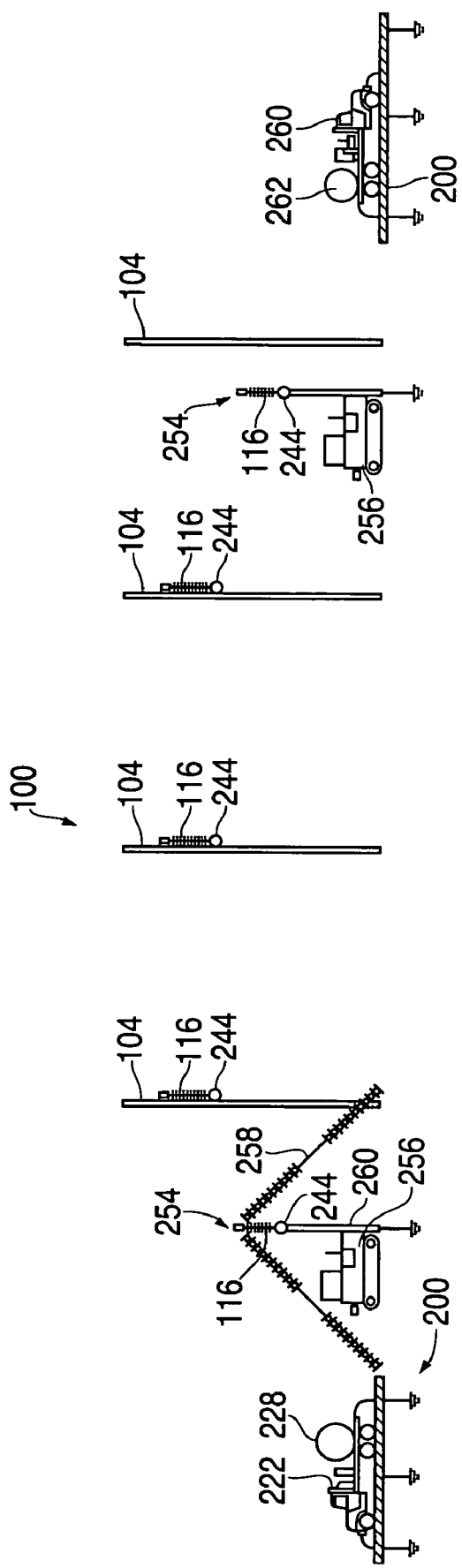
FIG. 69 is a schematic diagram of a group of support structures to be strung with a conductor and location of stringing equipment and equal potential zones.

In FIG. 69 a schematic of an existing power transfer system layout 100 is shown. Several support structures 104 are set up along a path that the conductors 114 will be strung. Tangent insulators 116 are attached to the support structures 104. The other end of the insulators 116 have travelers 244 mounted on them. The traveler 244 is a pulley-like device that assists in the stringing by allowing a pulling rope, a conductor, or whatever element is being strung to be supported by the support structure 104 via the insulator 116 but while still being able to move through the system 100.

The left hand side of FIG. 69 shows a rope puller 222 bonded to an equal potential zone 200. The rope puller 222 has a reel 228 of rope 226 that can be pulled off the reel 228 and strung through the system 100. Preferably, the pulling rope 226 is non-conductive; however, if it is conductive (such as steel cable or the like) the pulling rope 226 is bonded via a running ground 230 to the equal potential zone 200 as shown and described with respect to FIG. 67. If the pulling rope 226 is conductive, preferably, a non conductive insulating rope 252 is attached to the front end of the pulling rope 226.

Located between the first support structure 104 on the left and the equal potential zone 200 is a temporary, portable support structure 254. The temporary portable support structure 254 includes a pole 260 mounted to a vehicle 256 which in some embodiments is a bulldozer. Because later in the stringing procedure, this temporary, portable support structure 254 will be configured to be a dead end and thus subject to the mechanical tension of the conductor 114 when strung, insulated guys 258 are attached to the temporary portable support structure 254. The pole 260 and the vehicle 256 are all grounded to the earth, and the guys 258 are also insulated. The portable temporary support structure 256 has a traveler 244 attached to an insulator 116 and is connected to the pole 260 by a crossarm. Optionally a fixed temporary support structure could be built for use according to the invention, and removed when no longer needed.

The right hand side of FIG. 69 shows a hard line puller 260 electrically bonded to the equal potential zone 200. When stringing energized conductors 114, (or a conductor through an energized system which due to induction currents result in an energized conductor), both ends of the pull have equal potential zones 200 grounded to earth. Pulling equipment located on both ends of the pull are bonded to their corresponding equal potential zone 200. As shown in FIG. 69, the hard line puller 260 has a reel 262 of hard line 250 that can be pulled off the reel 262 and strung through the system 100. A second temporary portable support structure 254 and vehicle 256 is placed along the system so that the last support structure 104 is between the temporary portable support structure 254 and the equal potential zone 200.

Figure 70:
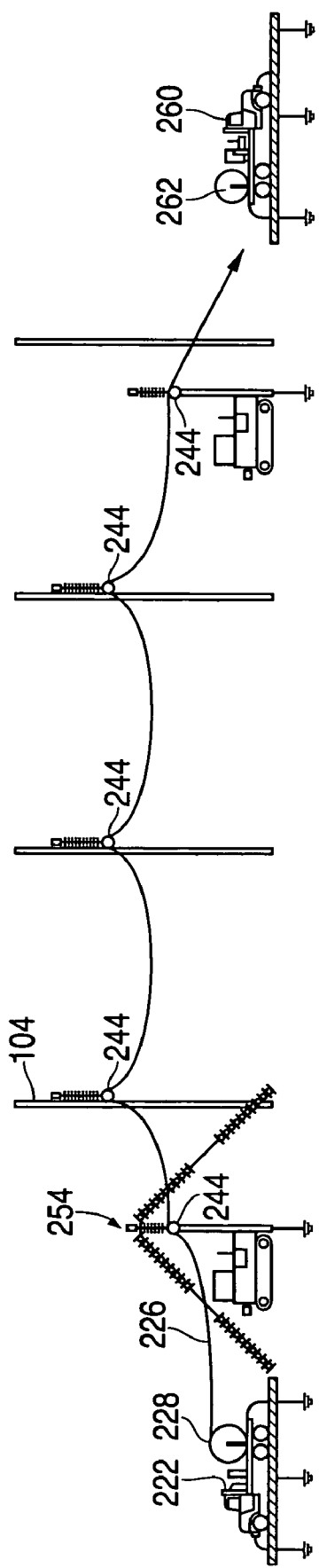
FIG. 70 is the layout of FIG. 69 where the support structures are strung with a pulling rope.

As shown in FIG. 70, the pulling rope 226 is pulled off the rope puller 222, which contains the pulling rope 226 for stringing on a reel 228 mounted on the rope puller 222. The pulling rope 226 is strung from one end of the system 100 to the other toward the hard line puller 260 located on an equal potential zone 200 at the other end of the section of the system 100 to be reconductored.

The pulling rope 226 may be pulled by using conventional methods for stringing lines along support structures 104. For example, the pulling rope 226 may be pulled off the reel 228 on rope puller 222 and strung through the system 100 using vehicles such as, a tracked vehicle, a pick up truck, a helicopter, all terrain vehicles or another suitable type of equipment to pull the pulling rope 226 between support structures 104. In some instances mules, horses, humans or other suitable means may be used to install the pulling rope 226 along the system 100. Sufficient tension is maintained on the pulling rope 226 to keep it off the ground and allow it to clear obstacles. Tension is maintained by braking the reel 228 to keep the pulling rope 226 off of the ground thru the length of the pull.

Whenever a support structure 104 is encountered, the pulling rope 226 is pulled up through to the traveler 244 using a rope installed in the traveler 244 (referred to as pee line). The pulling rope 226 will be strung through the traveler 244. The end of the pulling rope 226 is then brought down back to the ground and the vehicle or other means of pulling the pulling rope 226 will continue and travel to the next support structure 104, at which point the procedure will be again repeated where the pulling rope 226 is installed in the traveler 224.

One skilled in the art will appreciate that when helicopters or some other techniques are used to install the pulling rope 226 stringing through the travelers 244 is accomplished according to techniques already established where helicopters are involved. Optionally, travelers 244 may be installed on the support structure 104 prior to or at the same time the stringing of the pulling rope 226 is accomplished, if they are not already installed.

This procedure will be repeated until the pulling rope 226 is strung completely through the section of the system 100 to be reconductored. Once the pulling rope 226 has been strung through the system 100 from one end to the other, a mechanical link is then established along the system 100 along support structures 104.

The pulling rope 226 is initially pulled through the system 100 because it is smaller, lighter, easier to handle. Once the pulling rope 226 has been installed, the pulling rope 226 may be bonded to the equal potential zone 200 and then connected to the hard line 250, which is also bonded to the equal potential zone 200 via the running ground 230. Preferably, the pulling line 226 is not conductive. The conductor 114 will be attached to the pulling rope 226 via the insulated rope 252. Swivels are also be installed between the hard line 250 the insulated rope 252 and the pulling rope 226. The swivels are not made to carry current and therefore the insulating rope is required. The pulling rope 226 may be connected to the equal potential zone 200, with a running ground 230 and will then be pulled back allowing the hard line 250 to be strung through the system 100.

Figure 71:
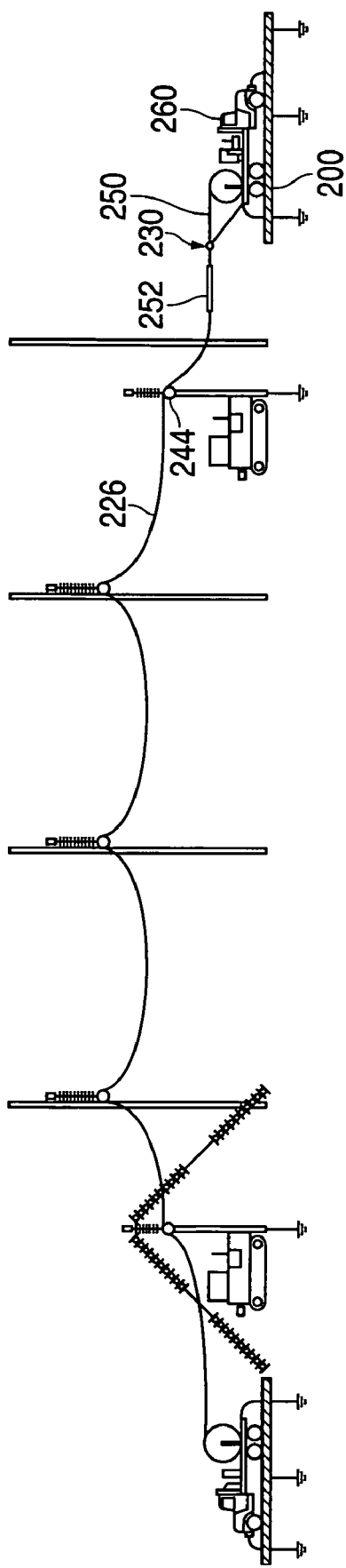
FIG. 71 is the layout of FIG. 70 where the rope is attached to a hard line and isolated from each other by tested insulating rope.

Because the stringing procedure may occur when other conductors are present along the path that the hard line 250 will be strung and those conductors may be transporting a power load, the hard line 250 may gain an electrical potential as the hard line 250 is placed along side the conductors results in induction currents on the hard line 250 being in close proximity of power carrying conductors 102. Therefore, the hard line 250 is electrically bonded to the equal potential zone 200 with a running ground 230 as shown in FIG. 71.

Figure 72:
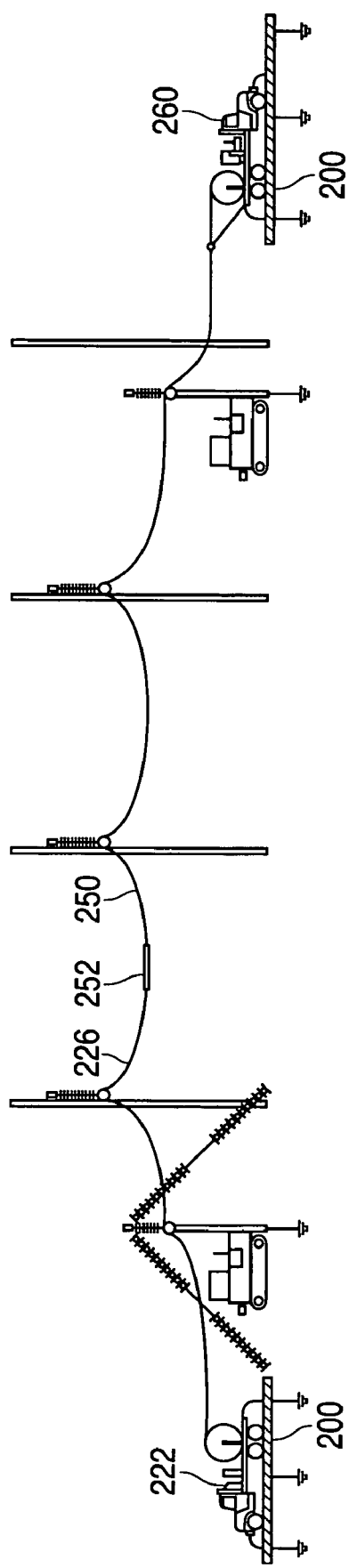
FIG. 72 is the layout of FIG. 71 where the rope is pulling the hard line through the support structures.

FIG. 72 shows the pulling rope 226 attached to the hard line 250 via an insulating rope 252. The hard line 250 is isolated from the pulling rope 226 because if the lines 226 and 250 were to create an electrical connection between the two equal potential zones 200 a ground circulating current of an unknown magnitude could circulate through the ground, equal potential zones 200, and the lines 226 and 250. To avoid an electrical connection between the two equal potential zones, 200 and thus the potential ground circulating current, the pulling rope 226 and the hard line 250 are connected by the insulating rope 252. In some embodiments of the invention the insulated rope 252 is a product sold under the trade name of Amstel blue. Because dirt, humidity, wetness, and other factors that can affect conductivity, the insulating rope 252 is tested prior to its use to ensure that it is not electrically conductive. For example, the insulating rope 252 may be tested using the procedure and apparatus described in U.S. Pat. No. 4,266,184, which is already incorporated herein by reference.

Figure 73:
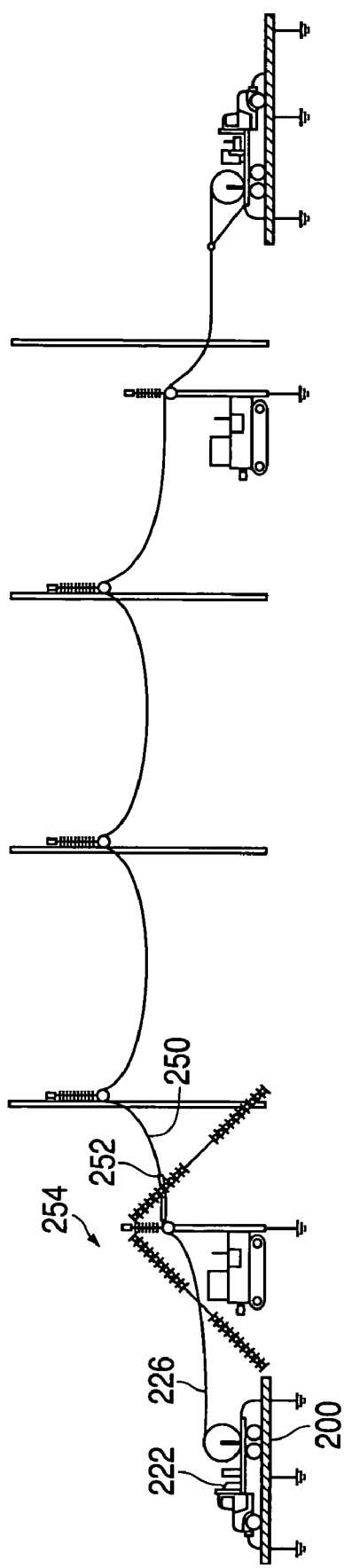
FIG. 73 is the layout of FIG. 72 where an insulated rope and hard line is pulled as far as the temporary dead end.

As shown in FIG. 73, the pulling rope 226 is pulled back towards the rope puller truck until the insulating rope 252 reaches the portable temporary support structure 254 as shown in FIG. 73.

Figure 74:
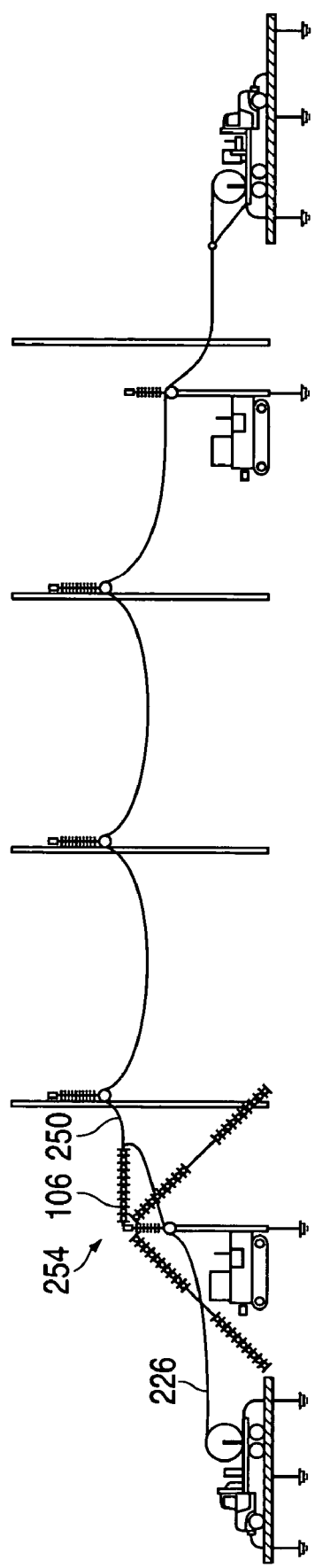
FIG. 74 is the layout of FIG. 73 where a hard line is attached to the temporary dead end.

Next, as shown in FIG. 74, the hard line 250 is mechanically attached to the temporary portable support structure 254 by an insulator 106 in a dead end configuration.

Figure 75:
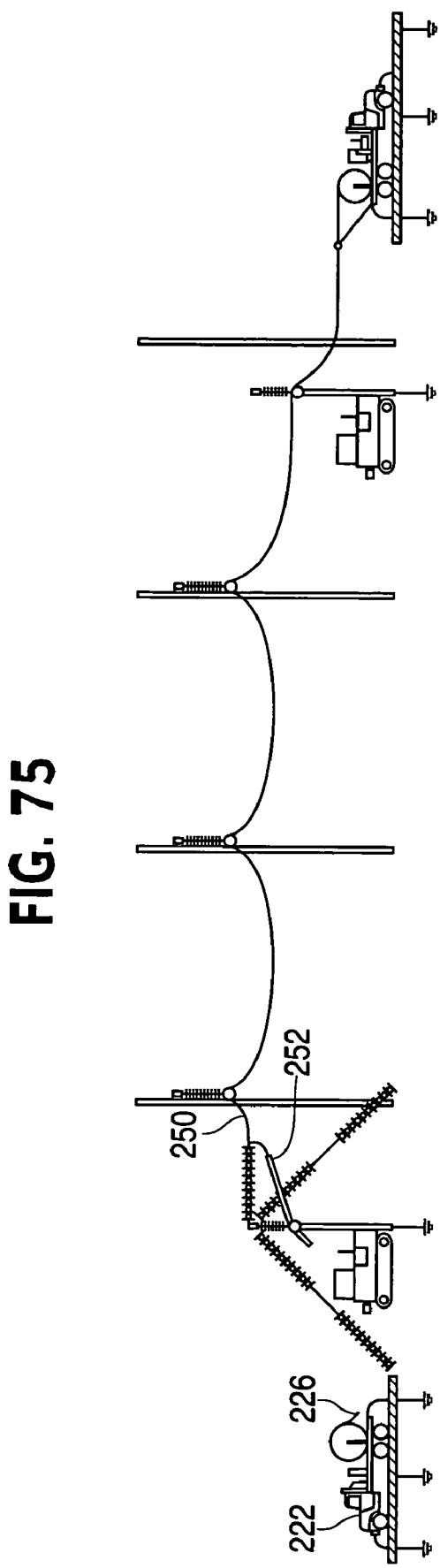
FIG. 75 is the layout of FIG. 74 where the insulated rope is disconnected from the hard line.
Figure 76:
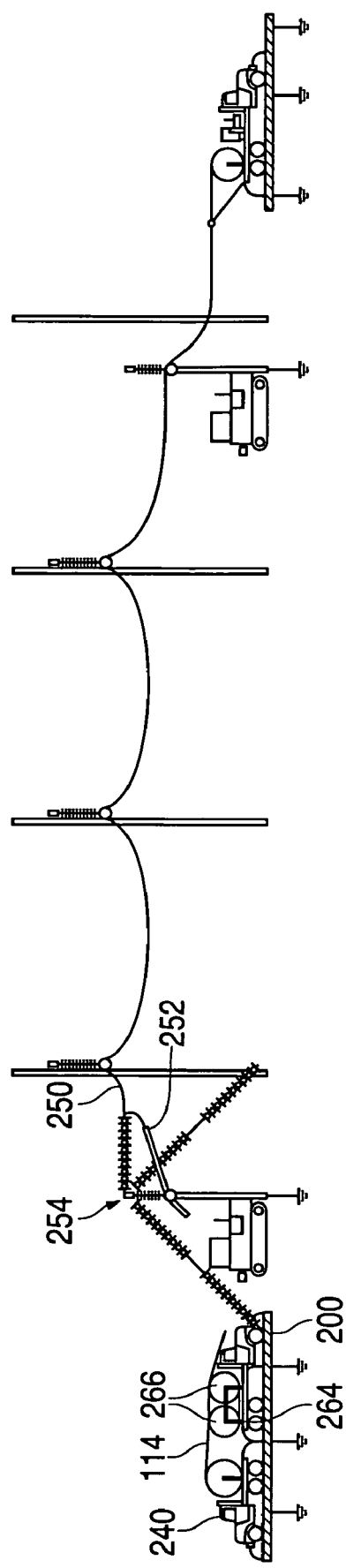
FIG. 76 is the layout of FIG. 74 showing a payout truck and a bull wheel tensioner truck parked on and bonded to an equal potential zone.

Next, the pulling rope 226 is detached from the insulating rope 252 as shown in FIG. 75. The rope puller 222 may then be moved out of the way and the equipment 240 containing a reel 246 of conductor 114 and a tensioner 266 is positioned onto the equal potential zone 200 and electrically bonded to the equal potential zone 200. Optionally, the conductor 114 can be strung through a bull wheel tensioner 266 which is bonded electrically to the equal potential zone 200 as shown in FIG. 76. The bull wheel tensioner 266 helps keep the conductor 114 at the proper stringing tension to keep the conductor from touching the ground or having enough slack to be blown into contact with other conductors.

Figure 77:
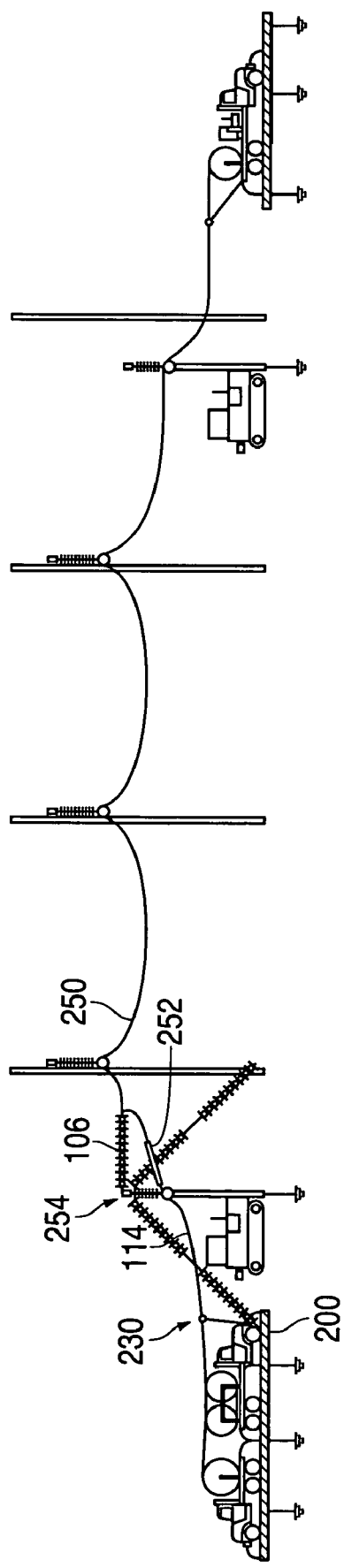
FIG. 77 is the layout of FIG. 76 where the new conductor is connected to the hard line via an insulating rope.
Figure 78:
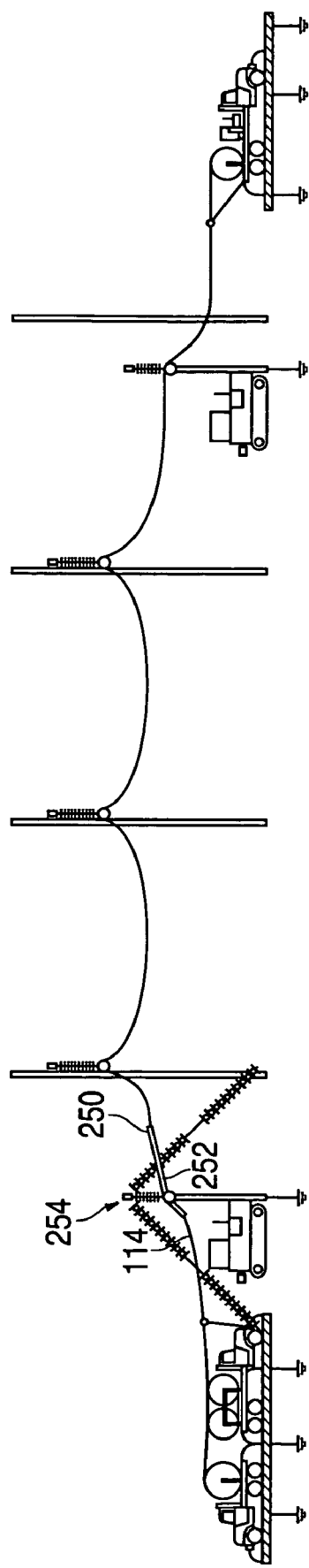
FIG. 78 is the layout of FIG. 77 where the insulator is removed to free the hard line from the dead end.
Figure 79:
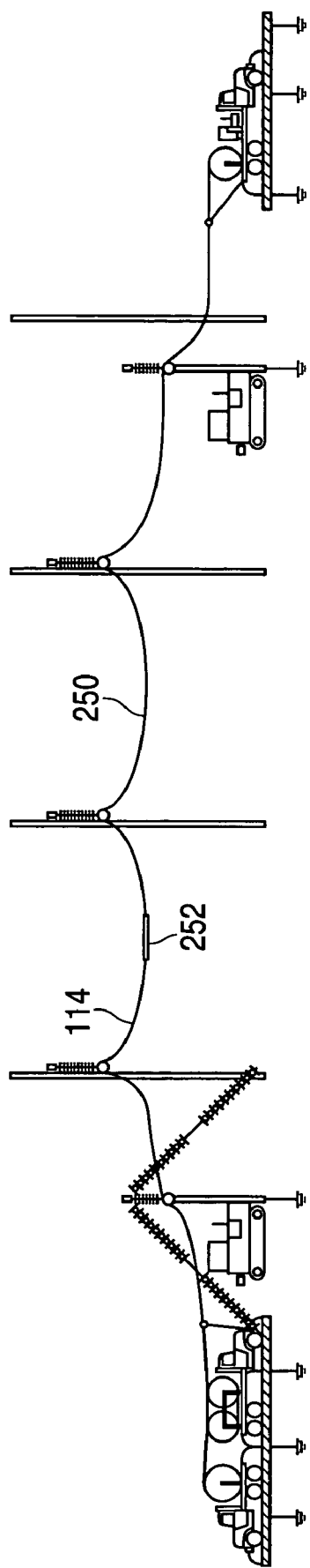
FIG. 79 is the layout of FIG. 78 showing the new conductor being pulled (strung) through system by the hard line.

Next, as shown in FIG. 77, the conductor 114 is electrically bonded to the equal potential zone 200 by a running ground 230. The conductor is then attached to the insulating rope 252. Once the conductor 114 is attached to the insulating rope 252, the hard line 250 is disconnected from the insulator 106 on the portable support structure 254 as shown in FIG. 78. With the hard line 250 disconnected from the insulator 106, the hard line 250 and conductor 114 is free to be pulled through the system 100. The hard line 250 is then pulled in and pulls the conductor 114 through the system as shown in FIG. 79.

Figure 80:
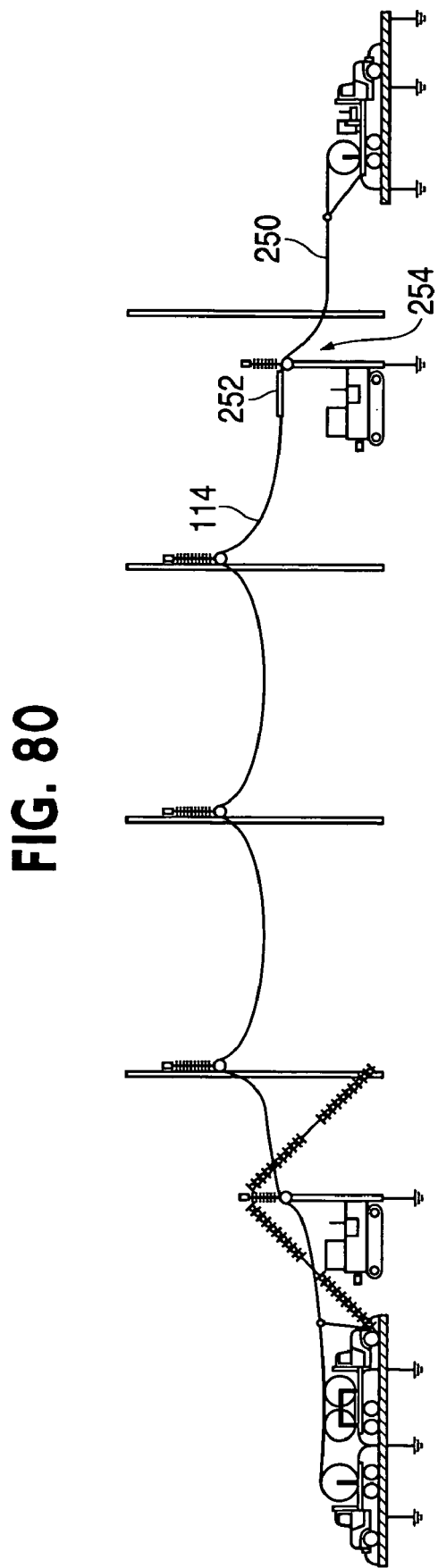
FIG. 80 is the layout of FIG. 79 where the new conductor is strung until the insulating rope reaches the temporary cat mounted support structure.

As shown in FIG. 80, the conductor 114 will continue to be strung until the insulating rope 252 reaches the temporary support structure 254.

Figure 81:
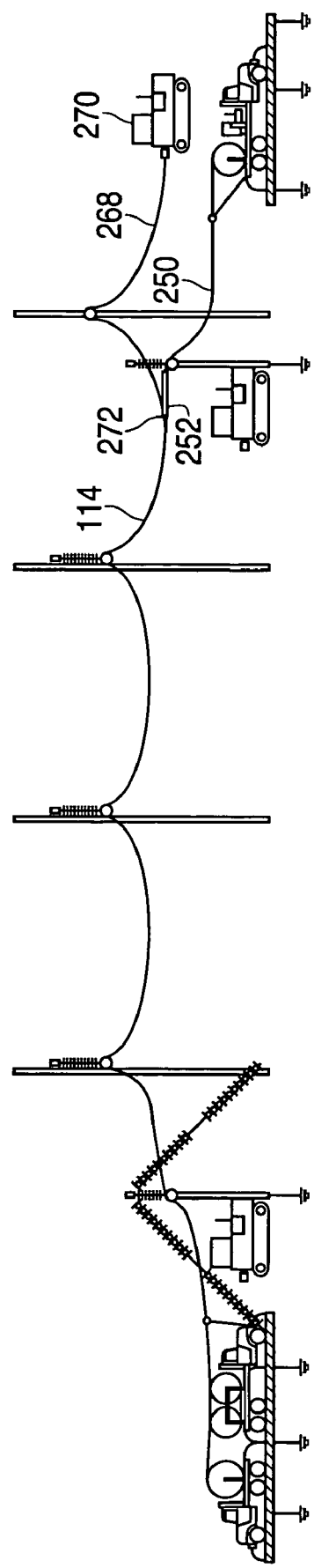
FIG. 81 is the layout of FIG. 80 where an insulating rope is attached at one end to the conductor and at the other end to a sagging vehicle.

At this point, and as shown in FIG. 81, a second insulating rope 268 (bull rope) is attached to the conductor 114 at approximately the same place where the insulating rope 252 attaches to the conductor 114. A conductor grip 272 may be used to support the conductor tension. The bull rope 268 is also a non-conductive rope, and in some embodiments of the invention is tested to ensure its insulating qualities before using. The bull rope 268 is connected at one end to a pull vehicle 270 (often a bull dozer) and to the conductor 114 at the other end.

Figure 82:
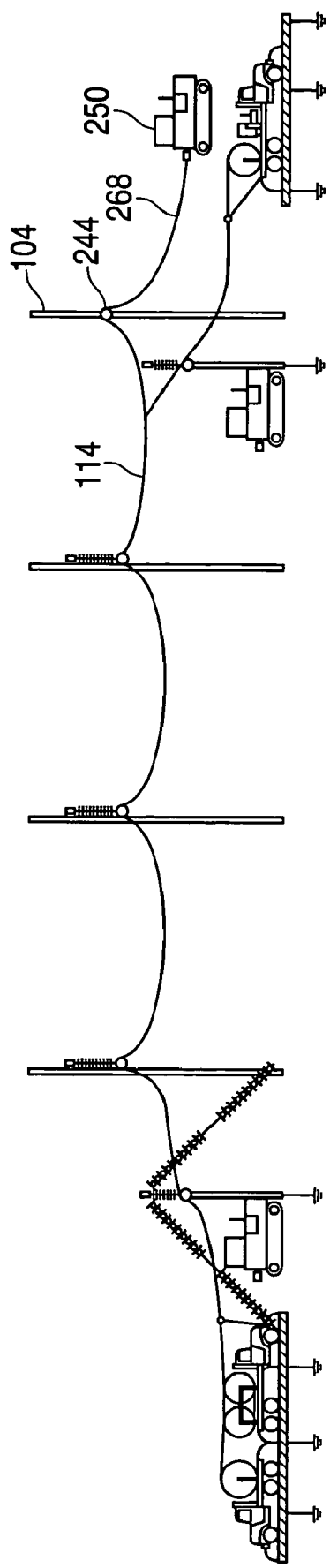
FIG. 82 is the layout of FIG. 81 where the sagging vehicle takes up slack in the conductor and the hard line puller vehicle lets off tension allowing the hard line to become slack.
Figure 83:
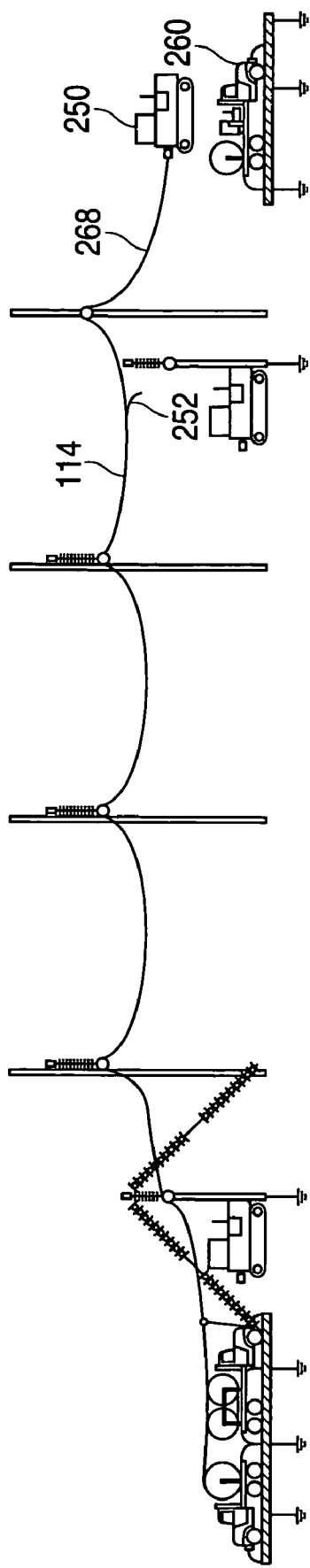
FIG. 83 is the layout of FIG. 82 where the hard line and insulating rope is disconnected from the newly strung conductor.

As shown in FIG. 82, the bull rope 268 is run through a traveler 244 on the support structure 104. In some embodiments of the invention, one of the support structures 104 is the last support structure 104 that occurs a particular section of the power system 100 to be reconductored. That last support structure 104 will eventually be configured as a dead end 10. The bull rope 268 is pulled up by the pulling vehicle 270 until the conductor tension is supported by the bull rope and then the insulating rope 252 and the hard line 250 are disconnected from the new conductor 114 as shown in FIG. 83.

Figure 84:
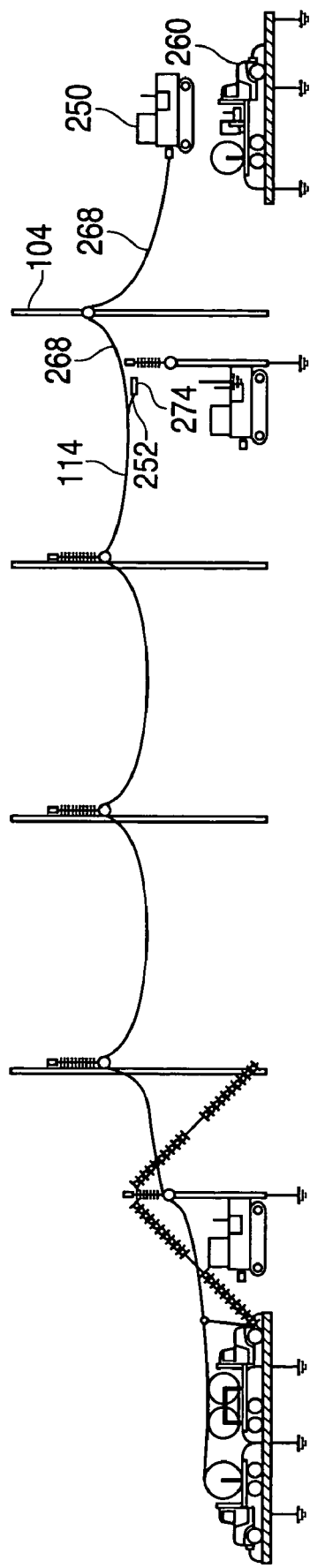
FIG. 84 is the layout of FIG. 83 where a compression dead end is attached to the conductor.

With the new conductor end now free a dead end 274 is installed on the conductor end. The dead end 274 maybe a compression dead end or a bolted dead end. In some embodiments the invention, a dead end 274 is attached to the end of the new conductor as shown in FIG. 84.

Figure 85:
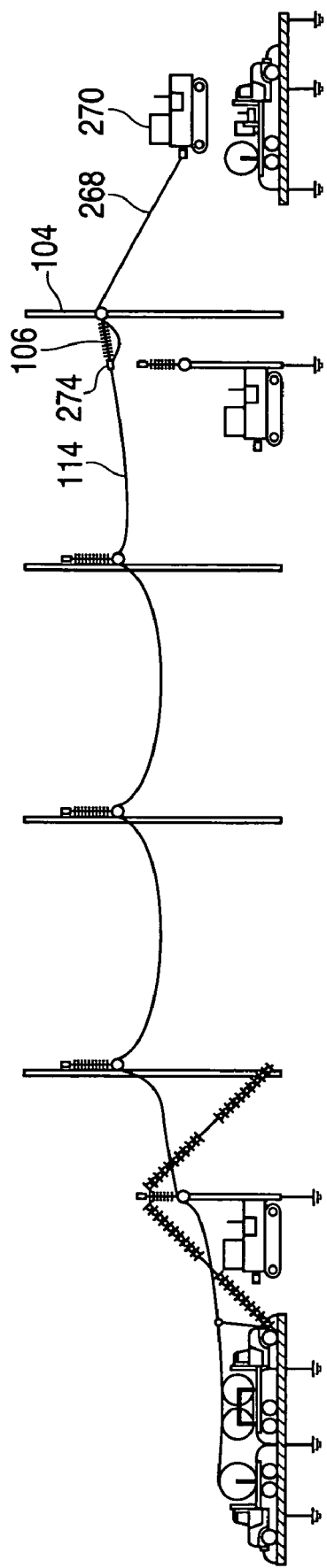
FIG. 85 is the layout of FIG. 84 where the sagging vehicle takes up slack in the conductor and the compression dead end is attached to the insulators on the support structure.

According to some embodiments of the invention, the next step is to attach the conductor 114 to the support structure 104 in a dead end type configuration. As shown in FIG. 85, an insulator 106 is attached to the conductor 114 via the dead end 274. The conductor 114 is mechanically, but not electrically, connected to the support structure 104. As necessary, the pulling vehicle 270 will take up on the bull rope 268 to permit the conductor 114 to attached to the support structure 104.

Figure 86:
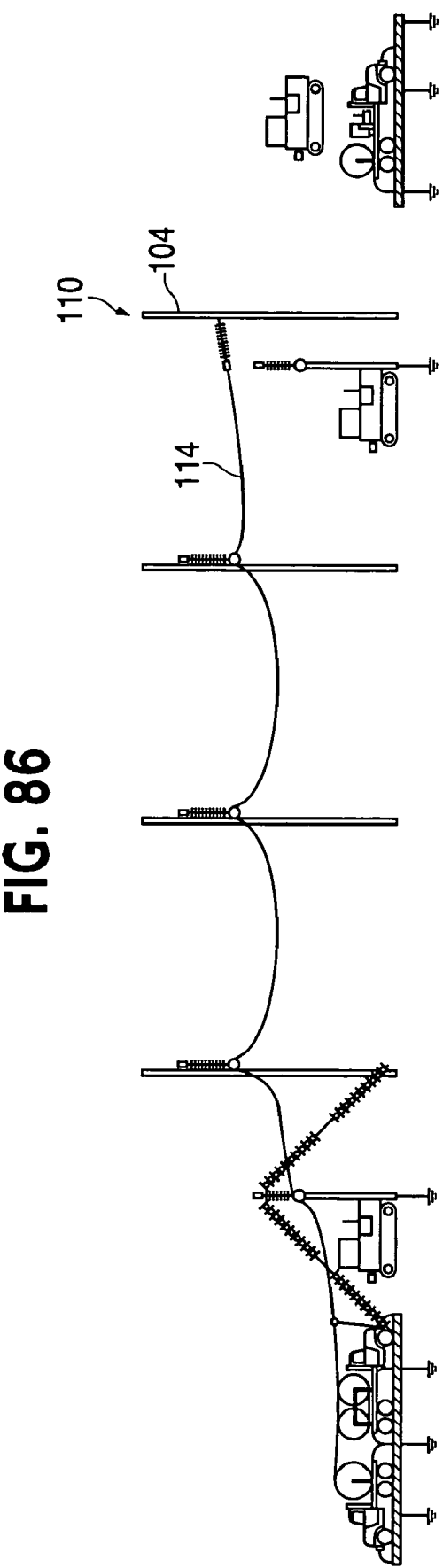
FIG. 86 is the layout of FIG. 87 where the sagging vehicle has been disconnected from the conductor thus transferring conductor tension to the dead end structure.

Once the conductor 114 is mechanically attached to the support structure 104, the pulling vehicle 270 and the bull rope 268 are removed from the conductor 114 as shown in FIG. 86. The support structure 104, shown on the far right of FIG. 86, is now attached to the conductor 114 to form a dead end 110.

Figure 91:
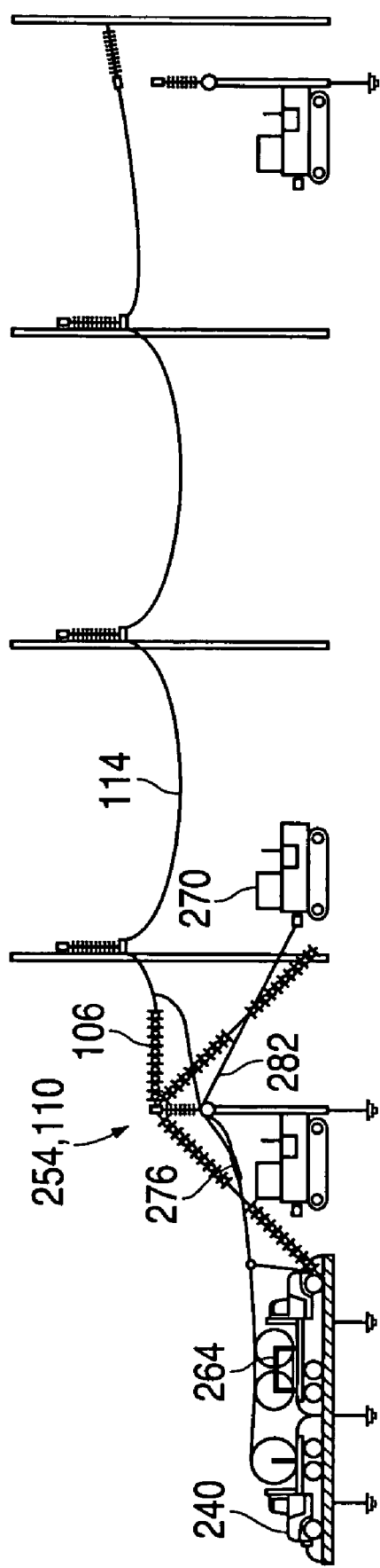
FIG. 91 is the layout of FIG. 90 where a sagging vehicle is attached by an insulating rope to the conductor coming from the payout vehicle and applies tension to the new conductor.

In the embodiments of the invention where the newly strung conductor 114 is connected to a support structure 104 that will end up as a dead end 110, as done on the left hand side of the system 100 shown in FIG. 91, for example, the procedure described above herein and shown in FIGS. 80-86 is preferably used. However, in other embodiments of the invention, such as when the conductor 114 is connected to a portable temporary dead end 254, the following procedure as shown in FIGS. 87-95 is used.

Figure 87:
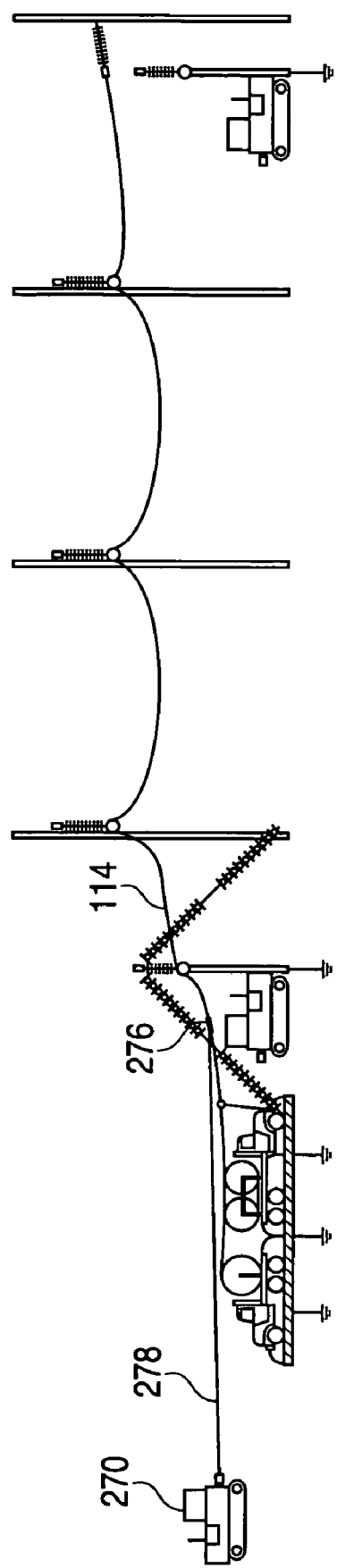
FIG. 87 is the layout of FIG. 86 where the sagging vehicle is connected by an insulating rope to one end of the new conductor and has taken the tension of the new conductor.

Activity is now directed to the other side of the system 100 as shown on the left side of FIG. 87. A conductor grip 276 is attached to the conductor 114. The conductor grip 276 will connect the conductor 114 to another bull rope 278 which, in some embodiments of the invention, is a insulated non-conductive rope that is tested as previously discussed, before being used and is connected to a sagging vehicle 270. (In this case a bulldozer). Sagging vehicle 270 will then take up the new conductor 114 tension.

Figure 88:
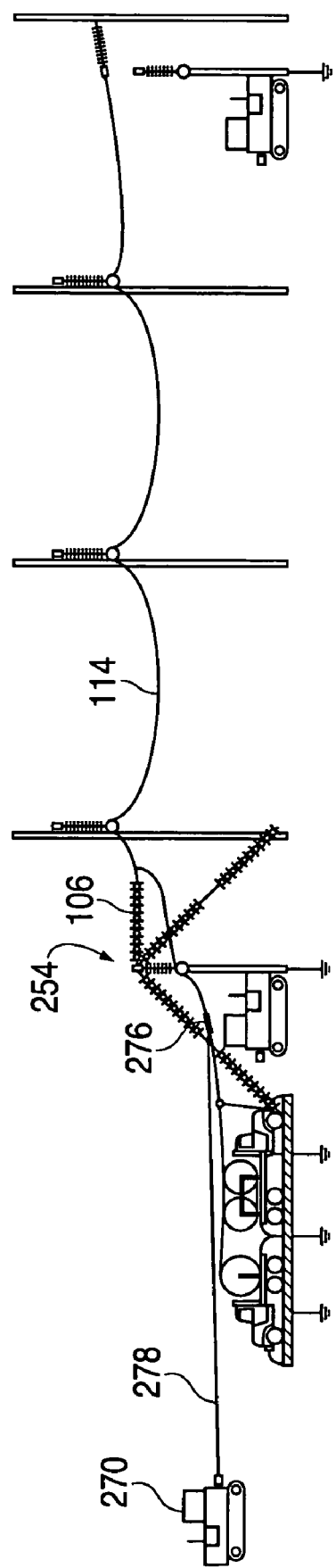
FIG. 88 is the layout of FIG. 87 where the conductor is attached to an insulator on a temporary dead end.

With the sag vehicle 270 applying tension to the conductor 114, the conductor 114 will then be attached to the insulator 106 installed on the temporary portable support structure 254 at the final design tension as shown in FIG. 88. Alternatively the conductor may be brought to a final tension using a hand operated chain hoist. Other tensioning devices may also be used as a winch, come-a-long or other suitable tensioning device. A tension measuring device is used to ensure the conductor 114 is brought up to the proper design tension.

The bull rope 278 is then disconnected from the conductor 114 as shown in FIG. 89. In order to remove the bull rope 278, tension on the bull rope 278 is relieved by backing up the sagging vehicle 270.

According to some embodiments of the invention, and as shown in FIG. 90, the conductor 114 is released from the travelers 244 and the travelers 244 are removed from the insulators 116. This may be accomplished using hot sticks or other suitable equipment. Optionally, the conductor 114 is fitted with armor rods 280, which act as a strain relief for the conductor 114. The conductor 114 is clipped (attached) into the tangent insulators 116 using a conductor clamp.

As shown in FIG. 91, the sag vehicle 270 is connected to the conductor 114 by an insulated bull rope 282. The bull rope 282 attaches to the conductor 114 by with a conductor grip 276. The sagging vehicle applies tension to the bull rope 282 which, in turns, applies tension to the conductor 114 thus relieving tension on the conductor 114 between the bull wheel tensioner 264 and the temporary dead end structure 254 as shown in FIG. 91.

Figure 92:
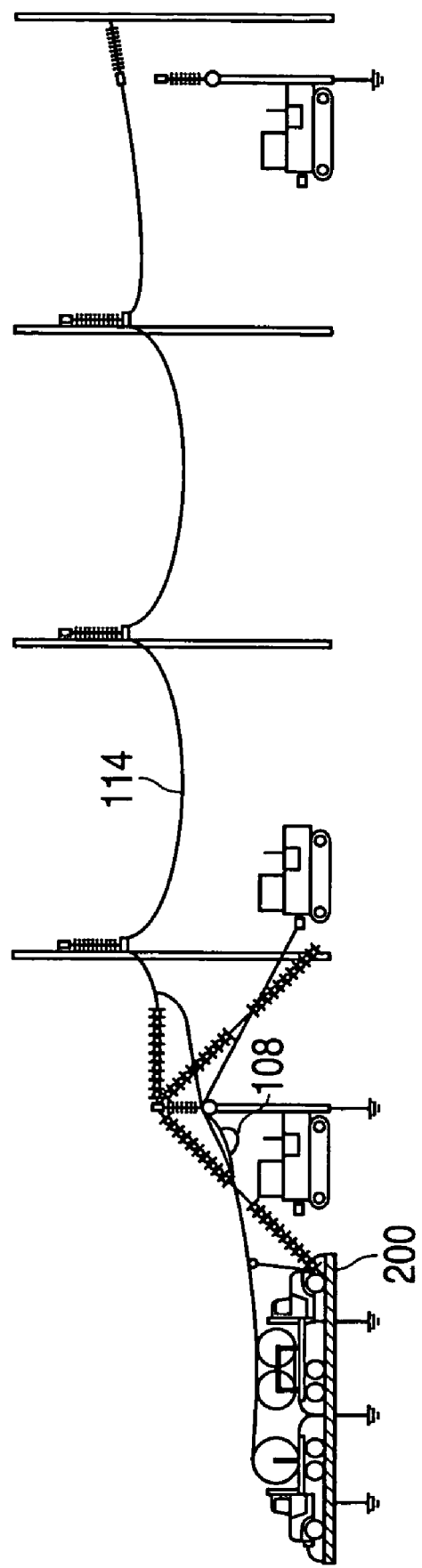
FIG. 92 is the layout of FIG. 91 where a jumper is installed on the new conductor.

As shown in FIG. 92 both ends of a conductive jumper 108 are installed onto the conductor 114 to provide an electrical path from the newly strung section of the conductor 114 to the section of the conductor 114 that is bonded to the equal potential zone 200 once the conductor 114 is cut. The next step is to cut the conductor 114 at the temporary dead end 254 as shown in FIG. 93.

Figure 93:
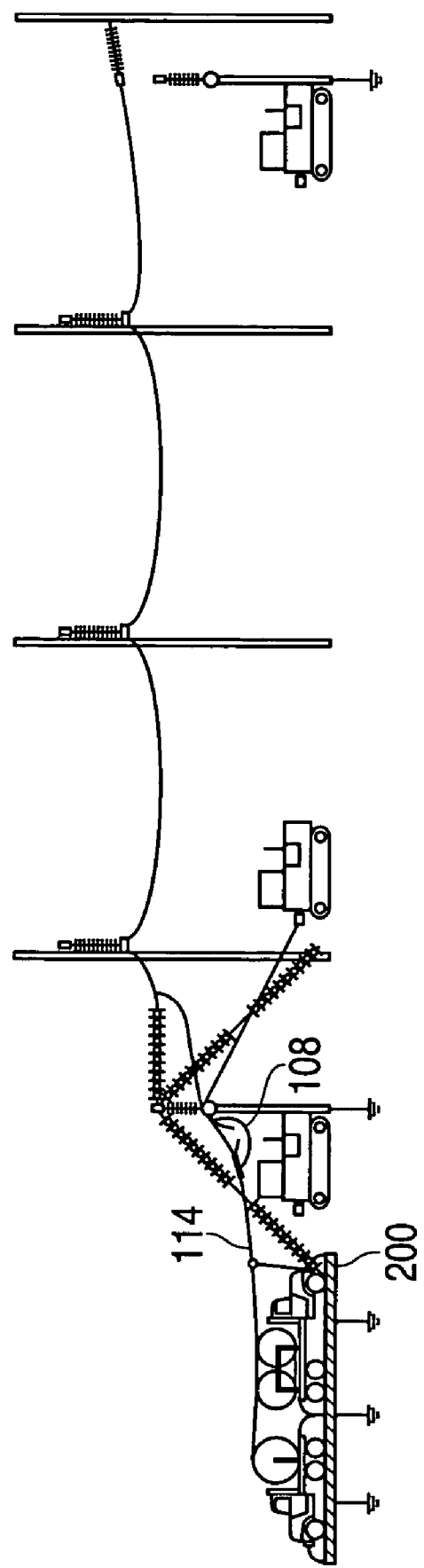
FIG. 93 is the layout of FIG. 92 where the new conductor is cut between ends of the jumper.

The jumper 108 provides an electrical path between the two separated ends of the conductor 114 as shown in FIG. 93. Because the electrical path between the two ends of the conductor 114 extends to the equal potential zone 200, the conductor 114 is at the same potential as workers and equipment on the equal potential zone 200.

Figure 94:
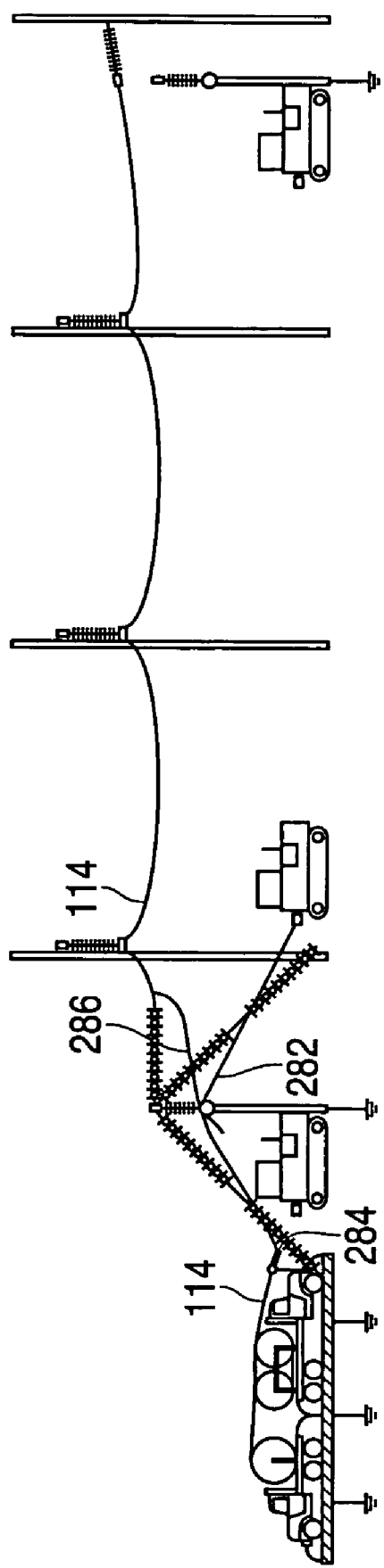
FIG. 94 is the layout of FIG. 93 where the jumper is removed insulating the payout from newly stung conductor.
Figure 95:
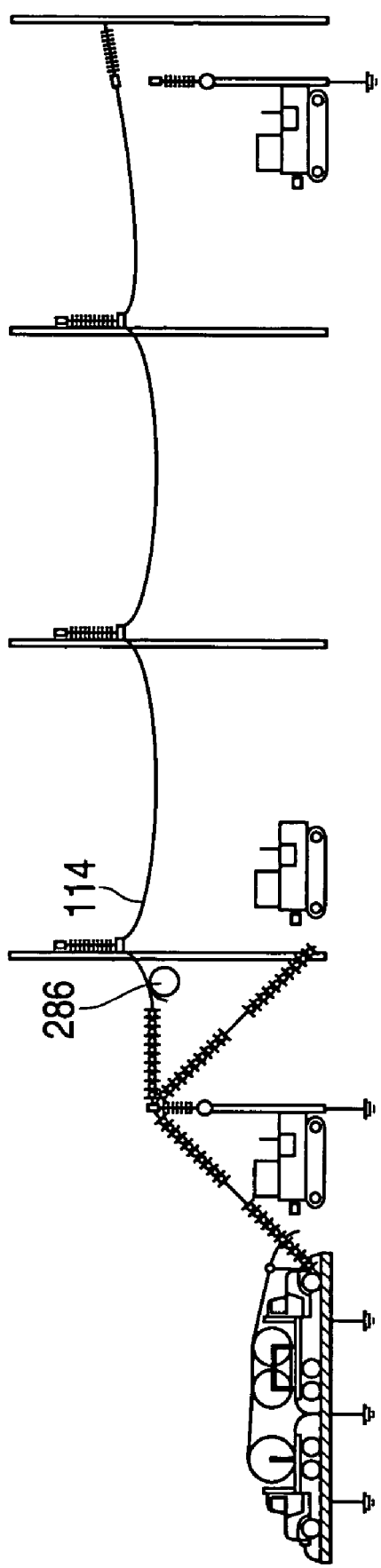
FIG. 95 is the layout of FIG. 94 where the conductor tail is coiled and secured to the temporary dead end.

In the next operation, the jumper 108 is removed using hot sticks or other suitable equipment. As shown in FIG. 94, the tail section 284 of the conductor 114 is lowered to the ground. At this point the section of the conductor 114 strung in the system 100 is not grounded nor is it any longer connected to the equal potential zone 200 or necessarily have the same potential as the equal potential zone 200. It may contain a voltage due to induction currents caused by the conductor's 114 close proximity of other conductors in the system 100 carrying a power load. The end 286 of conductor 114 strung in the system 100 can be coiled using insulated equipment and attached to the temporary portable support structure 254 as shown in FIG. 95.

When the length of the new conductor 114 to be installed is longer than the length of conductor that is contained on the wire reel 246 another wire reel 246 is used. The two ends of the new conductor 286 need to be joined so that the stringing operation can continue. The two conductor ends are joined using pulling socks (Kellum grips) and swivels separated by an insulating rope 252. After all the new conductor is installed in the section to be reconductored 100 it needs to be spliced together as described below.

Turning now to another aspect of the present invention, FIGS. 96-104 illustrate a method and related apparatus for connecting (splicing) the new conductors 114 together.

For various reasons, it may be desirable to electrically and mechanically connect two conductors together. The following is one example of splicing two conductors according to one optional embodiment of the invention.

Figure 96:
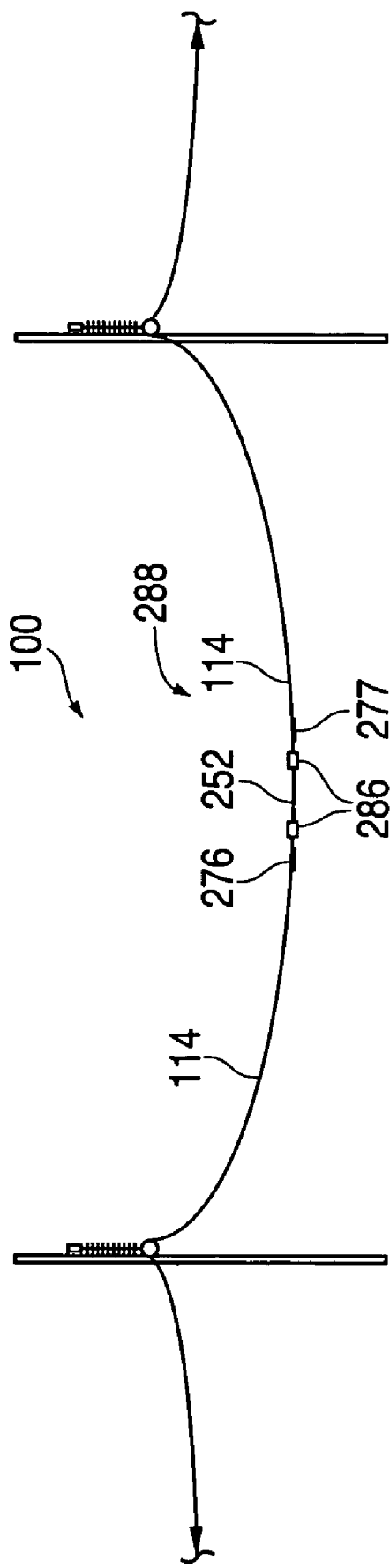
FIG. 96 is a schematic diagram of a side view of the insulating rope connecting two lengths of conductor prior to being spliced together.

FIG. 96 shows two ends of conductors 114 separated by insulating rope 252. The insulating rope 252 is connected to the conductors 114 by Kellum grips 277. Kellum grips 277 are sometimes referred to as pulling socks 277 is connecting one end of the insulating rope 252, to a conductor 114 and a second pulling sock 277 connects the other end of insulating rope 252 to the other conductor 114, this type of connection is referred to as a double or back to back sock connection 288.

When tension is applied to either the conductor 114 or insulating rope 252 pulling sock 277 tightens around the ends of both conductors 114. Thus, the more tension applied to the conductor 114, the tighter the pulling sock 277 grips the ends of conductor 114. Swivels are used to join the pulling socks 277 to the insulating rope 277 in a double or back to back sock connection 288. While some embodiments of the present invention use pulling socks 277 and swivels to connect conductors 114 to the insulating rope 252, any suitable connecting type device may be used in accordance with the present invention.

Figure 97:
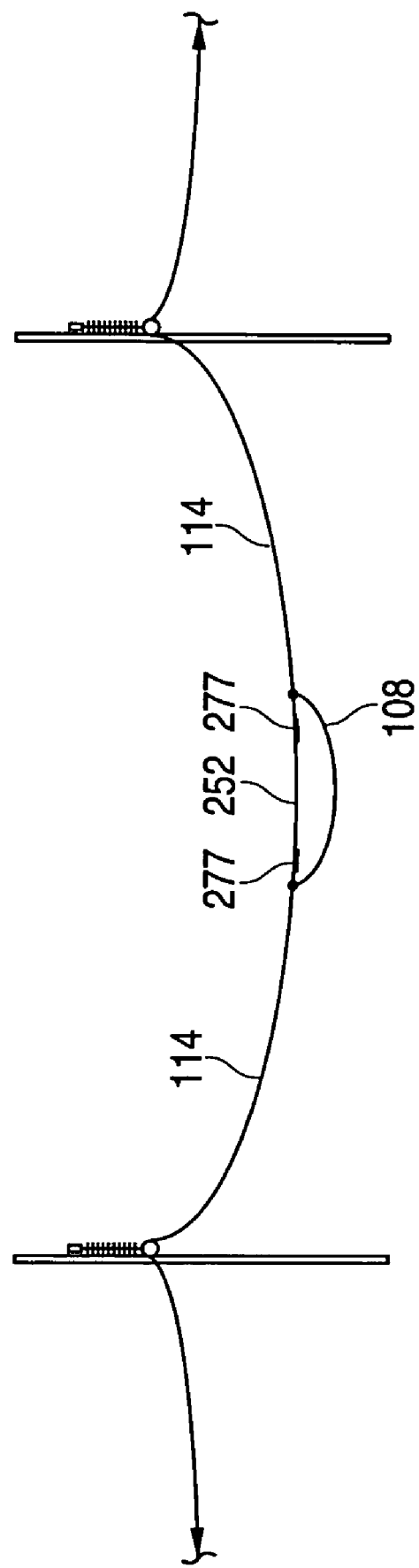
FIG. 97 is a side view of a section of a power transfer system showing a jumper installed around the insulating rope.

Because insulating rope 252 and the pulling socks 277 do not provide an electrical connection between the two conductors 114, but only a mechanical connection, a conductive jumper 108 is installed thus providing an electrical connection, between the two conductors 114 as illustrated in FIG. 97. The jumper 108 is usually installed with hotsticks or can be installed according to any suitable means known in the art. The jumpers 108 will electrically connect the one conductor 114 to the other conductor 114 and bypass the insulating rope 252 swivels and the pulling socks 277.

If splicing out a double sock connection 288 with the conductors 114 in close proximity energized conductors 114, workers and any equipment used should be located on and the equipment bonded to the equal potential zone 200.

In order to remove the pulling socks 277, swivels and the insulating rope 252, a permanent splice is installed on the ends 286 of the conductors 114. The permanent splice provides a mechanical and electrical connection between the conductors 114. The splice can be a compression splice, automatic splice or a preformed splice.

In accordance with an embodiment of the invention, the jumper 108, the insulating rope 252, the swivels and pulling socks 277 are replaced according to a splicing method described below. Some embodiments of the present invention may use a splicing truck 290. However, a splicing truck 290 is an optional convenience, not necessary to practice the invention. The splicing truck 290 has the advantage that it can support the conductor tension and provides hydraulic power for compressing the splice.

Figure 98:
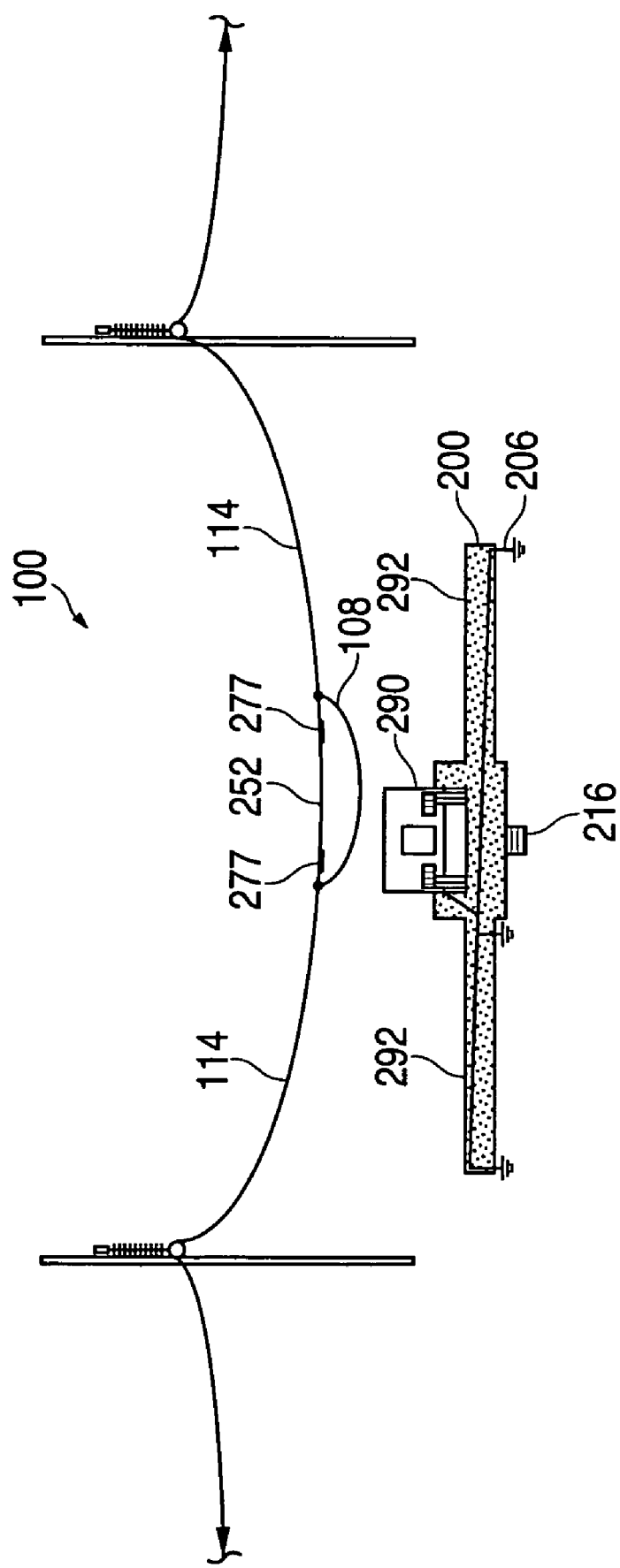
FIG. 98 is a side view of a section of a power transfer system illustrating a splicing truck parked under insulating rope.

In order to install the splice between the two conductors 114 while the two conductors 114 are in close proximity to energized conductors, an equal potential zone 200 is constructed below the point conductors 114 are to be spliced. In embodiments of the invention where a splicing truck 290 is used, the splicing truck 290 will be parked on the equal potential zone 200 below the jumper 108 and insulating rope 252, as shown in FIG. 98, and electrically bonded to the equal potential zone 200.

Optionally, a ground wire 292 may be laid on the equal potential zone 200 and bonded to the equal potential zone 200 and to ground. The splicing truck may be electrically bonded to the ground wire 292. The conductor 114 and the insulating rope 252, pulling socks 277, and jumper 108 may be lowered by pulling the conductors 114 down to the equal potential zone 200 with the splicing truck 290. If a ground wire 292 is used, the conductors 114 are electrically bonded to the ground wire 292. The ground wire 292 may be useful in cases where the conductors 114 may have large currents and could exceed the capacity of smaller conductors within the equal potential zone 200. Once the conductors 114 have been pull down to the equal potential zone 200, the conductors 114 on both sides of the double sock connection 288 are both electrically bonded to the equal potential zone 200 and the ground wire 292. When the conductor tension is assumed and the jumper 108, pulling socks 277, and the insulated rope 252 become slack, they maybe removed. The two ends of the conductor 114 are then mechanically and electrically spliced to each other. The conductors 114 may be spliced together using a aluminum splicing sleeve that is hydraulically pressed onto the conductors 114 by the splicing truck 290. Optionally, the conductors 114 may be connected by using any suitable means for providing a electrical and mechanical connection.

Because both conductors 114 are bonded to the equal potential zone 200, the two conductors 114 may be worked on by workers on the equal potential zone 200 without a danger of a difference in potential between the conductors 114 and the workers on the equal potential zone 200. In embodiments where a splicing truck 290 is not used, similar procedures as described may be used. For example, the equal potential zone 200 and the conductors 114, the insulated rope 252, the pulling socks 277 and jumper 108 are lowered and bonded to the equal potential zone 200 where they are worked on by workers without the benefit of a splicing truck 290.

In some embodiments of the invention, the conductors 114, pulling socks 277 and jumper 108 are not lowered down to the equal potential zone 200, but rather workers are raised to the level of the conductors 114 in a bucket truck or some other apparatus. Conductive jumpers are used to electrically bond the conductors 114 on either side of the double sock connection 288. Once the bonding is accomplished, workers and/or equipment are raised to the level of the conductors 114 to splice the conductors 114 together using any suitable means for providing electrical and mechanical connections for high voltage and tensioned power lines.

In some embodiments of the invention, the equal potential zone 200 used in a splicing procedure in accordance with the invention will use a mat 202 about 100 feet long and about 12 feet wide (this size need not be achieved by one mat 202 but may be several mats 202 bonded together). All the mats 202 will be bonded together and tied to ground rods 206. A ground wire 292 will be connected between the ground rods 206 as shown in FIG. 98. The splicing truck 290 will be bonded to ground rod 206. A barricade fence 218, 220 (see FIG. 64) will be installed around the perimeter of the equal potential zone 200 and an insulating bridge access 216 will be provided to get on and off the equal potential zone 200. All the barricade fence posts will be bonded electrically to the equal potential zone 200.

Figure 101:
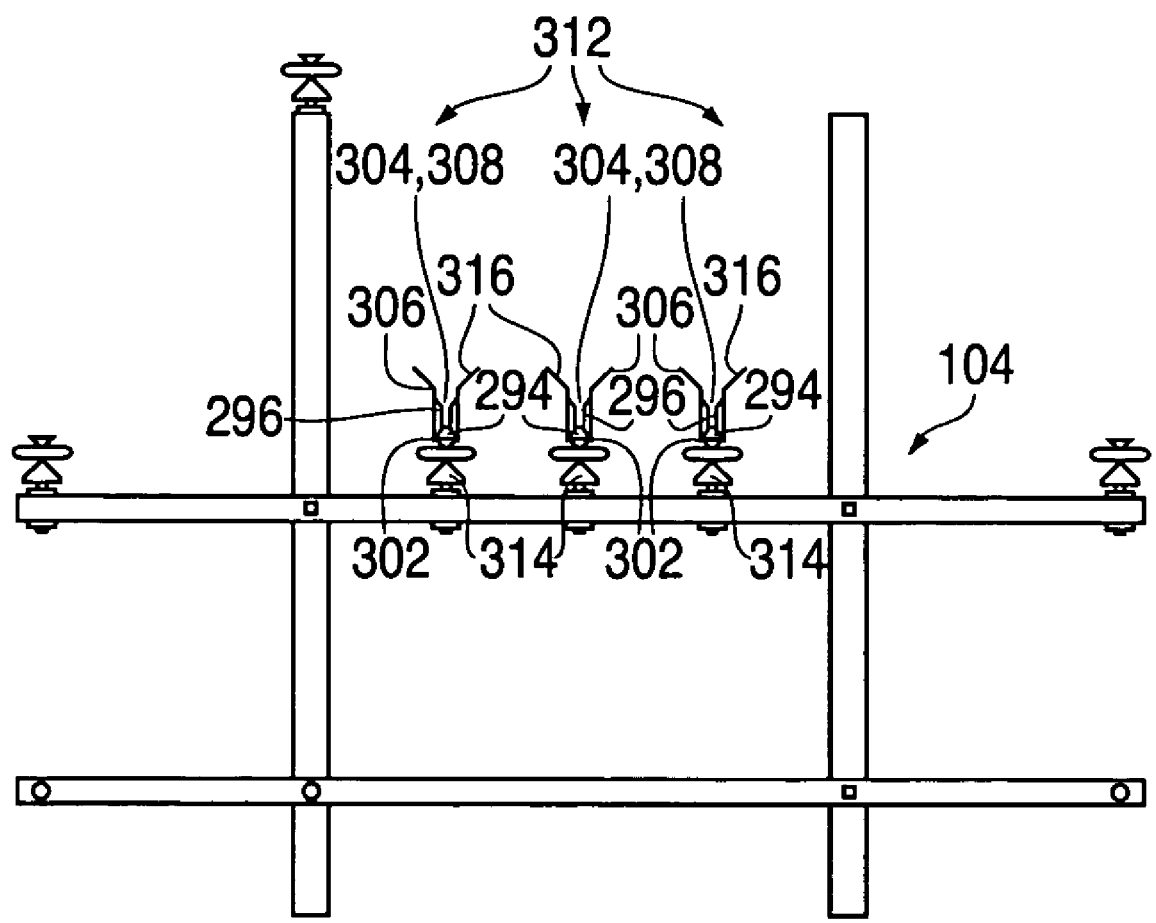
FIG. 101 is an end view of a support structure with travelers configured for helicopter stringing according to another embodiment of the invention.

Turning now to the travelers 244 that have been referred to herein, the following is a detailed explanation with reference to FIGS. 99-101 of travelers 244 in accordance with the invention according to an exemplary embodiment of the invention.

As shown in FIGS. 99-101, the traveler 244 is a pulley-like device that facilitates either the conductor, pulling rope, hard line, or other stringing line to be strung along the system 100. A traveler 244 may be attached to support structure 104 via an insulator 106 or may be attached directly to the support structure 104. A conductor 114 or any other line used in the stringing process is placed in the traveler 244 and pulled through the system 100. The travelers 244 are then removed from the conductor 114 and the conductor 114 is attached directly to the insulators 106 or armor rods 280 (See FIG. 90) are installed on the conductor 114 which is then attached to the insulators 106. The travelers 244 are removed from the insulators 106.

As shown in FIG. 99 the traveler 144 includes a frame 294. The frame 294 is generally U shaped as shown in FIG. 99. The traveler 244 also includes a wheel section 296 which attaches to the frame 294 via an axle. The pulling rope, hard line, or conductor sits in the groove between the wheel section 296 and the frame 294. The axle 126 is retained within the frame 294 by a hub 300.

At the top of the frame 294 is located an attaching apparatus 302 which is used to attach the traveler 244 to an insulator 106. The attaching apparatus 302 may be able to swivel to allow the traveler 244 to swivel when it is attached to an insulator 106.

As shown in FIG. 99, the wheel 296 has a U shaped profile 304. The U shaped profile 304 assists in allowing the conductor or whatever is being strung through the traveler 244 to be properly aligned around the wheel 296. In some embodiments of the invention, the conductor or whatever line is being strung through the traveler 244 is strung between the frame 294 and the wheel section 296. The weight of the conductor or whatever is being strung through the traveler 244 is borne by the wheel section 296. As the cable or conductor is pulled through the system 100, the wheel section 296 will rotate thus allowing the line being strung to be easily pulled along the system 100.

Often conductors that are strung in power transfer systems 100 are made of metal that may be exposed and not protected by any sort of coating. This exposed metal may potentially be damaged if placed in contact with part of a metal traveler 244. In order to protect the conductor made of exposed metal wire and configured to form a cable, the traveler 244 is given a neoprene coating 306 on the wheel section 296. The neoprene coating 306 aids in protecting the conductor from rubbing and becoming frayed or otherwise damaged by the traveler 244.

In addition to the wheel 296 moving around the axle 298, some embodiments of the invention also include bearings mounted within the wheel 296 for facilitating movement of the wheel 296 around the axle 298.

As shown in FIG. 99, some embodiments of the invention include a thin braided flat copper conductor 308 wrapped around the insulating wheel liner 306 and bonded to the wheel 296. The copper conductor 308 is wrapped around the wheel 296 outside the neoprene coating 306. An electrical pathway is provided through the neoprene coating 306 to the metal wheel 296 and frame 294, so as to prevent the conductor and traveler 244 from arcing and burning when subject to a high potential difference between the traveler 244 and conductor. The neoprene coating 306 is used to protect the conductor from wear and generally is not intended to electrically insulate the conductor from the traveler 244.

The braided flat copper conductor 308 located in the smallest diameter section of the wheel section 296 and the traveler 244 at the bottom of the U shaped profile 304 as shown in FIG. 100.

A hole 310 is provided in the wheel section 296, where a screw provides an electrical path between the copper conductor 308 and the wheel section 296, thus allowing an equal potential to exist between the copper conductor 308 and the wheel section 124. Conductive grease is used within the bearings to facilitate an equal potential between the wheel section 296, the bearings, axle 298, and the frame 294. Keeping the entire traveler 244 to a same potential makes the traveler 244 suitable for use in energized reconductoring. The traveler 244 will not be subject to differences in potential across different parts of the traveler 244, because the traveler 244 is modified to ensure all parts of it, the traveler 244 will be at the same potential and permit a conductor 102 in an energized state, to be strung through in the traveler 244 without creating any arcing, burning or other problems associated with a difference in potential between two objects in electrical contact with each other.

Another embodiment of the invention includes travelers 312 as shown in FIG. 101. The travelers 312 shown in FIG. 101 are utilized when helicopters are used in a stringing operation. The travelers 312 are mounted wheel side up and are mounted to pin insulators 314. The pin insulators 314 are mounted to the support structure 104. The helicopter strung travelers 312 are similar to the travelers 244 previously described herein and shown in FIGS. 99-100 in that the travelers 312 have a wheel 296 mounted in a frame 294 by an axle 298 (see FIGS. 99-100). Attached to the frame 294 are line guides 316. The line guides 316 are angled inward to help a line being strung by a helicopter to center on the wheel 296. It is the wheel 296 that supports the line being strung and the rolling action of the wheel 296 aids in allowing the line to move through the system 100.

According to some embodiments of the invention, the travelers 312 have a U-shaped profile 304 in the wheel 296 similar to the U-shaped profile 304 of the travelers 244. Conductive grease is used in the bearings to maintain an equal potential between the axel 298, wheel 296 and the frame 294, similar to the travelers 244.

Optionally, the travelers 312 are coated with a neoprene coating 306 and may be equipped with a braided flat copper conductor 308 located in the U-shaped profile 304 of the wheel 296. An electrical pathway is provided through the neoprene coating via a screw contacting the copper conductor 308 similar to the traveler 244 of FIGS. 99-100 or via any other suitable means.

The travelers 312 include an attaching apparatus 302 mounted to the frame 294. The attaching apparatus 302 provides structure to mount via a bolt and nut system or any other suitable system to mount the traveler 312 to the insulators 314.

The temporary portable support structure 254 used in some embodiments of the invention will now be explained in detail with reference to FIG. 102. The temporary portable support structure 254 includes a vehicle 256, and in some embodiments is a tracked vehicle such as a bulldozer. In other embodiments the vehicle 256 may be a wheeled vehicle. A pole 260 or some other upright structure at its base 320 is attached to the frame 322. The pole 260 may be welded, bolted or otherwise attached in accordance with the invention. The upright structure may be made of wood, metal, fiberglass, of other suitable materials.

Figure 102:
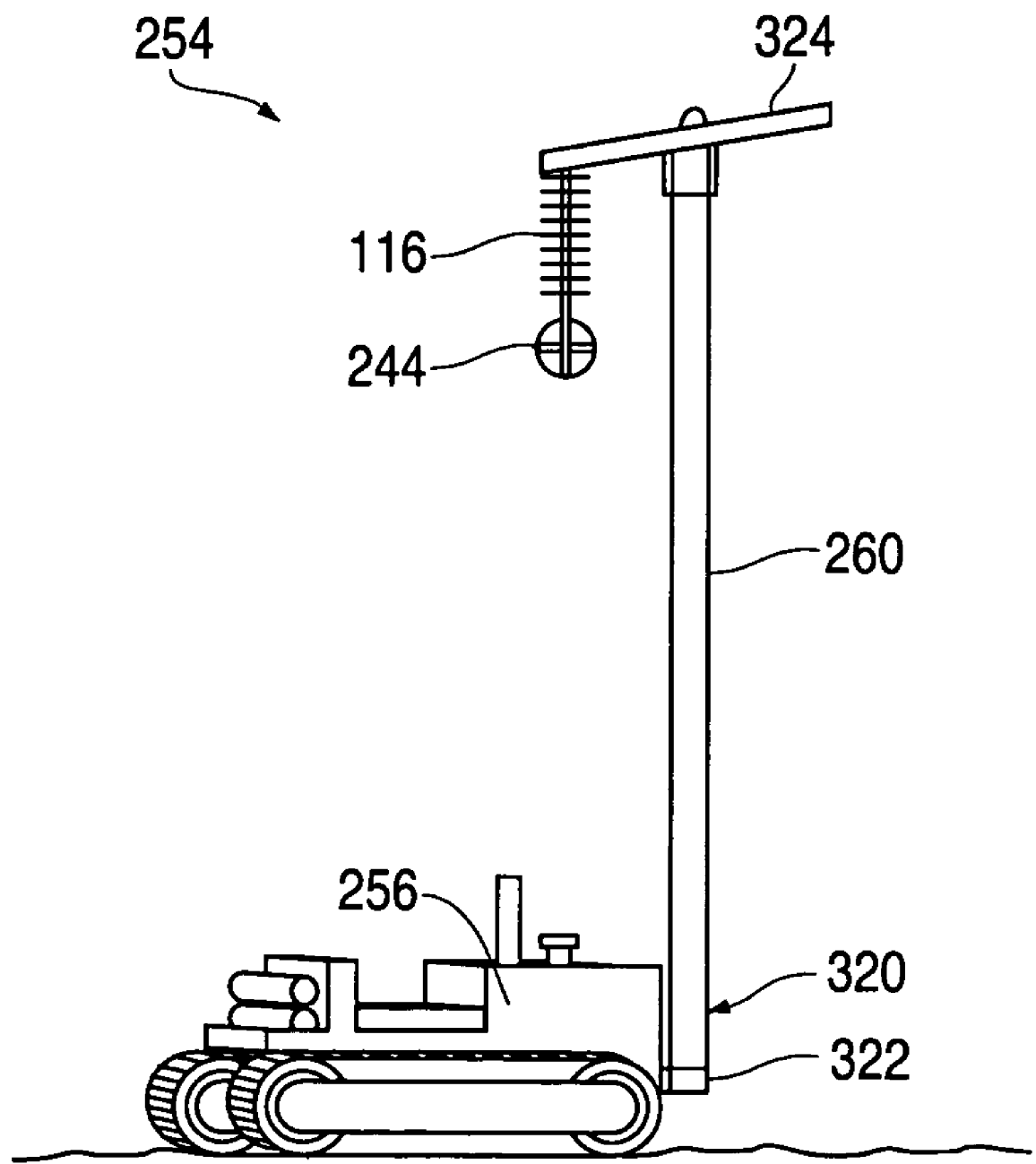
FIG. 102 is a perspective view of a portable, temporary support structure (a.k.a. a pole cat).

A crossarm 324 is attached to the pole as shown if FIG. 102. The crossarm 324 may be used to support an insulator 116 and traveler 244 as shown. Other apparatus may also be supported by the crossarm 324 such as an air break switch 140 (See FIGS. 30-31) for example. In some embodiments of the invention, the vehicle 256 and pole 260 are grounded to the earth by ground rods 206 (see FIG. 64) driven into the earth and conductive jumpers bond the vehicle 256 and/or pole 260 to the ground rods. In other embodiments of the invention, simply parking the vehicle 256 on the earth serves as a sufficient ground.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for replacing sections of electrically conductive phases in a three phase power conductor line having A, B and C phases, wherein the three phases are parallel and spaced apart and stringing between rigid supports supporting the three phases suspended above the ground, and wherein the sections of the three phases are replaced without interruption of a power load in any one of the three phases, the method comprising the steps of:

erecting auxiliary supports adjacent said rigid supports to support a section of conductor substantially parallel to and adjacent said A, B, and C phases, and adjacent to a phase-needing-replacement of said A, B and C phases, for each said phase-needing-replacement of said A, B, and C phases, employing a replacement method from the groups of steps comprising:

a) a move-and-replace method, wherein:
   (i) said each phase-needing-replacement is, while remaining energized, moved to, so as to be supported between, said auxiliary supports,
   (ii) then stringing a replacement phase between said rigid supports to replace said each phase-needing-replacement in substantially its originating position, wherein said replacement phase is at all times treated as an energized conductor in accordance with stringing steps set out below due to induced current in said replacement phase,
   (iii) each said replacement phase then electrically connected at one end thereof to its corresponding said phase-needing-replacement so as to bring said replacement phase to a potential equal to a potential of said phase-needing-replacement,
   (iv) completing an electrically parallel connection of said replacement phase with said phase-needing-replacement,
   (v) electrically disconnecting a first end and then a second opposite end of said phase-needing-replacement so as to isolate said phase-needing-replacement from the balance of the corresponding phase and then removing said phase-needing-replacement from between said auxiliary supports, wherein during said electrical disconnecting of said phase-needing-replacement and said removing, said phase-needing-replacement is treated as an energized conductor due to induced current in said phase-needing-replacement, b) a bypass method, wherein:
   (i) a further, D, phase is strung between said auxiliary supports,
   (ii) said D phase is then electrically connected at one end thereof to a corresponding end of a phase-needing-replacement so as to bring said D phase to a potential equal to a potential of said phase-needing-replacement, (iii) completing an electrically parallel connection of said D phase with said phase-needing-replacement by electrically connecting a second opposite end of said D phase to a corresponding end of said phase-needing-replacement, wherein said D phase is treated as an energized conductor in accordance with said stringing steps due to induced current in said D phase, (iv) electrically disconnecting a first end and then a second opposite end of said phase-needing-replacement so as to isolate said phase-needing-replacement from the balance of the corresponding phase and then removing said phase-needing-replacement from between corresponding said rigid supports, wherein during said electrical disconnecting of said phase-needing-replacement and said removing said phase-needing-replacement is treated as an energized conductor due to induced current in said phase-needing-replacement, c) a bypass-and-replace method comprising, firstly, the steps of said bypass method and, secondly, further comprising the steps of:

(i) then stringing a replacement phase between said rigid supports to replace said phase-needing-replacement in substantially its originating position wherein said replacement phase is treated as an energized conductor in accordance with said stringing steps due to induced current in said replacement phase, (ii) then electrically connecting said replacement phase at one end thereof to a corresponding end of said D phase so as to bring said replacement phase to a potential equal to a potential of said D phase, (iii) completing an electrically parallel connection of said replacement phase with said D phase, (iv) electrically disconnecting a first end and then a second opposite end of said D phase so as to isolate said D phase and then removing said D phase from between said auxiliary supports, wherein during said electrical disconnecting of said D phase and said removal said D phase is treated as an energized conductor due to induced current in said D phase, wherein said stringing steps include the steps of:

a) providing a pulling line having at least a non-conductive end, b) connecting said non-conductive end of said pulling line to a leading end of: said replacement phase in said move-and-replace method, said D phase in said bypass method and said bypass-and-replace method, c) providing first and second equal potential zones at opposite ends of a stringing path wherealong said replacement phase in said move-and-replace method, said D phase in said bypass method and said bypass-and-replace method, are to be strung, wherein said first and second equal potential zones are grounded to their respective first and second adjacent areas of earth, d) electrically connecting said pulling line to said first equal potential zone, electrically connecting said replacement phase in said move-and-replace method, said D phase in said bypass method and said bypass-and-replace method, to said second equal potential zone, and connecting said non-conductive end of said pulling line to said leading end of said replacement phase in said move-and-replace method, said D phase in said bypass method and said bypass-and-replace method, e) electrically connecting first pulling equipment at said first-equal potential zone to said first equal potential zone and electrically connecting pay-out equipment at said second equal potential zone to said second equal potential zone, f) pulling said pulling line along said stringing path using said pulling and payout equipment so as to pull said pulling line into said first equal potential zone while paying-out said replacement phase in said move-and-replace method, said D phase in said bypass method and said bypass-and-replace method, along said stringing path from said second equal potential zone, whereby said phase-needing-replacement is replaced with said replacement phase in said move-and-replace and said bypass-and-replace methods, and is replaced with said D phase in said bypass method, without interrupting said power load and without risk of a ground circulating current electrically connecting between first and second equal potential zones.

2. The method of claim 1 wherein said step of employing a replacement method from a group of steps further comprises a further replacement method in said group of steps, said further replacement method comprising, firstly, the steps of said bypass method and, secondly, the further the steps of:

a) then stringing a first replacement phase between said rigid supports to replace said phase-needing-replacement in substantially its originating position wherein said first replacement phase is treated as an energized conductor in accordance with said stringing steps due to induced current in said first replacement phase, b) diverting power from a second said phase-needing-replacement to said first replacement phase and replacing said second phase-needing-replacement with a second replacement phase.

3. The method of claim 2 further comprising the step of re-diverting power from said first replacement phase to said second replacement phase, and re-diverting power from said D phase to said first replacement phase.

4. The method of claim 3 further comprising the step of removing said D phase.

5. The method of claim 1 further comprising the steps in said stringing method and said unstringing method of employing a transfer bus housing a switch, a circuit breaker for:

a) said electrically connecting said replacement phase in said move-and-replace method and said bypass-and-replace method, b) said electrically connecting said D phase in said bypass method and said bypass-and-replace method, c) said electrically disconnecting said phase-needing-replacement in said move-and-replace, said bypass, and said bypass-and-replace method, d) said electrically disconnecting said D phase in said bypass-and replace method.

6. The method of claim 1 further comprising providing electrically conductive mats for said first and second equal potential zones, grounding said mats to their adjacent areas of earth, and electrically bonding said equipment to said mats.

7. The method of claim 1 wherein said insulated end of said pulling line is an insulated rope.

8. The method of claim 1 further including providing a hard line and connecting said hard line to said pulling line at said insulated end of said pulling line, pulling said hard line through said stringing path, connection said hard line by an insulated connector on opposite ends of said hard line to a replacement conductor which, when pulled through said stringing path will form said replacement phase, said D phase.

9. The method of claim 1 wherein said electrical connection of said line to said first equal potential includes a running ground running on said pulling line.

10. The method of claim 1 further including providing a pair of transfer busses, and said electrically connecting said D phase in said bypass method and bypass-and-replace method to said phase-needing-replacement using said pair of transfer buses.

11. The method of claim 1 wherein said stringing steps further includes erecting temporary dead end supports along said stringing path and conducting said stringing in stages between said temporary dead end supports.

12. The method of claim 1 further comprising providing our insulated section alongside each of said first and second equal potential zones for workmen to walk over before entering into said equal potential zones.

13. The method of claim 12 wherein said insulated section is chosen from the group comprising an insulated pallet, an insulated bridge.

14. The method of claim 1 wherein said stringing step further include providing an anchor vehicle anchoring said stringing along side stringing path, wherein said anchor vehicle is electrically bonded to its corresponding equal potential zone of said first and second equal potential zones if said anchor vehicle is positioned on said corresponding equal potential zone, and otherwise said anchor vehicle is insulated from said corresponding equal potential zone.

15. The method of claim 6 wherein said mats are metal mesh.

16. The method of claim 1 wherein, during said stringing steps, said pulling line is kept at a higher tension sag than the tension sag of adjacent phases.

17. The method of claim 1 wherein said rigid supports include dead end supports, and wherein said stringing steps further comprise providing new dead end supports for said replacement phases so that said replacement phases, once strung between said new dead end supports, are adjacent and substantially parallel to said originating positions of corresponding said phases-needing-replacement.

\* \* \* \* \*